(12) United States Patent
Kishida

(10) Patent No.: US 7,969,470 B2
(45) Date of Patent: Jun. 28, 2011

(54) MOVING OBJECT DETECTION APPARATUS, METHOD AND PROGRAM

(75) Inventor: Takeshi Kishida, Tokyo (JP)

(73) Assignee: Sony Corporation (JP)

( * ) Notice: Subject to any disclaimer, the term of this patent is extended or adjusted under 35 U.S.C. 154(b) by 1435 days.

(21) Appl. No.: 11/377,004

(22) Filed: Mar. 16, 2006

(65) Prior Publication Data
US 2006/0244866 A1 Nov. 2, 2006

(30) Foreign Application Priority Data

Mar. 16, 2005 (JP) .................. 2005-075482

(51) Int. Cl.
*H04N 5/228* (2006.01)
(52) U.S. Cl. ............... 348/208.14; 348/153; 348/154; 348/155; 348/208.1
(58) Field of Classification Search .. 348/208.99–208.4, 348/208.14, 143–155
See application file for complete search history.

(56) References Cited

U.S. PATENT DOCUMENTS

| 6,809,758 B1 * | 10/2004 | Jones | 348/208.99 |
| 2005/0179784 A1 * | 8/2005 | Qi | 348/208.1 |

FOREIGN PATENT DOCUMENTS

| JP | 2000059796 A | 2/2000 |
| JP | 2000-322581 A | 11/2000 |
| JP | 2002077898 A | 3/2002 |
| JP | 2003-169319 A | 6/2003 |

OTHER PUBLICATIONS

"Local correlation calculation for detecting and tracking movements" by Toshihiko Morita, Institute of Electronics, Information and Communication Engineers (IEICE) transactions, D-II, vol. J84-D-II, No. 2, pp. 299-309, Feb. 2001.
Office Action from Japanese Application No. 2005-075482, dated Jul. 1, 2010.

* cited by examiner

*Primary Examiner* — Sinh Tran
*Assistant Examiner* — Anthony J Daniels
(74) *Attorney, Agent, or Firm* — Lerner, David, Littenberg, Krumholz & Mentlik, LLP

(57) ABSTRACT

A moving object detection device accurately detects moving objects. The device includes a motion vector calculation section calculating motion vectors from an input image; a motion vector removal section removing a motion vector having high randomness from the calculated motion vectors; a motion vector accumulation section temporally accumulating each motion vector not removed by the motion vector removal section, and calculating an accumulated number of occurrences and an accumulated value of each motion vector; and a moving object detection section determining, based on the calculated accumulated value and calculated accumulated number of occurrences of each motion vector, whether each motion vector corresponds to a moving object.

10 Claims, 40 Drawing Sheets

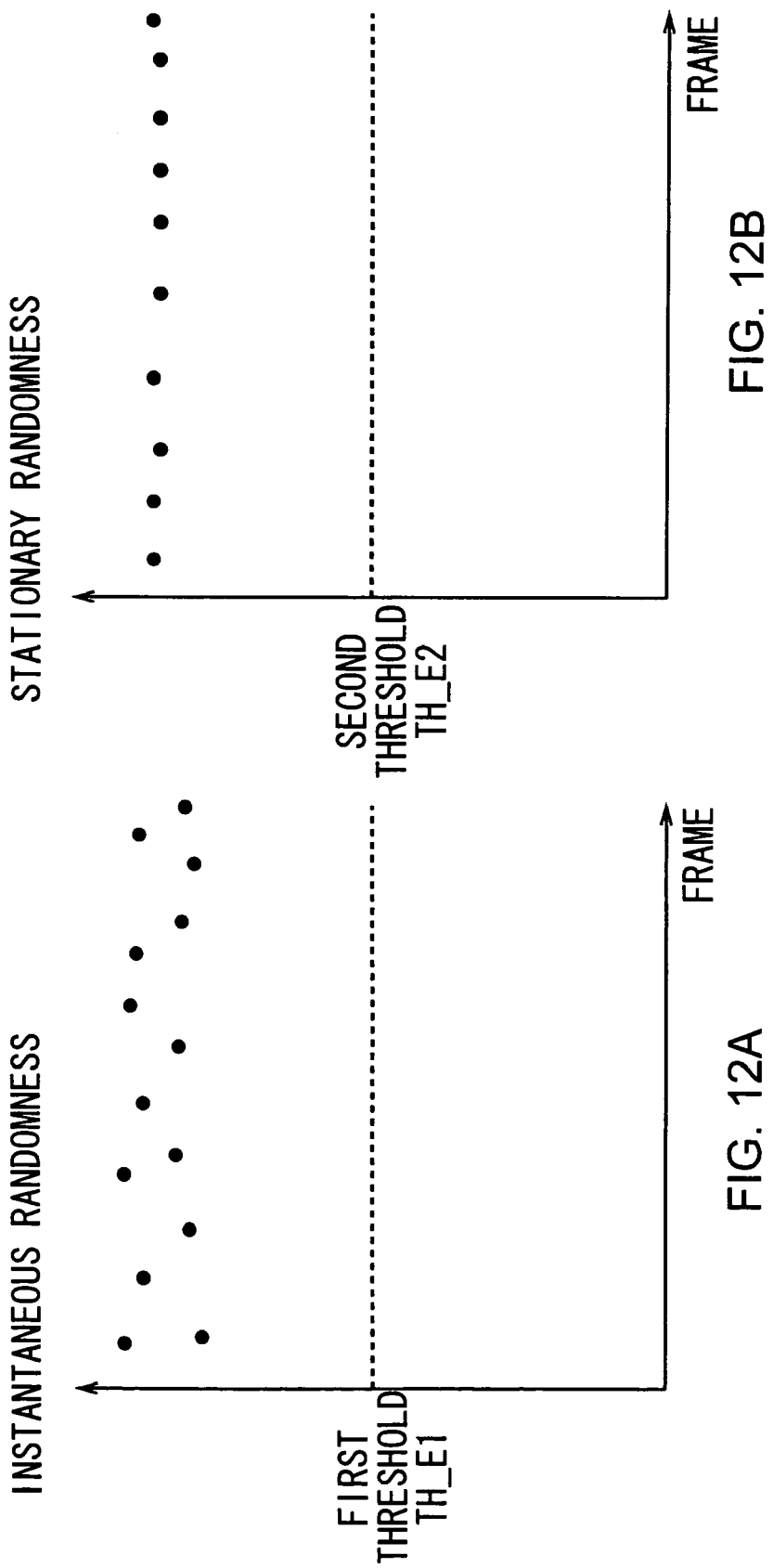

MOTION VECTORS ON FIRST LAYER

| V1n (X, Y) | V1n (X+T, Y) | V1n (X+2T, Y) | V1n (X+3T, Y) BR10 |
|---|---|---|---|
| V1n (X, Y+T) | V1n (X+T, Y+T) | V1n (X+2T, Y+T) | V1n (X+3T, Y+T) |
| V1n (X, Y+2T) | V1n (X+T, Y+2T) | V1n (X+2T, Y+2T) | V1n (X+3T, Y+2T) |

FIG. 35A

MOTION VECTORS ON SECOND LAYER

| V2n (X+T/2, Y+T/2) | V2n (X+5T/2, Y+T/2) BR20 |
|---|---|
| V2n (X+T/2, Y+5T/2) | V2n (X+5T/2, Y+5T/2) |

FIG. 35B

INTEGRATED MOTION VECTORS

| Vn (X, Y) | Vn (X+T, Y) | Vn (X+2T, Y) | Vn (X+3T, Y) ~BR10 |
|---|---|---|---|
| Vn (X, Y+T) | Vn (X+T, Y+T) | Vn (X+2T, Y+T) | Vn (X+3T, Y+T) |
| Vn (X, Y+2T) | Vn (X+T, Y+2T) | Vn (X+2T, Y+2T) | Vn (X+3T, Y+2T) |

FIG. 35C

MOVING OBJECT DETECTION APPARATUS, METHOD AND PROGRAM

CROSS-REFERENCE TO RELATED APPLICATIONS

The present application claims priority from Japanese Patent Application No. 2005-075482 filed on Mar. 16, 2005, the disclosure of which is hereby incorporated by reference herein.

BACKGROUND OF THE INVENTION

The preset invention relates to a moving object detection apparatus and method, and is preferably applied to a moving object detection device in a video surveillance system, for example.

A video surveillance system equipped with a moving object detection device has been installed in buildings, warehouses and the like for crime prevention. This moving object detection device processes image signals supplied from surveillance cameras to detect a moving object in an image corresponding to the image signals.

It is desirable that the moving object detection device can accurately detect moving objects in images even if the device is affected by the following factors: diffused reflection light caused by water waves; natural disturbance such as plants shaken by the wind; diffused reflection light caused by flags flying in the strong wind; diffused reflection light caused by headlights in the night; and disturbance caused by artificial materials, such as a sudden change of brightness by turning on/off lights.

To satisfy the requirement, a moving object detection device is proposed which detects a moving object in the following manner: detects an image area that is moving in the image corresponding to the image signals supplied from the surveillance camera; tracks the detected image area for a predetermined period of time; and then determines whether or not the image area corresponds to a moving object based on the tracking result (see Jpn. Pat. Appln. Laid-Open Publication No. 2000-322581 and Non-Patent Document "Local correlation calculation for detecting and tracking movements" by Toshihiko Morita, Institute of Electronics, Information and Communication Engineers (IEICE) transactions, D-II, VOL. J84-D-II, No. 2, pp. 299-309, February 2001, for example).

In addition, another moving object detection device is proposed which can detect a moving object in the following manner: detects change in the image corresponding to the image signals supplied from the surveillance camera; sets the area where the change occurred as a changing area; disposes a plurality of correlation calculation blocks in the changing area to perform correlation calculation; and then detects a moving object based on results of the correlation calculation (see Jpn. Pat. Appln. Laid-Open Publication No. 2003-169319, for example).

FIG. 39 shows the configuration of the moving object detection device 1 according to said Non-patent document by Toshihiko Morita.

The moving object detection device 1 receives image data D1 from surveillance cameras or the like, and then supplies the image data D1 via an image input section 2 to a detection block setting section 3. The detection block setting section 3 divides an image corresponding to the image data D1 into a plurality of detection blocks (areas) BR1 as shown in FIG. 40A. In this case, the blocks BR1 are surrounded by dotted lines in FIG. 40A. The detection block setting section 3 then supplies image data of each detection block BR1 to a correlation calculation block disposition section 4 as detection block data D2.

In this case, the first division method is stationary. Therefore, initial position and size of each detection block BR1 always become constant. However, when the detection block BR1 goes into tracking state as described below, this detection block BR1 sequentially moves like FIG. 40B in dependence upon vector information D8 about a representative motion vector. This vector information D8 is based on the motion vectors of detection block BR1 supplied from a subsequent section (i.e., a spatial motion uniformity determination section 9).

The correlation calculation block disposition section 4 performs division process for each detection block data D2 supplied from the detection block setting section 3 to divide each detection block BR1 into a plurality of correlation calculation blocks BR2. Here, the correlation calculation blocks BR2 are indicated by ruled lines in FIG. 40A. The correlation calculation block disposition section 4 then supplies image data of each correlation calculation block BR2 to a correlation calculation execution section 6 as correlation calculation block data D3. When the process of the previous section (i.e., the detection block setting section 3) moves the detection block BR1, the correlation calculation blocks BR2 in the detection block BR1 moves accordingly.

The image data D1 input through the image input section 2 is also supplied to a previous image storage section 5. The previous image storage section 5 stores the image data D1 accordingly. After that, at the timing when the correlation calculation block disposition section 4 supplies the correlation calculation block data D3 to the correlation calculation execution section 6, an image piece which corresponds to the correlation calculation block BR2 in terms of both position and size is extracted from the preceding frame of image data D1 stored in the previous image storage section 5 and is read out by the correlation calculation execution section 6 as delayed image data D4.

The correlation calculation execution section 6 performs correlation calculation for the correlation calculation block data D3 supplied from the correlation calculation block disposition section 4 and the delayed image data D4 read from the previous image storage section 5. That is to say, the correlation calculation execution section 6 calculates correlation between the current image of each correlation calculation block BR2 and the corresponding previous image. And then the correlation calculation execution section 6 generates a correlation value map of each correlation calculation block BR2 based on the calculation result. The correlation calculation execution section 6 subsequently recognizes a vector on the correlation value map which is pointing out from an original point to a minimum value point as a motion vector of the correlation calculation block BR2.

In the case in which the minimum value on the correlation value map shows a distinct negative peak, the motion vector is deemed to have high reliability; and otherwise, the motion vector is deemed to have low reliability. Therefore, in the case in which: the magnitude of the motion vector is not equal to "0"; and the minimum value on the correlation value map shows a distinct negative peak, the correlation calculation execution section 6 determines that the correlation calculation block BR2 has "movements", and otherwise determines that the correlation calculation block BR2 has "no movements". The correlation calculation execution section 6 then supplies correlation calculation result information D5 showing the determination result to an initial detection section 7.

The initial detection section 7 performs counting process for each detection block BR1, based on the correlation calculation result information D5 supplied. That is to say, the initial detection section 7 counts the number of the correlation calculation block BR2 that was determined to have "movements" for each detection block BR1. When the counted number is greater or equal to a predetermined number, the initial detection section 7 determines that the detection block BR1 has "movements". The initial detection section 7 then supplies initial detection determination information D6 showing the determination result to a spatial motion vector integration section 8. By the way, the detection block BR1 that was determined to have "movements" will go into the tracking state (FIG. 40B).

Based on the initial detection determination information D6, the spatial motion vector integration section 8 performs accumulation process for each detection block BR1 which was determined to have "movements". In the accumulation process, the spatial motion vector integration section 8 accumulates the correlation value maps of all the correlation calculation blocks BR2 in the detection block BR1. The spatial motion vector integration section 8 then supplies spatial motion vector integration information D7 showing the accumulation results to the spatial motion uniformity determination section 9.

Based on the spatial motion vector integration information D7 supplied, the spatial motion uniformity determination section 9 processes each detection block BR1 which was determined to have "movements" by the initial detection section 7 in the following manner; finds out a vector on the accumulated correlation value map which is pointing out from an original point to a minimum value point as a motion vector (the vector is shown by arrows in FIG. 40A); and then recognizes the motion vector as a representative motion vector of the detection block BR1 when the motion vector is not equal to "0" and the minimum value of accumulated correlation value maps shows a distinct negative peak.

The spatial motion uniformity determination section 9 then supplies vector information D8 about the representative motion vector to the detection block setting section 3. Based on the vector information D8, the detection block setting section 3 allows each detection block BR1 which was determined to have "movements" by the initial detection section 7 to go into the tracking state. In the tracking state, the detection blocks BR1 move in accordance with the magnitude and direction of the representative motion vector which is based on the vector information D8, as shown in FIG. 40B. That allows detecting "movements" of each detection block BR1 that was determined to have "movements". The tracking process of tracking the detection blocks having "movements" is repeated until a predetermined period of tracking time has passed.

In addition, the spatial motion uniformity determination section 9 supplies map information D9 to a temporal motion vector integration section 10. The map information D9 shows information about the spatially-accumulated correlation value maps in each detection block BR1 being tracked.

Based on the map information D9 supplied, the temporal motion vector integration section 10 continues to temporally accumulate the spatially-accumulated correlation value maps of each detection block BR1 until the predetermined period of tracking time has passed. Therefore, the spatially and temporally accumulated correlation value map of each detection block BR1 is generated when the period of tracking time has ended. In this manner, the temporal motion vector integration section 10 obtains tracking information showing the spatially and temporally accumulated correlation value map of each detection block BR1. The temporal motion vector integration section 10 then supplies map information D10 to a temporal motion uniformity determination section 11. The map information D10 shows information about the spatially and temporally accumulated correlation value map of each detection block BR1.

Based on the map information D10 supplied, the temporal motion uniformity determination section 11 performs processes in the following manner: on the correlation value map obtained by completing the spatial and temporal accumulation, recognizes a vector which is pointing out from an original point to a minimum value point as a motion vector; and determines that the corresponding detection block BR1 has "movements" when the motion vector is not equal to "0" and the minimum value of the correlation value map shows a distinct negative peak.

The following is the reason: in general, moving objects such as human beings and vehicles moves in a fixed direction in short term, therefore, when detecting the movements of those kinds of moving object, the spatially and temporally accumulated correlation value map has a negative peak of minimum value at almost the same position every time. By contrast, background movements such as natural trees and waves are vibrating, therefore, when detecting the movements of trees, waves or the like, the spatially accumulated correlation value map has a negative peak of minimum value at different positions every time.

In this manner, the moving object detection device 1 can accurately detect moving objects such as human beings and vehicles, based on the "movements" of objects moving in the image corresponding to the inputted image data D1.

However, in the case in which: there is a plurality of moving objects and background movements in one detection block BR1; and they are moving in different directions, the motion vectors cancel each other. In this case, the above-noted moving object detection device 1 may fail to detect the moving objects.

To solve this problem, there is proposed moving object detection method in Jpn. Pat. Appln. Laid-Open Publication No. 2003-169319. FIG. 41 (the parts of FIG. 41 have been designated by the same symbols and marks as the corresponding parts of FIG. 39) shows a moving object detection device 20 according to the moving object detection method of Jpn. Pat. Appln. Laid-Open Publication No. 2003-169319. The configuration of the moving object detection device 20 is almost similar to that of the above-noted moving object detection device 1 (FIG. 39) except for an image change extraction section 21 replacing the detection block setting section 3 (FIG. 39) and initial detection section 7 (FIG. 39).

In this case, as shown in FIG. 42, the image change extraction section 21 includes: a background difference section 30 for removing background images from the image corresponding to the image data D1 supplied from an image input section 2; a background update section 31 for updating the background images; and a changing area extraction section 32 for setting a changing area in the image whose background images have been removed by the background difference section 30.

The background difference section 30 calculates difference between the image corresponding to the image data D1 and an image corresponding to background image data D20 supplied from the background update section 31 (the background image data D20 has been saved in the background update section 31). The background difference section 30 then removes the image corresponding to the background image data from the image corresponding to the image data D1 to extract an image where a change occurs. The background difference section 30 subsequently transmits the extracted image to the background update section 31 and the changing area extraction section 32 as extraction, image data D21.

The background update section 31 for example averages a predetermined number of the images corresponding to the image data D1 to obtain average image. In the average image, outlines of moving parts have been overlapped with each other, and therefore their appearances are indistinct. The background update section 31 appropriately performs update process to remove indistinct objects from the average images, and stores the images as the background image data D20.

On the image whose background image has been removed by the background difference section 30, the changing area extraction section 32 sets a changing area AR to the part where change occurs as shown in FIG. 43A, and then generates changing area setting information D11 showing the result. In FIG. 43A, the changing area AR is surrounded by dotted lines. The changing area extraction section 32 subsequently supplies the changing area setting information D11 to the correlation calculation block disposition section 22.

The correlation calculation block disposition section 22 performs division process for each changing area AR supplied from the image change extraction section 21. In the division process, the correlation calculation block disposition section 22 divides the changing area AR into a plurality of correlation calculation blocks BR2 (FIG. 43A), and then supplies image data of each correlation calculation block BR2 to a correlation calculation execution section 23 as correlation calculation block data D12. When the changing area AR moves as a result of the process of the image change extraction section 21, each correlation calculation block BR2 in the changing area AR also moves accordingly.

Based on the correlation calculation block data D12 supplied from the correlation calculation block disposition section 22 and delayed image data D4 read from the previous image storage section 5, the correlation calculation execution section 23 performs correlation calculation for each correlation calculation block BR2. In this correlation calculation, the correlation calculation execution section 23 calculates correlation between the current image of each correlation calculation block BR2 and the corresponding previous image. And then the correlation calculation execution section 23 generates a correlation value map of each correlation calculation block BR2 based on the calculation result. The correlation calculation execution section 23 subsequently recognizes a vector on the correlation value map which is pointing out from an original point to a minimum value point as a motion vector of the correlation calculation block BR2.

In the case in which: the motion vector of the correlation calculation block BR2 is not equal to "0"; and the minimum value in the correlation value map shows a distinct negative peak, the correlation calculation execution section 23 determines that the correlation calculation block BR2 has "movements"; and otherwise determines that the correlation calculation block BR2 has "no movements". The correlation calculation execution section 23 then supplies correlation calculation result information D13 showing the determination result to a spatial motion vector integration section 24.

Based on the correlation calculation result information D13, the spatial motion vector integration section 24 performs accumulation process for each changing area AR. In this accumulation process, the spatial motion vector integration section 24 accumulates the correlation value maps of all the correlation calculation blocks BR2 in the changing area AR. The spatial motion vector integration section 24 then supplies spatial motion vector integration information D14 showing the accumulation results to the spatial motion uniformity determination section 25.

Based on the spatial motion vector integration information D14 supplied, the spatial motion uniformity determination section 25 processes each changing area AR in the following manner: finds out a vector on the accumulated correlation value map which is pointing out from an original point to a minimum value point as a motion vector (the vector is shown by arrows in FIG. 43A; and then recognizes the motion vector as a representative motion vector of the changing area AR when the motion vector is not equal to "0" and the minimum value of accumulated correlation value maps shows a distinct negative peak.

The spatial motion uniformity determination section 25 then supplies vector information D15 about the representative motion vector to the correlation calculation block disposition section 22. Based on the vector information D15, the correlation calculation block disposition section 22 allows each changing area AR to go into the tracking state. As a result, the correlation calculation block disposition section 22 starts to supply correlation calculation block data relevant to the changing area AR to the correlation calculation execution section 23. That allows detecting the "movements" of each changing area AR. This tracking process is repeated until a predetermined period of tracking time has passed.

In addition, correlation value maps are spatially accumulated in each changing area AR being tracked. The spatial motion uniformity determination section 25 supplies map information D9 about the spatially-accumulated correlation value maps to the temporal motion vector integration section 10.

After that, the temporal motion vector integration section 10 and the temporal motion uniformity determination section 11 performs processes in the same way as the above-noted moving object detection device 1: the temporal motion vector integration section 10 spatially and temporally accumulates the correlation value maps of the changing area AR that is deemed to be moving objects for the predetermined period of tracking time; and then the temporal motion uniformity determination section 11 detects the changing area AR having "movements".

In this manner, the moving object detection device 20 can accurately detect moving objects such as human beings and vehicles, based on the "movements" of objects moving in the image corresponding to the inputted image data D1.

By the way, the above-noted moving object detection device 1, 20 first set an area to detect movements. And then the moving object detection device 1, 20 spatially and temporally evaluate the uniformity of movements while tracking the area for a certain period of time. Based on the evaluation, the moving object detection device 1, 20 determine whether or not the area corresponds to moving objects.

However, the area set by the above method may include not only moving objects but also other things.

The following is description of the moving object detection device 1. For example as shown in FIG. 44, when a person HU is walking through in front of a background BG (such as advertising flags on the side of roads) that is moving, the detection block BR1 includes both the motion vectors corresponding to the person HU and the motion vectors corresponding to the movements of the background BG. In this case, the movements of person HU do not correlate with the background movements. Therefore, the moving object detection device 1 does not determine that the detection block BR1 has "movements", since the spatially-integrated correlation value maps of the detection block BR1 does not show any distinct peaks. Even if the moving object detection device 1 determines that the detection block BR1 has "movements", the representative motion vector does not represent the movements of person HU correctly. Therefore, the moving object detection device 1 may fail to track and detect the person HU.

The following is description of the moving object detection device 20. When the person HU who is moving is very close to the background BG that is moving, the moving object detection device 20 can correctly detect the person HU, because it has previously set the changing area AR (FIGS. 43A and 43B) based on background difference. However, as shown in FIG. 45, when the background BG that is moving on a screen and the person HU overlap each other, the changing area AR includes both the motion vectors corresponding to the person HU and the motion vectors corresponding to the movements of the background BG. Under this condition, the moving object detection device 20 may fail to track and detect the person HU like the moving object detection device 1.

When the moving object detection device 20 has been desensitized toward background difference, the moving object detection device 20 does not detect the movements of background BG as the changing area AR. However, in the case in which the brightness level of the movements of person HU is close to that of the background movements, the moving object detection device 20 does not detect the movements of person HU as the changing area AR. Accordingly, the moving object detection device 20 may fail to track and detect the person HU like the moving object detection device 1, even if it has adjusted the sensitivity for background difference.

In general, a video surveillance system equipped with those kinds of moving object detection device 1, 20 are often installed in the environment where illumination is not sufficiently bright, and therefore the SN ratio of the images corresponding to the image signals input from surveillance cameras are not good. In this case, random noise is not negligible against the contrast of subjects. The random noise is generated all over the screen, and varies with time. That causes problems similar to those arising from the overlapping of the background change and the moving object as described above.

In addition, the moving object detection device 1, 20 described above first sets the area (the detection block area BR1 or the changing area AR), and moves it in conjunction with tracking. The region from which the area has left is not covered with any correlation calculation block BR2. Accordingly, the moving object detection device 1, 20 would not detect a moving object coming into the region.

That is to say, as shown in FIGS. 46A and 46B, when a second person HU2 who is following a first person HU1 appears on the screen while the moving object detection device 1 is tracking the first person HU by moving the detection block BR1 (FIG. 46A), the detection block BR1 tracking the first person HU1 has already left its initial position to track the first person HU1, and therefore the initial position is not covered with any correlation calculation blocks. Accordingly, the moving object detection device 1 does not detect the second person HU2 (FIG. 46B).

The following is description of the moving object detection device 20. For example in FIGS. 47A and 47B, while the moving object detection device 20 is tracking a first person HU1 by moving the correlation calculation blocks BR2 after having set the changing area AR for the first person HU1 on the screen (FIG. 47A), a second person HU2 who is following the first person HU1 appears on the screen. Even if the moving object detection device 20 sets a new changing area AR that surrounds both the first person HU1 and the second person HU2 (FIG. 47B), the second person HU2 is not covered with the correlation calculation blocks BR2, because the moving object detection device 20 does not change the positions of correlation calculation blocks BR2 within the changing area AR whose shape has changed in this tracking period. Therefore, the moving object detection device 20 does not detect the movements of second person HU2.

Even if the moving object detection device 20 moves the correlation calculation blocks BR2 in conjunction with the tracking, that increases the complexity of the image processing procedure and device configuration, because it has to temporally change the positions of the correlation calculation blocks BR2 in each area independently.

Thus, the above-noted moving object detection device 1, 20 have various kinds of problems such as they have difficulty in accurately tracking and detecting moving objects, because they first set the area (the detection block BR1 or the changing area AR) to the target prior to evaluating the uniformity of "movements" and move the correlation calculation blocks BR2.

SUMMARY OF THE INVENTION

The present invention has been made in view of the above points and is intended to provide a moving object detection apparatus, method and program which can accurately detect moving objects.

According to an embodiment of the present invention, a moving object detection apparatus includes: motion vector calculation means for calculating motion vectors from an input image; motion vector removal means for removing a motion vector having high randomness from the calculated motion vectors; motion vector accumulation means for temporally accumulating each motion vector not removed by the motion vector removal means, and for calculating an accumulated number of occurrences and an accumulated value of each motion vector; and moving object detection means for determining, based on the calculated accumulated value and calculated accumulated number of occurrences of each motion vector, whether each motion vector corresponds to a moving object.

In this manner, the apparatus removes motion vectors arising from moving backgrounds without removing motion vectors arising from moving objects. That previously and effectively prevents the apparatus from confusing motion vectors arising from moving backgrounds with motion vectors arising from moving objects. Thus, the moving object detection apparatus can accurately detect moving objects.

In addition, a moving object detection method includes calculating motion vectors from an input image; removing a motion vector having high randomness from the calculated motion vectors; temporally accumulating each motion vector not removed from the calculated motion vectors, and calculating an accumulated number of occurrences and an accumulated value of each motion vector; and determining, based on the calculated accumulated value and calculated accumulated number of occurrences of each motion vector whether each motion vector corresponds to a moving object.

In this manner, the apparatus according to this method removes motion vectors arising from moving backgrounds without removing motion vectors arising from moving objects. That previously and effectively prevents the apparatus from confusing motion vectors arising from moving backgrounds with motion vectors arising from moving objects. Thus, the moving object detection method can accurately detect moving objects.

In addition, in a program for causing an apparatus to perform a moving object detection method, the method includes calculating motion vectors from an input image; removing a motion vector having high randomness from the calculated motion vectors; temporally accumulating each motion vector not removed from the calculated motion vectors, and calculating an accumulated number of occurrences and an accumulated value of each motion vector; and determining, based on the calculated accumulated value and calculated accumulated number of occurrences of each motion vector whether each motion vector corresponds to a moving object.

In this manner, the apparatus removes motion vectors arising from moving backgrounds without removing motion vectors arising from moving objects. That previously and effectively prevents the apparatus from confusing motion vectors arising from moving backgrounds with motion vectors arising from moving objects. Thus, this program accurately detects moving objects.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 12A and 12B are graphs illustrating instantaneous and stationary randomness of motion vectors arising from background changes;

FIGS. 35A to 35C are schematic diagrams explaining calculation of motion vectors in a third embodiment;

DETAILED DESCRIPTION

Preferred embodiments of the present invention will be described in detail with reference to the accompanying drawings.

Figure 1:
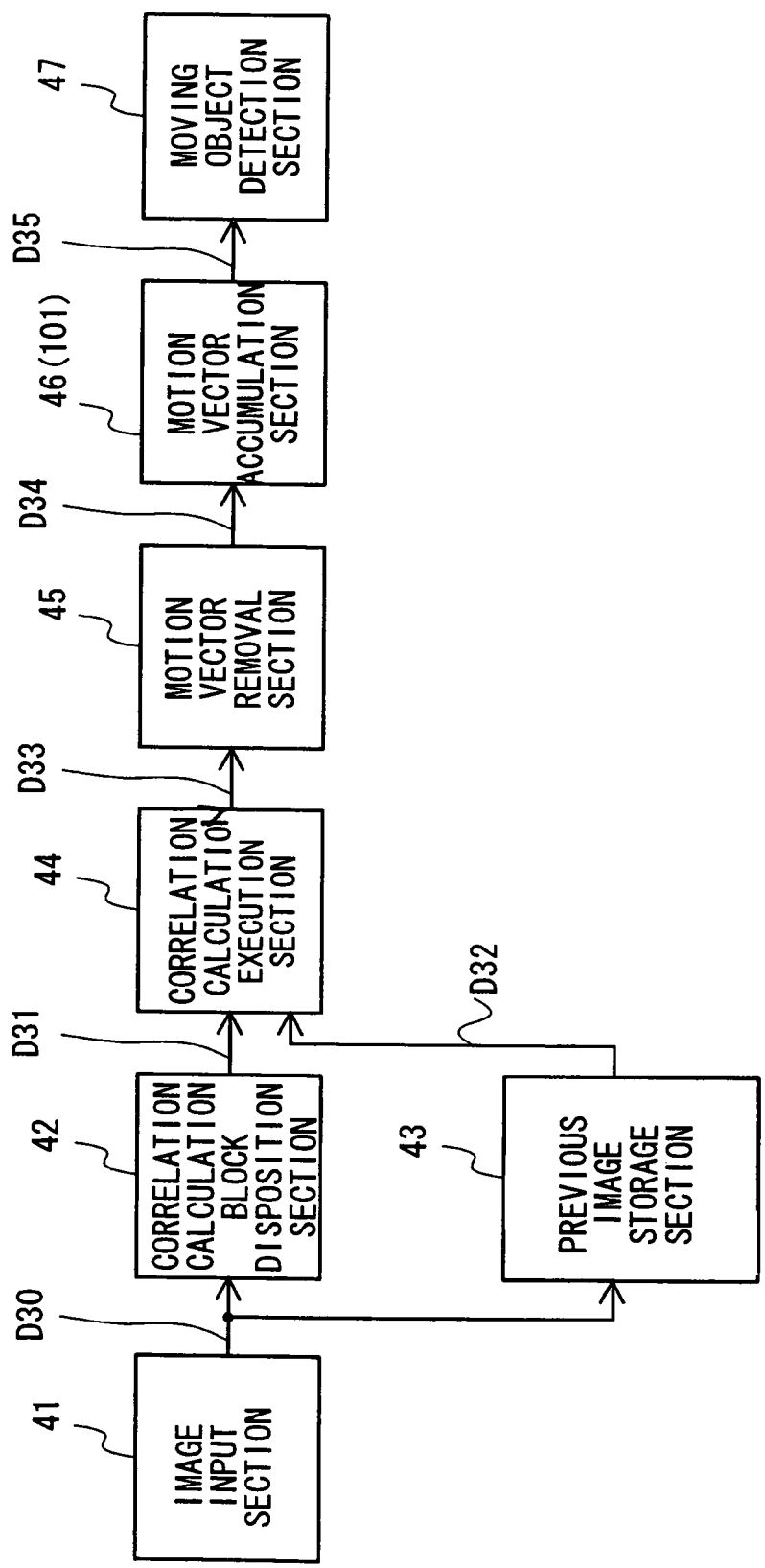
FIG. 1 is a block diagram showing the configuration of a moving object detection device in accordance with a first embodiment.

(1) First Embodiment (1-1) Configuration of Moving Object Detection Device According to First Embodiment In FIG. 1, the reference numeral 40 denotes a moving object detection device according to a first embodiment. The moving object detection device 40 for example is installed in surveillance systems such as video surveillance system. The moving object detection device 40 inputs image data D30 (image information) supplied from surveillance cameras (not shown) via an image input section 41 to a correlation calculation block disposition section 42 and a previous image storage section 43.

Figure 2:
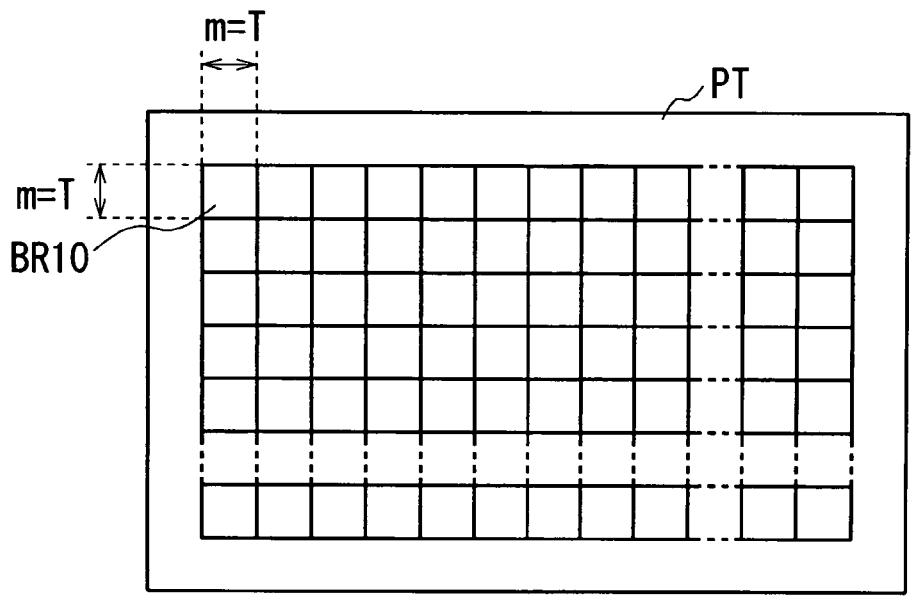
FIG. 2 is a schematic diagram showing the configuration of correlation calculation blocks.

As shown in FIG. 2, the correlation calculation block disposition section 42 disposes correlation calculation blocks BR10 (these blocks are indicated by ruled lines in FIG. 2) on the image PT corresponding to the supplied image data D30 in one of the following manners: the correlation calculation block disposition section 42 disposes the correlation calculation blocks BR10 all over the image PT; or the correlation calculation block disposition section 42 disposes the correlation calculation blocks BR10 on an intended part of image PT where the moving object detection device 40 will detect moving objects. The size of each correlation calculation block BR10 is m×m pixels. The correlation calculation blocks BR10 are placed with a distance of T pixels between them in vertical direction, and with a distance of T pixels between them in lateral direction. With the moving object detection device 40 according to the present embodiment, the correlation calculation blocks BR10 are placed with no space between them as shown in FIG. 2, since m is set to be equal to T.

The correlation calculation block disposition section 42 then sequentially supplies data of the correlation calculation blocks BR10 to a correlation calculation execution section 44 as correlation calculation block data D31. In this case, the correlation calculation block disposition section 42 disposes the correlation calculation block BR10 at its initial position in the image PT, with the same size and distance every frame.

The previous image storage section 43 for example is equivalent to frame memories. The previous image storage section 43 stores the image data D30 supplied from the image input section 41. After that, at the timing when the correlation calculation block data D31 is supplied from the correlation calculation block disposition section 42 to the correlation calculation execution section 44, the correlation calculation execution section 44 reads out parts of preceding frame's image data D30 which are the same size and position as the correlation calculation blocks BR10 from the previous image storage section 43. In this case, these parts of preceding frame's image data D30 are supplied to the correlation calculation execution section 44 as delayed image data D32.

The correlation calculation execution section 44 performs correlation calculation process for the correlation calculation block data D31 supplied form the correlation calculation block disposition section 42 and the delayed image data D32 read from the previous image storage section 43 to compute motion vectors of each correlation calculation block BR10.

Figure 3:
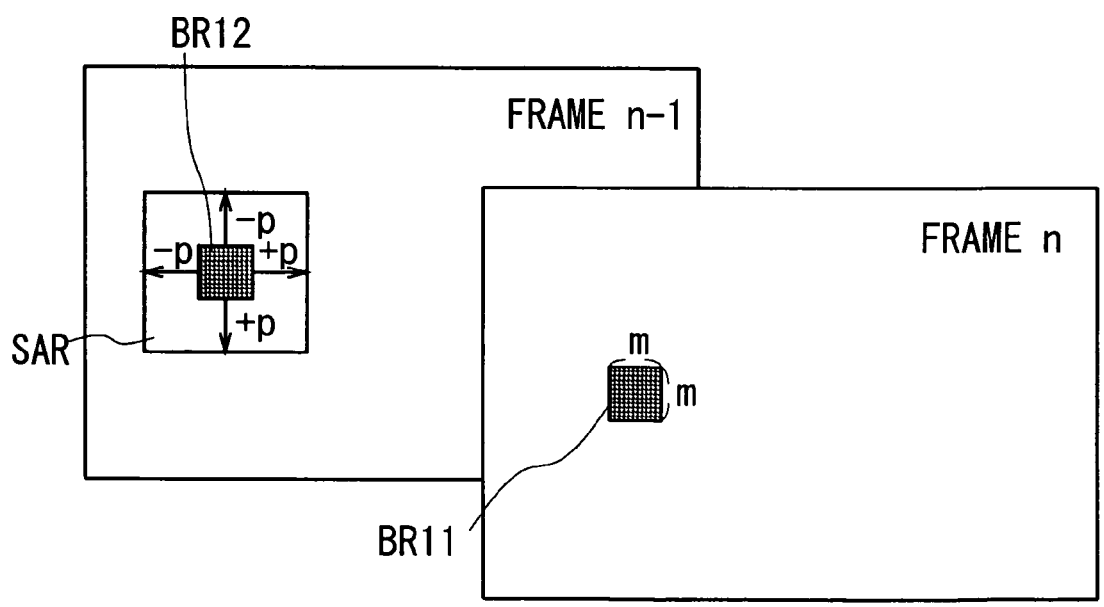
FIG. 3 is a schematic diagram explaining an example of correlation calculation.

In this correlation calculation process, as shown in FIG. 3, the correlation calculation execution section 44 calculates correlation between an local image area of frame nth which corresponds to the calculation-target correlation calculation block BR10 (this block BR10 will be referred to as a "reference block BR11") and an image area of preceding frame n−1th which is the same-size correlation calculation block (this block will be referred to as a "candidate block BR12") as the reference block BR11. This correlation calculation process is repeated for each candidate block BR12. The position of the candidate block BR12 having a maximum correlation gives a motion vector indicating the movements of object between the frames.

In this case, the correlation calculation is defined as follows:

$$D(h, v) = \sum_{X=1}^{m} \sum_{Y=1}^{m} |I_n(X, Y) - I_{n-1}(h + X, v + Y)|, -p \leq h \leq +p, \quad (1)$$
$$-p \leq v \leq +p$$

where $I_n$ is the image of frame nth, $I_{n-1}$ is the image of frame n−1th, and the size of correlation calculation block BR10 is m×m pixels. And in this case, the range where the process searches the motion vector is −p through +p in both vertical and lateral directions. This range is designated as a search area SAR in FIG. 3.

Figure 4:
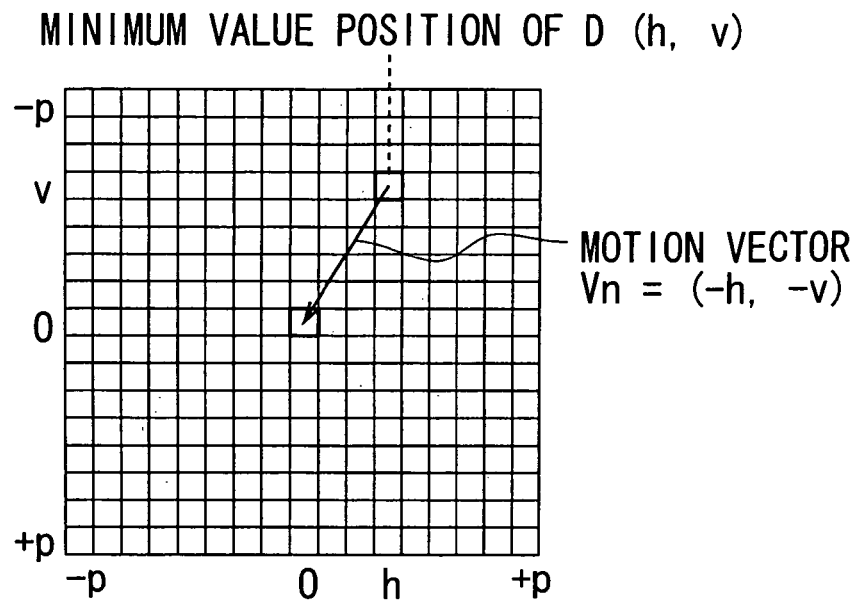
FIG. 4 is a schematic diagram showing a correlation map.

As a result, this process gives a two-dimensional correlation map D (h, v) as shown in FIG. 4. In this embodiment, the reference block BR11 has been set on the frame nth, and the candidate block BR12 has been set on the preceding frame n−1th. Accordingly, when the position (h, v) has the minimum value of D (h, v), the motion vector Vn is defined by the following, $$V_n = (-h, -v) \quad (2)$$

In this manner, the correlation calculation execution section 44 calculates the motion vector Vn on each correlation calculation block BR10 in the frame nth. The correlation calculation execution section 44 then supplies the motion vector Vn to a motion vector removal section 45 as motion vector information D33.

In this case, when one or some of the correlation calculation blocks BR10 have very low contrasts, the correlation calculation execution section 44 replaces the motion vectors Vn of these blocks BR10 with zero vectors, because it is difficult to calculate reliable motion vectors Vn from these blocks BR10. That is to say, these motion vectors Vn are defined by the following formula.

$$V_n = (X, Y) = (0, 0) \quad (3)$$

Figure 5:
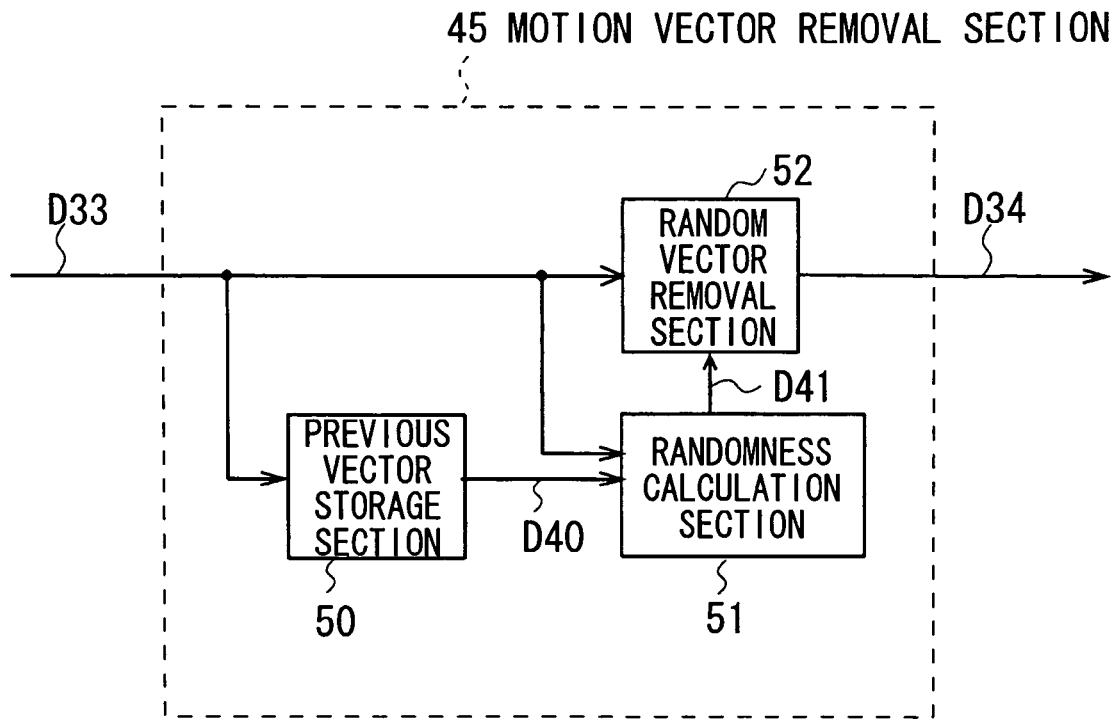
FIG. 5 is a block diagram showing the configuration of a motion vector removal section.

As shown in FIG. 5, the motion vector removal-section 45 includes: a previous vector storage section 50 for storing previous vector information D40 of each correlation calculation block BR10, the previous vector information D40 showing previous motion vectors that were obtained from the motion vector information D33; a randomness calculation section 51 for spatially and temporally calculating the randomness of the motion vector of each correlation calculation block BR10; and a random vector removal section 52 for removing the motion vector when this motion vector's randomness is greater than a predetermined threshold value.

Figure 6:
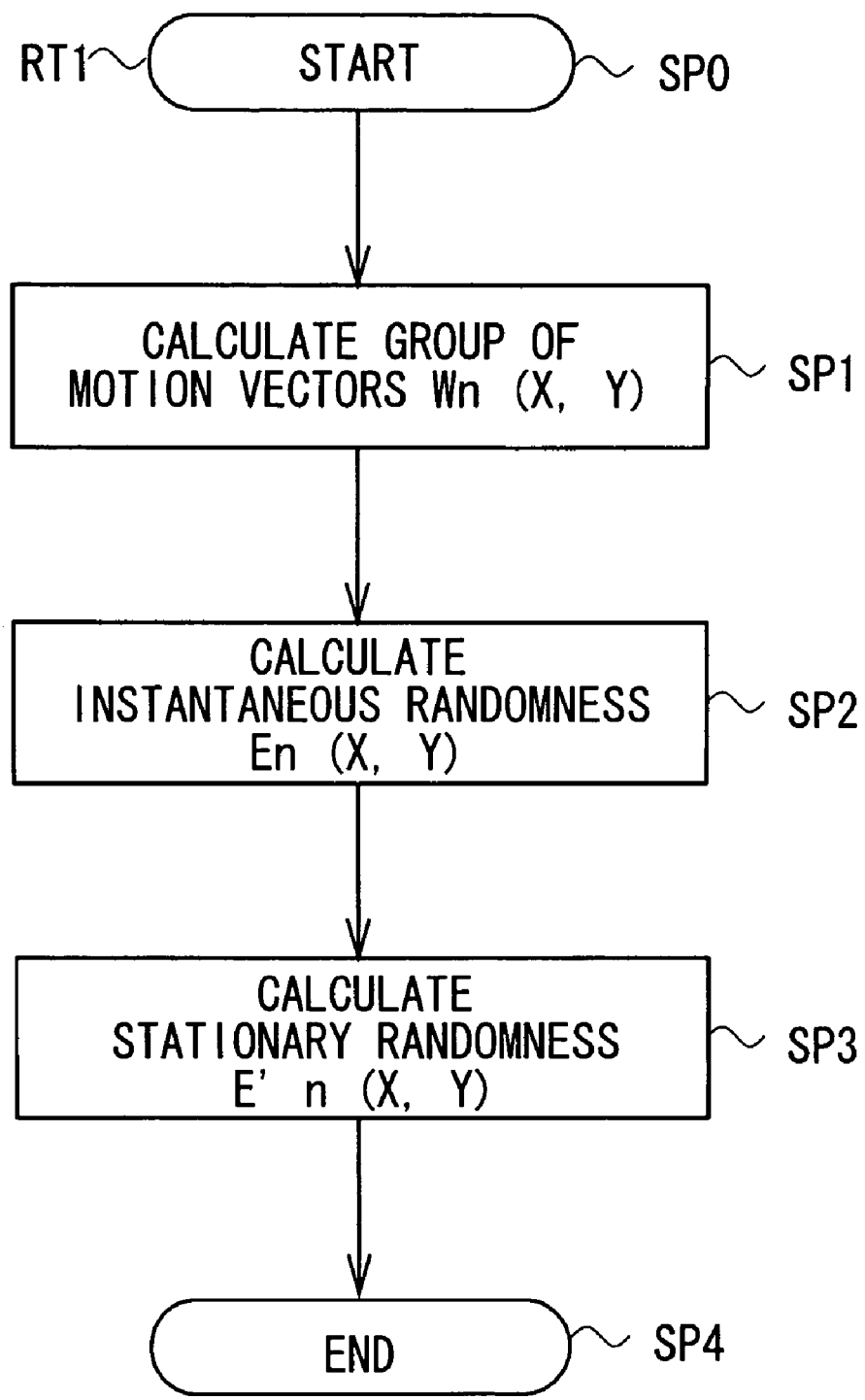
FIG. 6 is a flowchart showing a randomness calculation process.

As shown in FIG. 6, the randomness calculation section 51 calculates the randomness of the motion vector of each correlation calculation block BR10, based on the previous motion vector shown in the previous vector information D40 read from the previous vector storage section 50 and the current motion vector shown in the motion vector information D33 supplied from the correlation calculation execution section 44.

The randomness calculation section 51 starts a randomness calculation process RT1 (FIG. 6) from step SP0, each time when the data that corresponds to one of the correlation calculation blocks BR10 is supplies from the correlation calculation execution section 44 and at the same time the data that corresponds to one of the correlation calculation blocks BR10 is read from the previous vector storage section 50. And then the randomness calculation section 51 at step SP1 generates a group of motion vectors Wn (X, Y) that are spatially and temporally adjacent to the calculation-target motion vector Vn (X, Y) by $$W_n(X,Y)=(Vk(i,j)|X-T\leq i \leq X+T, Y-T\leq j \leq Y+T, n-1 \leq k \leq n) \quad (4)$$

where (X, Y) is the position of the motion vector, n indicates frames, and T shows the distance between the correlation calculation blocks BR10.

The randomness calculation section 51 subsequently proceeds to step SP2 to calculate the instantaneous randomness En (X, Y) that shows the spatial randomness of the motion vector Vn (X, Y) by $$E_n(X, Y) = \frac{S_n(X, Y)}{L_n(X, Y)} \quad (5)$$

where Ln (X, Y) is the value obtained by averaging norms (each norm corresponds to the absolute value of the magnitude of each motion vector included in the group of motion vectors Wn (X, Y)), and Sn (X, Y) is the value obtained by accumulating average deviations each of which corresponds to each motion vector's X and Y element in the group of motion vectors Wn (X, Y). In this case, Ln (X, Y) is greater than a predetermined constant value.

And then the randomness calculation section 51 proceeds to step SP3 to calculate the stationary randomness E'n (X, Y) that corresponds to the motion vector Vn (X, Y) by $$E'_n(X,Y)=(1-a)\cdot E'_{n-1}(X,Y)+a\cdot E_n(X,Y) \quad (6)$$

where a is set to be about 0.001 through 0.01. In this manner, to calculate the stationary randomness E'n (X, Y), the randomness calculation section 51 adds the stationary random E'n−1 (X,Y) of the previous frame n−1th to the instantaneous randomness En (X,Y) of the current frame nth after they are weighted. The randomness calculation section 51 subsequently proceeds to step SP4 to end the randomness calculation process RT1.

In this way, the randomness calculation section 51 calculates the instantaneous randomness En (X, Y) and stationary randomness E'n (X, Y) of the motion vector Vn (X, Y) of each correlation calculation block BR10. The randomness calculation section 51 then supplies the instantaneous randomness En (X, Y) and the stationary randomness E'n (X, Y) to the random vector removal section 52 as randomness information D41.

The random vector removal section 52 performs determination process for each correlation calculation block BR10. In this determination process, the random vector removal section 52 determines whether or not it should remove the motion vector of the correlation calculation block BR10, based on the instantaneous randomness En (X, Y) and stationary randomness E'n (X, Y) of motion vector Vn (X, Y) shown in the randomness information D41 supplied from the randomness calculation section 51.

Figure 7:
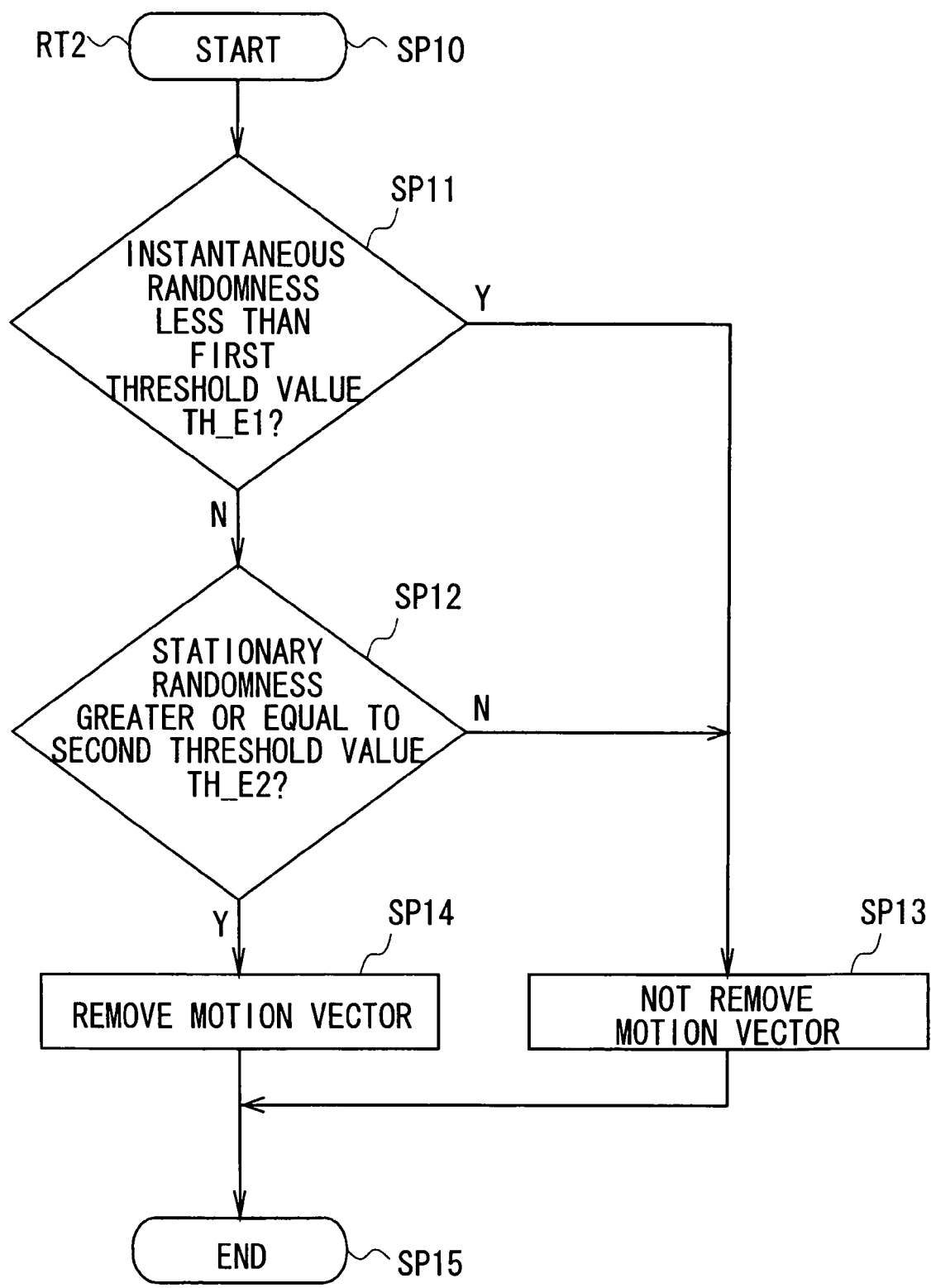
FIG. 7 is a flowchart showing a first motion vector removal determination process.

In this case, the random vector removal section 52 starts a first motion vector removal determination process RT2 from step SP10 (FIG. 7), each time when the data that correspond to one of the correlation calculation block BR10 are supplied from both the correlation calculation execution section 44 and the randomness calculation section 51 at the same time. The random vector removal section 52 subsequently proceeds to step SP11. At step SP11, with the motion vector Vn (X,Y), the random vector removal section 52 checks whether or not the following condition is met for the instantaneous randomness En (X, Y):

$$E_n(X,Y)<TH\_E1 \quad (7)$$

where TH_E1 is a first threshold value that was previously set for the instantaneous randomness En (X, Y). Affirmative result at step SP11 means that the instantaneous randomness En (X, Y) is less than the first threshold value TH_E1. In this case, the random vector removal section 52 proceeds to step SP13, and determines that it will not remove all the motion vectors that are spatially adjacent to the motion vectors Vn (X, Y). After that, the random vector removal section 52 proceeds to step SP15 to end the motion vector removal determination process RT2.

Negative result at step SP11 means that the instantaneous randomness En (X,Y) is greater than the first threshold value TH_E1. In this case, the random vector removal section 52 proceeds to step SP12. At step SP12, with the motion vector Vn (X, Y), the random vector removal section 52 checks whether or not the following condition is met for the stationary randomness E'n (X, Y):

$$E'_n(X,Y)\geq TH\_E2 \quad (8)$$

where TH_E2 is a second threshold value that was previously set for the stationary randomness E'n (X, Y). Negative result at step SP12 means that the stationary randomness E'n (X,Y) is less than the second threshold value TH_E2. In this case, the random vector removal section 52 proceeds to step SP13, and determines that it will not remove the motion vectors Vn (X, Y). After that, the random vector removal section 52 proceeds to step SP15 to end the motion vector removal determination process RT2.

Affirmative result at step SP12 means that the stationary randomness. E'n (X, Y) is greater or equal to the second threshold value TH_E2. In this case, the random vector removal section 52 proceeds to step SP14, and determines that it will remove the motion vectors Vn (X, Y). The random vector removal section 52 subsequently replaces the removal-target motion vector Vn (X, Y) with a zero vector using the above-noted formula (3), and then proceeds to step SP15 to end the first motion vector removal determination process RT2.

Figure 8:
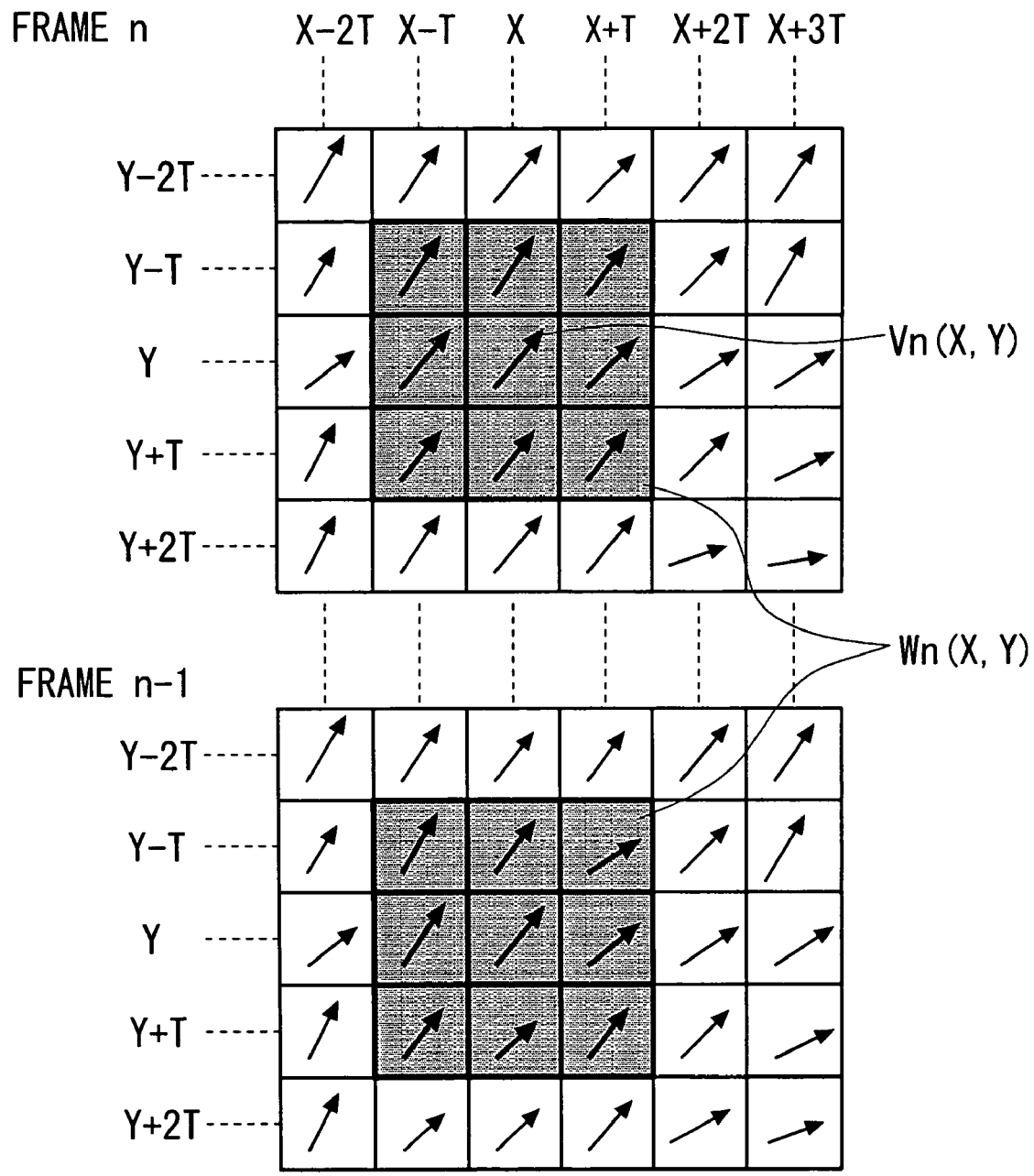
FIG. 8 is a schematic diagram explaining a group of motion vectors spatially and temporally adjacent to each other.

FIG. 8 shows the motion vector Vn (X, Y) and the group of motion vectors Wn (X, Y) by using hatchings. These motion vectors Wn (X, Y) are spatially and temporally adjacent to the motion vector Vn (X, Y) of the frame nth.

Figure 9:
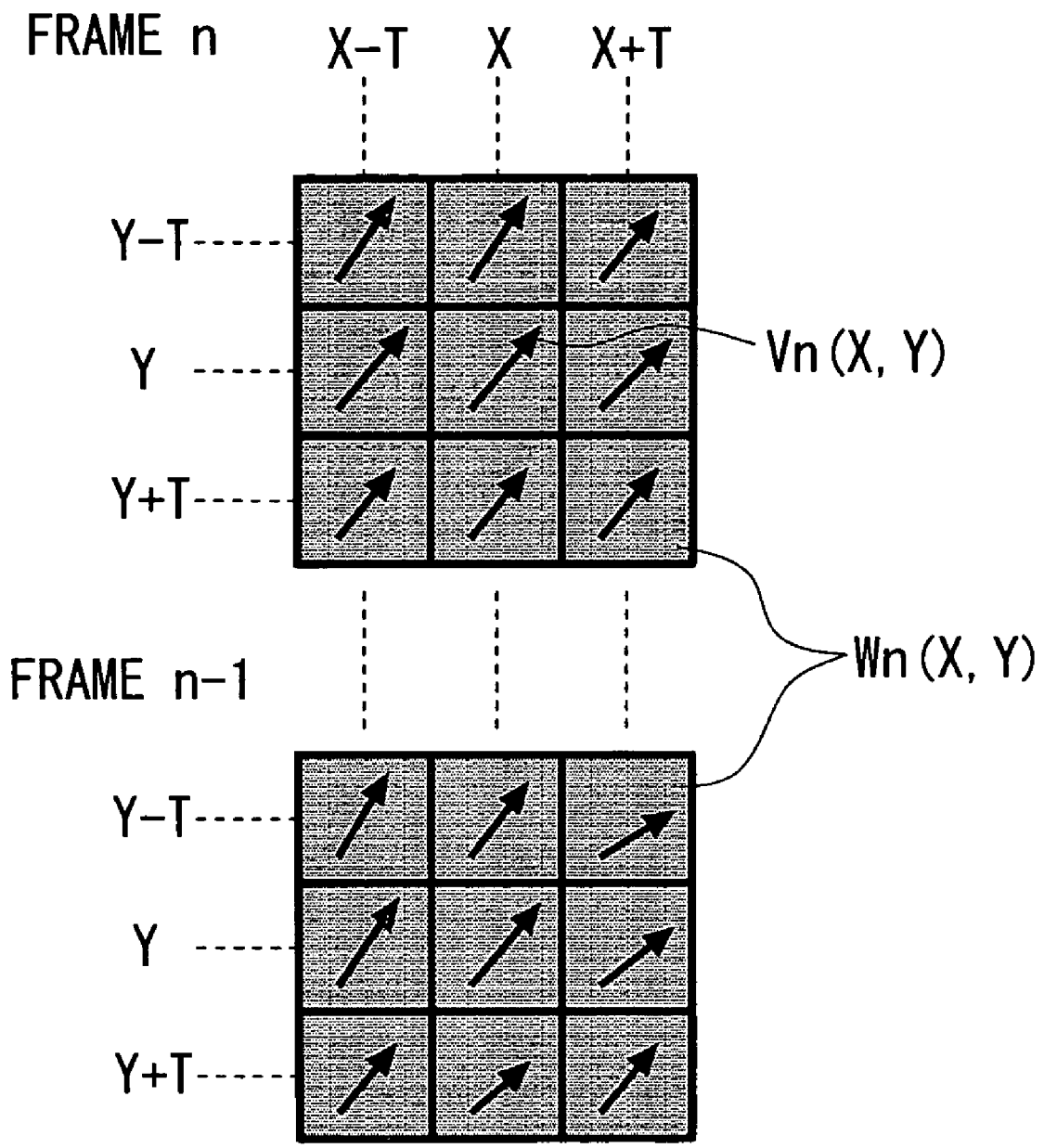
FIG. 9 is a schematic diagram explaining a group of motion vectors having spatially and temporally high uniformity.

In addition, as shown in FIG. 9, in the case in which the motion vector Vn (X, Y) is caused by moving objects such as human beings and vehicles, the motion vectors Wn (X, Y) that are spatially and temporally adjacent to the motion vector Vn (X, Y) are oriented in almost the same direction. This means that the uniformity of these motion vectors Wn (X, Y) is high and that their instantaneous randomness En (X, Y) is low as shown in FIG. 10A.

Figure 10:
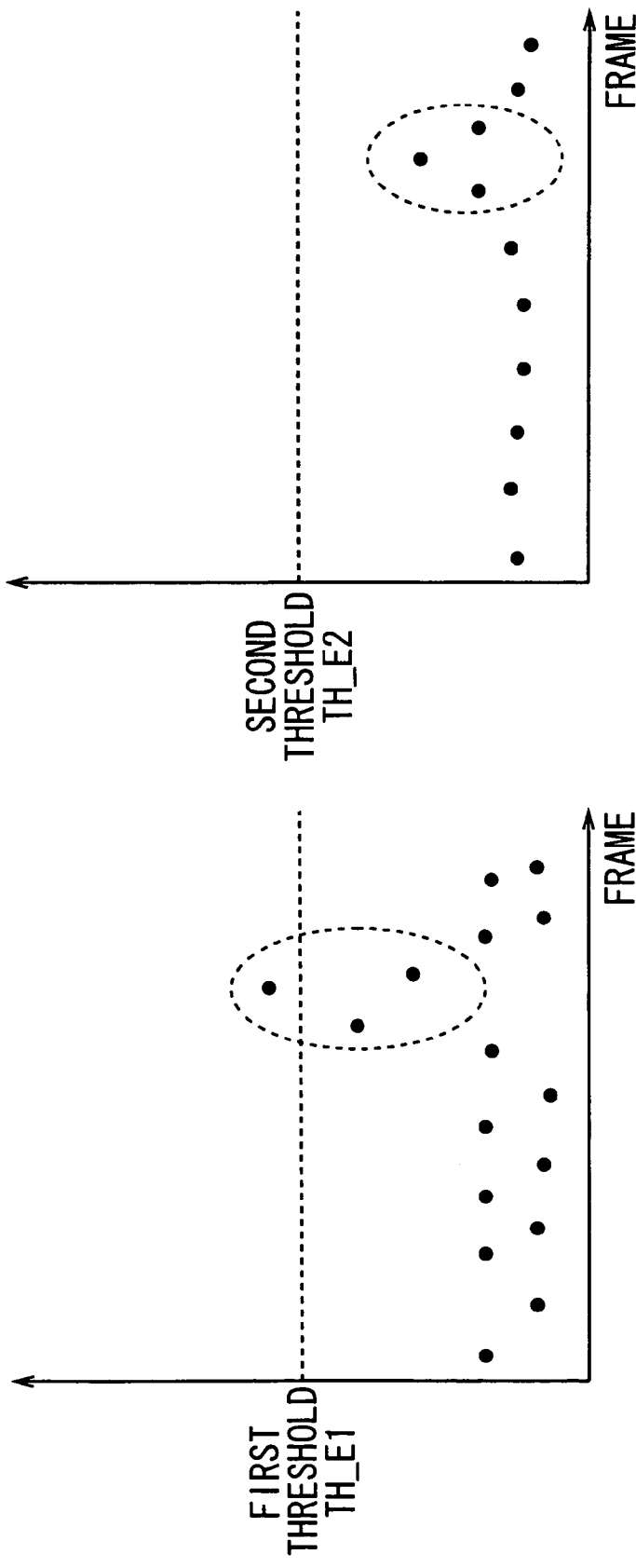
FIGS. 10A and 10B are graphs explaining instantaneous and stationary randomness of motion vectors arising from moving objects.

In the area surrounded by dotted line in FIG. 10A, the instantaneous randomness En (X, Y) becomes high for some reason. If it happens, that does not remain for a long time at the same position in the screen, and the stationary randomness E'n (X, Y) does not become high as shown in FIG. 10B by a circular-shaped dotted line. Thus, with the motion vectors caused by moving objects, the stationary randomness E'n (X, Y) does not become high even if the instantaneous randomness En (X, Y) becomes higher than the first threshold value TH_E1.

Accordingly, the random vector removal section 52 does not remove those motion vectors that are caused by moving objects, and supplies these motion vectors Vn (X, Y) of each correlation calculation block BR10 of the frame nth to a motion vector accumulation section 46 as non-removal vector information D34.

Figure 11:
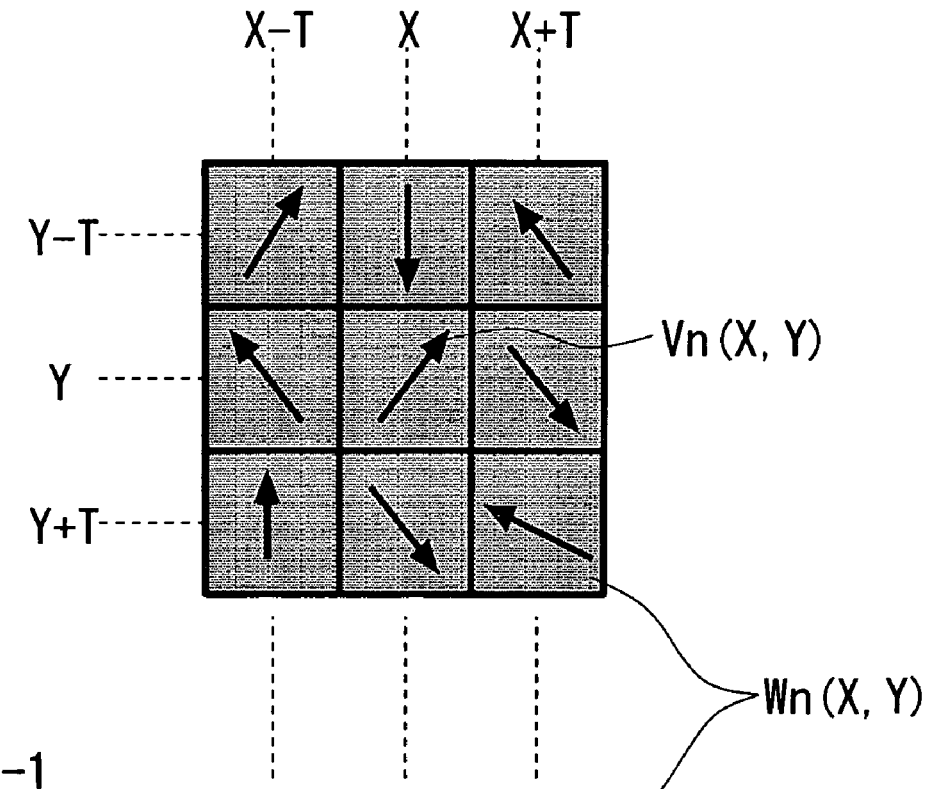
FIG. 11 is a schematic diagram explaining a group of motion vectors having spatially and temporally low uniformity.

By contrast, as shown in FIG. 11, in the case in which the motion vector Vn (X, Y) is caused by background change such as diffused reflection light caused by water waves and flags flying in the strong wind, the motion vectors Wn (X, Y) that are spatially and temporally adjacent to the motion vector Vn (X, Y) are oriented in different directions. This means that the uniformity of these motion vectors Wn (X, Y) is low. And with these motion vectors Wn (X, Y), the instantaneous randomness En (X, Y) becomes high as shown in FIG. 12A.

In addition, the motion vectors Vn (X, Y) caused by background change continue to occur in spatially the same area for some time. Therefore, the stationary randomness E'n (X, Y) also becomes high as shown in FIG. 12B. That is to say, with the motion vectors arising from background change, the instantaneous randomness En (X, Y) and the stationary randomness E'n (X, Y) become high.

Accordingly, the random vector removal section 52 removes those motion vectors arising from background change in order not to supply them to the motion vector accumulation section 46.

Figures 13A, 13B:
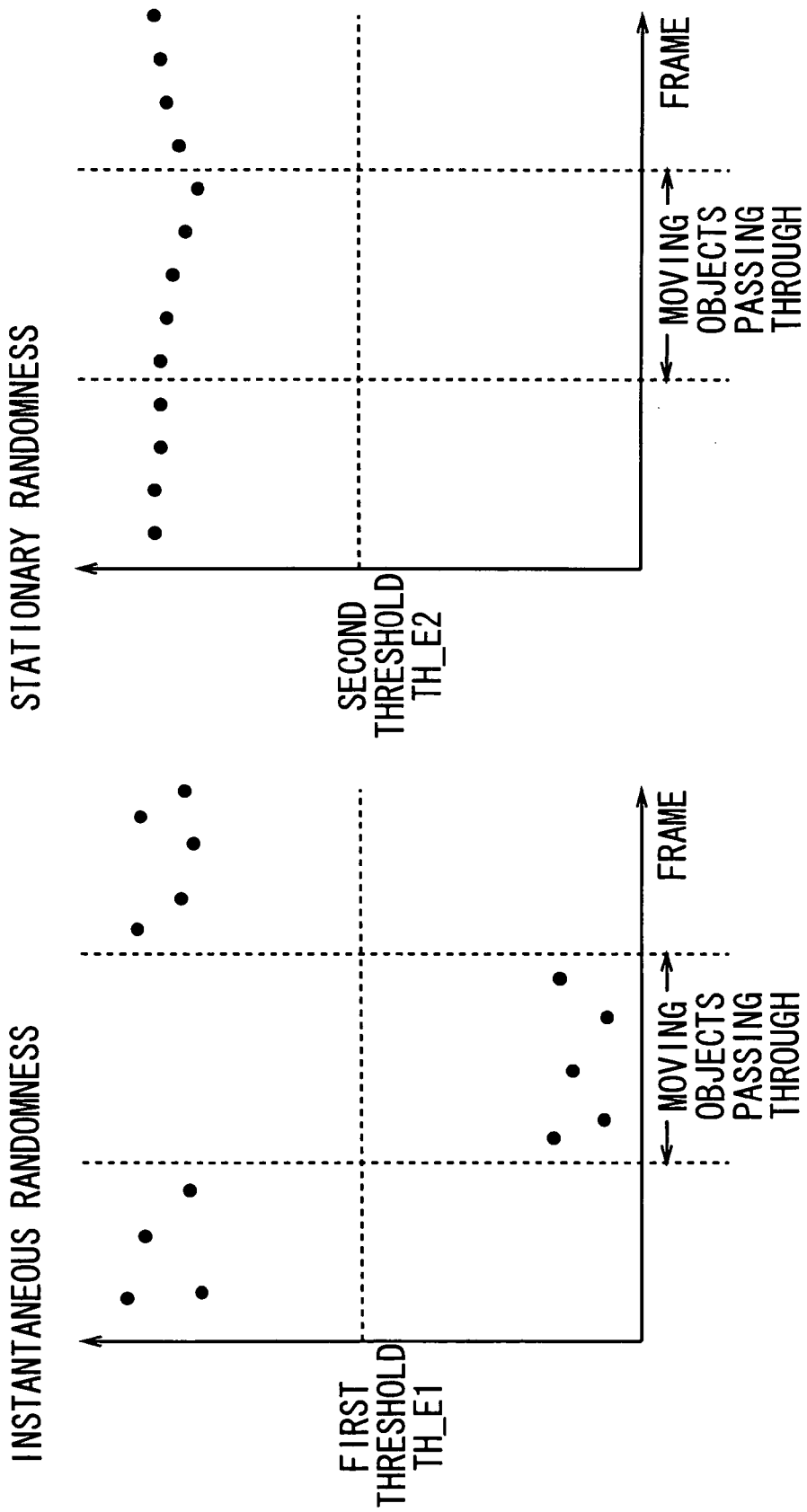
FIGS. 13A and 13B are graphs illustrating instantaneous and stationary randomness of motion vectors arising from moving objects covering background changes.

In the case in which the moving object covers the background change while passing through it, the stationary randomness E'n (X, Y) remains high as shown in FIG. 13B. As shown in FIG. 13A, the instantaneous randomness En (X, Y) becomes low while the background change is being covered with the moving object, and then it becomes high again when the background change appears after the moving object has passed through it, because the instantaneous randomness En (X, Y) is calculated based on the motion vectors arising from the moving object.

In this manner, in the case in which the moving object covers the background change while passing through it, the instantaneous randomness En (X, Y) becomes low. In this case, the random vector removal section 52 supplies the motion vectors Vn (X, Y) of each correlation calculation block BR10 of the frame nth to the motion vector accumulation section 46 as non-removal vector information D34, without removing the motion vectors caused by the moving object.

In this way, the random vector removal section 52 removes the motion vectors Wn (X, Y) that are arising from background change and having high randomness, without removing the motion vectors that are arising from the moving object. In this manner, the random vector removal section 52 previously and effectively prevents the moving object detection device 40 from confusing the motion vectors arising from background change with the motion vectors arising from moving objects.

Figure 14:
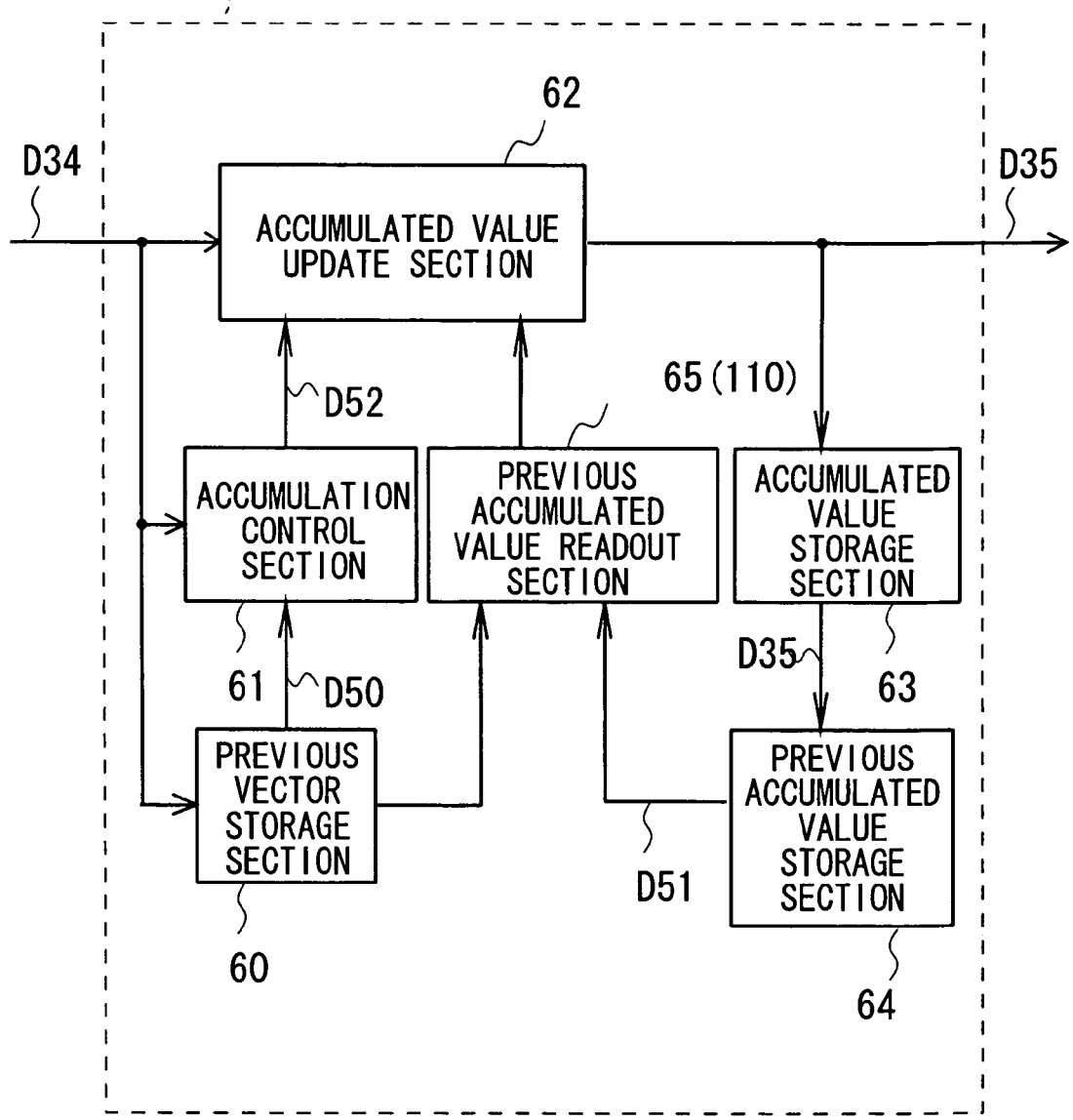
FIG. 14 is a block diagram showing the configuration of a motion vector accumulation section.

As shown in FIG. 14, the motion vector accumulation section 46 includes: a previous vector storage section 60 for storing non-removal previous vector information D50 of each correlation calculation block BR10, the non-removal previous vector information D50 showing previous motion vectors that are obtained from the non-removal vector information D34; an accumulation control section 61 for determining whether updating or resetting the accumulated value and accumulated number of times about the motion vector of each correlation calculation block BR1; an accumulated value update section 62 for updating the accumulated value and accumulated number of times about the motion vector; an accumulated value storage section 63 for storing the accumulated value and accumulated number of times about the motion vector after they are updated; a previous accumulated value storage section 64 for storing previous vector accumulation information D51 of the motion vectors, the previous vector accumulation information D51 showing the previous accumulated value and accumulated number of times (these value and number have already been updated); and a previous accumulated value readout section 65 for reading out the previous accumulated value and accumulated number of motion vectors.

In this case, the accumulation control section 61 controls whether resetting or continuing the accumulation, based on the previous vector shown in the non-removal previous vector information D50 read from the previous vector storage section 60 and the current motion vector indicated by the non-removal vector information D34 supplied from the motion vector removal section 45.

For example, when the motion vector of a correlation calculation block BR10 is equal to "0" over a certain number of frames (for 0.5 seconds, for example), the accumulation control section 61 determines that this correlation calculation block BR10 does not have movements, and then orders the accumulation value update section 62 to reset the accumulated value and accumulated number of the motion vector by supplying accumulation control information D52.

Otherwise, the accumulation control section 61 determines that the corresponding correlation calculation block BR10 has movements, and then orders the accumulation value update section 62 to update the accumulated value and accumulated number of the motion vector by supplying accumulation control information D52.

In response to the accumulation control information D52 supplied from the accumulation control section 61, the accumulated value update section 62 updates the previous vector accumulation information D51 of each correlation calculation block BR10. This previous vector accumulation information D51 is supplied from the previous accumulated value storage section 64 via the previous accumulated value readout section 65.

When receiving from the accumulation control section 61 the accumulation control information D52 that orders the accumulated value update section 62 to reset, the accumulated value update section 62 resets the previous vector accumulation information D51 stored in the previous accumulated value storage section 64 as follows:

$$ACC_n(X,Y)=(0,0) \tag{9}$$

$$CNT_n(X,Y)=0 \tag{10}$$

That is to say, the accumulated value update section 62 resets the accumulated value and accumulated number that have been calculated so far for the motion vector of the presently-targeted correlation calculation block BR10. In these formulas (9) and (10), (X, Y) is the position coordinate of the corresponding correlation calculation block BR10, ACCn indicates the accumulated value that has been accumulated so far for the motion vector of the correlation calculation block BR10 of the frame nth, and CNTn indicates the accumulated number of times of motion vectors that has been counted until reaching the frame nth.

By contrast, when receiving from the accumulation control section 61 the accumulation control information D52 that orders the accumulated value update section 62 to update, the accumulated value update section 62 updates the previous vector accumulation information D51 stored in the previous accumulated value storage section 64 as follows:

$$ACC_n(X,Y)=ACC_{n-1}(X-h,Y-v)+V_n(X,Y) \quad (11)$$

$$CNT_n(X,Y)=CNT_{n-1}(X-h,Y-v)+1 \quad (12)$$

That is to say, the accumulated value update section 62 updates the accumulated value and accumulated number that have been calculated so far for the motion vector of the presently-targeted correlation calculation block BR10. In this case, the motion vector Vn represents the motion vector of the correlation calculation block BR10 of the frame nth. This motion vector is obtained from the non-removal vector information D33. The Vn (x, y) is defined as follows:

$$V_n(X,Y)=(-h,-v) \quad (13)$$

In this manner, the accumulated value update section 62 updates (in this case, the word "update" includes the meaning of "reset") the previous vector accumulation information D51 of each correlation calculation block BR10, in response to the accumulation control information D52 supplied from the accumulation control section 61 (the previous vector accumulation information D51 is supplied from the previous accumulated value storage section 64 via the previous accumulated value readout section 65). And then, the accumulated value update section 62 supplies the accumulated value and accumulated number of motion vectors that have been updated to a moving object detection section 47 and the accumulated value storage section 63 as updated vector accumulation information D35.

The accumulated value storage section 63 stores the updated vector accumulation information D35 supplied from the accumulated value update section 62. Each time when the update of the accumulated values and accumulated numbers of all correlation calculation blocks BR10 in one frame is completed, the accumulated value storage section 63 supplies to the previous accumulated value storage section 64 the previous vector accumulation information D51 showing all the updated vector accumulation information D35 of each correlation calculation block BR10.

The previous accumulated value readout section 65 reads out the previous vector accumulation information D51 from the previous accumulated value storage section 64. That is to say, the previous accumulated value readout section 65 reads out the accumulated value $ACC_{n-1}$ ($\alpha$, $\beta$) and accumulated number $CNT_{n-1}$ ($\alpha$, $\beta$) of the motion vector of the presently-targeted correlation calculation block BR10, and supplies them to the accumulated value update section 62. In this case, ($\alpha$, $\beta$) is the position of the correlation calculation block BR10 that is the source of update for the accumulated value and number.

In this case, after calculating the current motion vector in the update-target correlation calculation block BR10 by using the above-noted formula (13), the previous accumulated value readout section 65 selects the source-of-update correlation calculation block BR10 whose frame n–1th's motion vector is very close to the current motion vector (i.e., the frame nth's motion vector Vn (X, Y)) from a group of correlation calculation blocks BR10 located at a position (X–h, Y–v) and around the position.

That is to say, the previous accumulated value readout section 65 assumes that the moving object would not change its direction suddenly. And then the previous accumulated value readout section 65 spatially moves its focus from the position (X, Y) of the correlation calculation block BR10 in accordance with the motion vector, and then the focus is placed on the correlation calculation blocks BR10 located at the position (X–h, Y–v) and around it. The previous accumulated value readout section 65 subsequently calculates difference between the motion vectors of those correlation calculation blocks BR10 of the preceding frame n–1th and the frame nth's motion vector located at the position (X, Y) (the motion vectors of those correlation calculation blocks BR10 of the preceding frame n–1th have been stored in the previous vector storage section 60).

Based on the calculation result, the previous accumulated value readout section 65 selects the correlation calculation block BR10 that has a minimum difference norm, such that this block BR10 takes over the previous accumulated value and accumulated number of times. The previous accumulated value readout section 65 then reads out from the previous accumulated value storage section 64 the previous accumulated value and accumulated number corresponding to the selected correlation calculation block BR10, and supplies them to the accumulated value update section 62.

When the accumulated value update section 62 does not perform reset for each correlation calculation block BR10, the accumulated value update section 62 updates the accumulated value and accumulated number of the motion vector of the presently-targeted correlation calculation block BR10 by using the motion vector obtained by performing calculation on the frame nth, such that this presently-targeted correlation calculation block BR10 takes over the accumulated value and accumulated number of the motion vector of the correlation calculation block BR10 that is spatially the distance of the magnitude of that motion vector away from the presently-targeted correlation calculation block BR10 in the direction opposite to that motion vector. This process sequentially computes the accumulated value and accumulated number of each motion vector by separately and temporally accumulating each motion vector. In this manner, the accumulated value update section 62 can move the feature quantity values (equivalent to the accumulated value and accumulated number of motion vectors) in conjunction with the movement of the moving object and sequentially update them, without moving the correlation calculation blocks BR10.

Figure 15:
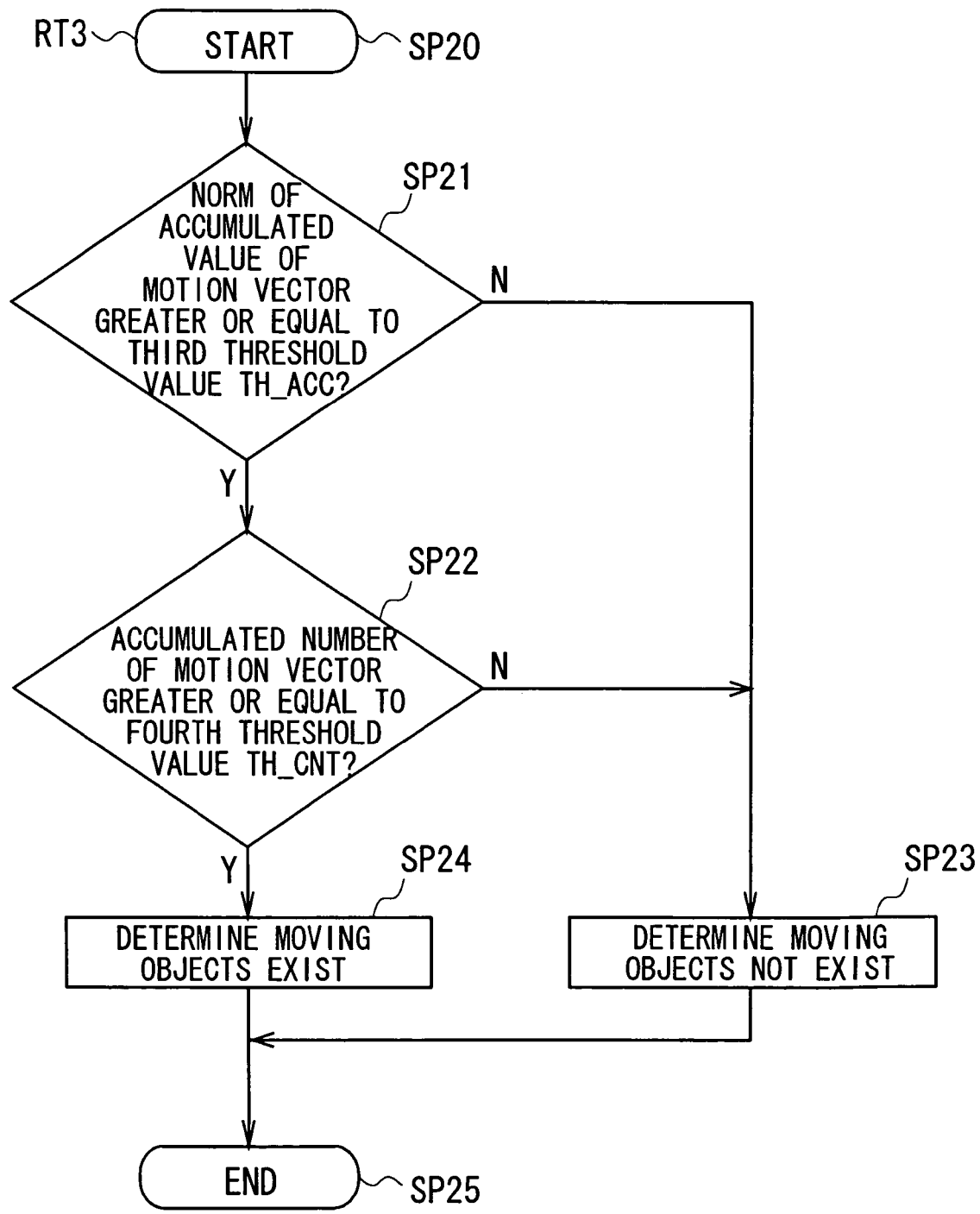
FIG. 15 is a flowchart showing a moving object detection process.

The moving object detection section 47 detects the moving object in the image corresponding to the image data D20 (FIG. 1) input from the image input section 41 (FIG. 1) in accordance with a first moving object detection process RT3 shown in FIG. 15. In this process, the moving object detection section 47 utilizes the temporally accumulated value and temporally accumulated number of each correlation calculation block BR10 (these values and numbers are indicated by the non-removal vector accumulation information D34 supplied from the motion vector accumulation section 46).

Each time one of the correlation calculation blocks BR10 is supplied from the motion vector accumulation section 46, the moving object detection section 47 starts the moving object detection process RT3 from step SP20. The moving object detection section 47 then moves to next step SP21 to check whether or not the following condition is met for the norm of the accumulated value of the motion vector:

$$|ACC_n(X,Y)| \geq TH\_ACC \quad (14)$$

where TH_ACC is a predetermined third threshold value for the norm of the accumulated value. Negative result at step SP21 means that the norm of the accumulated value of the motion vector is less than the third threshold value TH_ACC. In this case, the moving object detection section 47 proceeds to step SP23, and determines that this correlation calculation block BR10 does not include the moving object. After that, the moving object detection section 47 proceeds to step SP25 to end the moving object detection process RT3.

By contrast, affirmative result at step SP21 means that the norm of the accumulated value of the motion vector is greater or equal to the third threshold value TH_ACC. In this case, the moving object detection section 47 proceeds to step SP22 to check whether or not the following condition is met for the accumulated number of times of the motion vector:

$$CNT_n(X,Y) \geq TH\_CNT \qquad (15)$$

where the TH_CNT is a predetermined fourth threshold value for the accumulated number. Negative result at step SP22 means that the accumulated number of the motion vector is less than the fourth threshold value TH_CNT. In this case, the moving object detection section 47 proceeds to step SP23, and determines that this correlation calculation block BR10 does not include the moving object. After that, the moving object detection section 47 proceeds to step SP25 to end the moving object detection process RT3.

By contrast, affirmative result at step SP22 means that the accumulated number of the motion vector is greater or equal to the fourth threshold value TH_CNT. In this case, the moving object detection section 47 proceeds to step SP24, and determines that this correlation calculation block BR10 includes the moving object. After that, the moving object detection section 47 proceeds to step SP25 to end the moving object detection process RT3.

In this manner, to detect the moving object in the image, the moving object detection section 47 determines whether or not the motion vectors correspond to the moving object, based on the each motion vector's accumulated number and accumulated value that were calculated by the motion vector accumulation section 46.

As described above, the moving object detection device 40 detects moving objects in the following manner: the motion vector removal section 45 removes the motion vectors arising from background changes (i.e., the motion vectors having high randomness); and then the motion vector accumulation section 46 and the moving object detection section 47 distinguish differences, which were not detected by the motion vector removal section 45, between the motion vectors arising from background changes and the motion vectors arising from moving objects.

In addition, the moving object detection device 40 separately and temporally calculates the accumulated value and number for each motion vector that is left by the motion vector removal section 45. That tremendously cuts down on the amount of computation in the motion vector accumulation section 46 and the moving object detection section 47.

Figure 16:
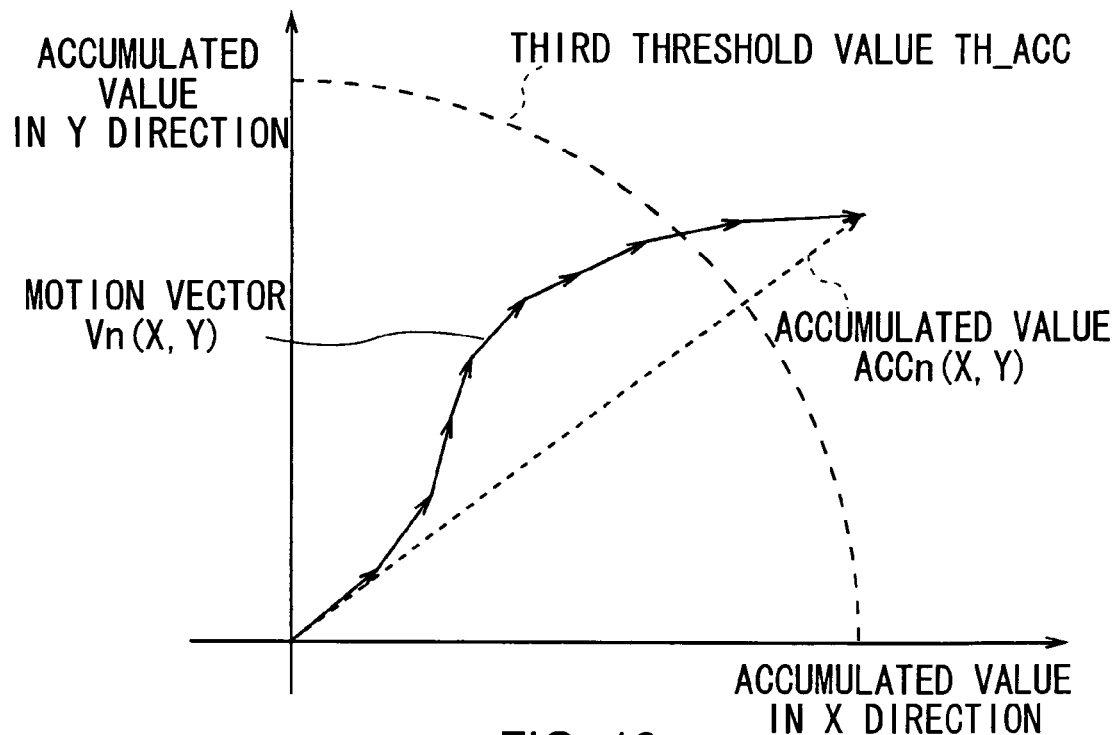
FIG. 16 is a schematic diagram explaining accumulation of motion vectors arising from human beings or cars.

FIG. 16 shows the accumulation result of the motion vector of moving objects such as human beings and vehicles. In FIG. 16 (and FIG. 17 through FIG. 19), an arrow indicates a motion vector in a certain frame. While object such as human beings or vehicles is moving, the motion vectors continue to be almost the same magnitude and same direction for some time. In this case, the moving object detection section 47 can detect this moving object by performing the moving object detection process RT3.

Figure 17:
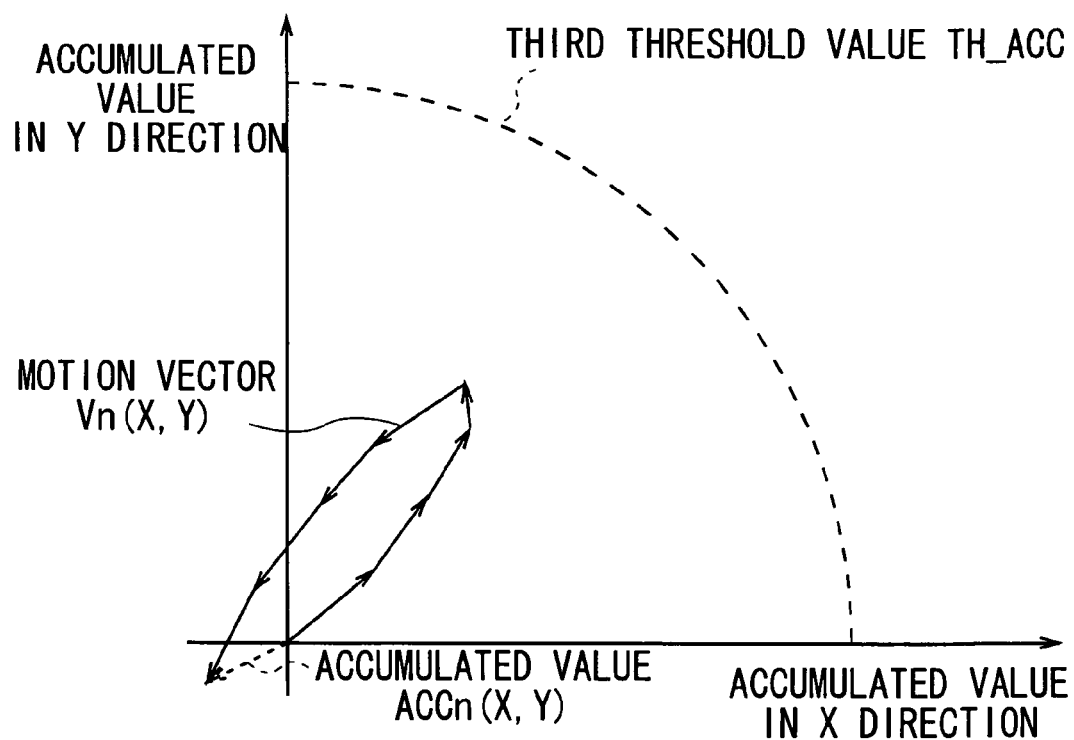
FIG. 17 is a schematic diagram explaining accumulation of motion vectors arising from vibrating backgrounds.

By contrast, FIG. 17 shows the accumulation result of the motion vectors arising from vibrating background such as trees trembling in the wind. As particularly evident in FIG. 17, while object is moving in vibrating manner, the norm of the accumulated value of the motion vector does not become high, which is to say the norm of the accumulated value of the motion vector does not exceed the third threshold value TH_ACC. Accordingly, the moving object detection section 47 does not recognize these results as moving objects.

Figure 18:
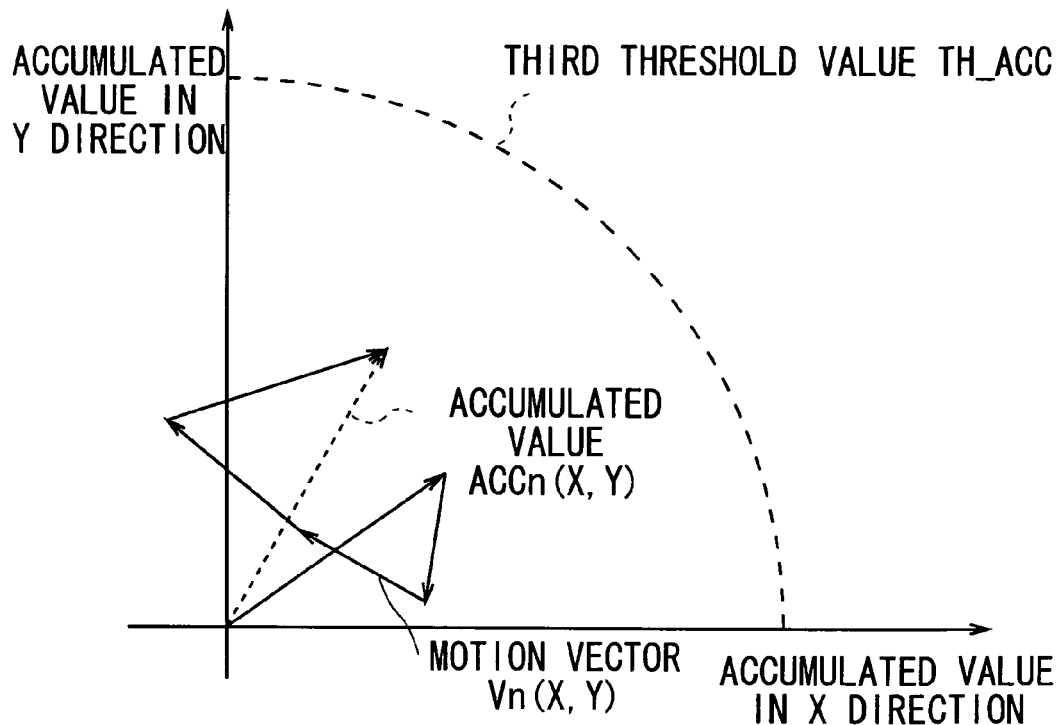
FIG. 18 is a schematic diagram explaining accumulation of motion vectors caused by short time of random movements.

FIG. 18 shows the accumulation result of the motion vectors that are moving randomly in short period of time, such as motion vectors arising from diffused reflection of headlight in the night. In this case, the norm of the accumulated value of the motion vector does not become high, which is to say the norm of the accumulated value of the motion vector does not exceed the third threshold value TH_ACC. Accordingly, the moving object detection section 47 does not recognize these results as moving objects.

Figure 19:
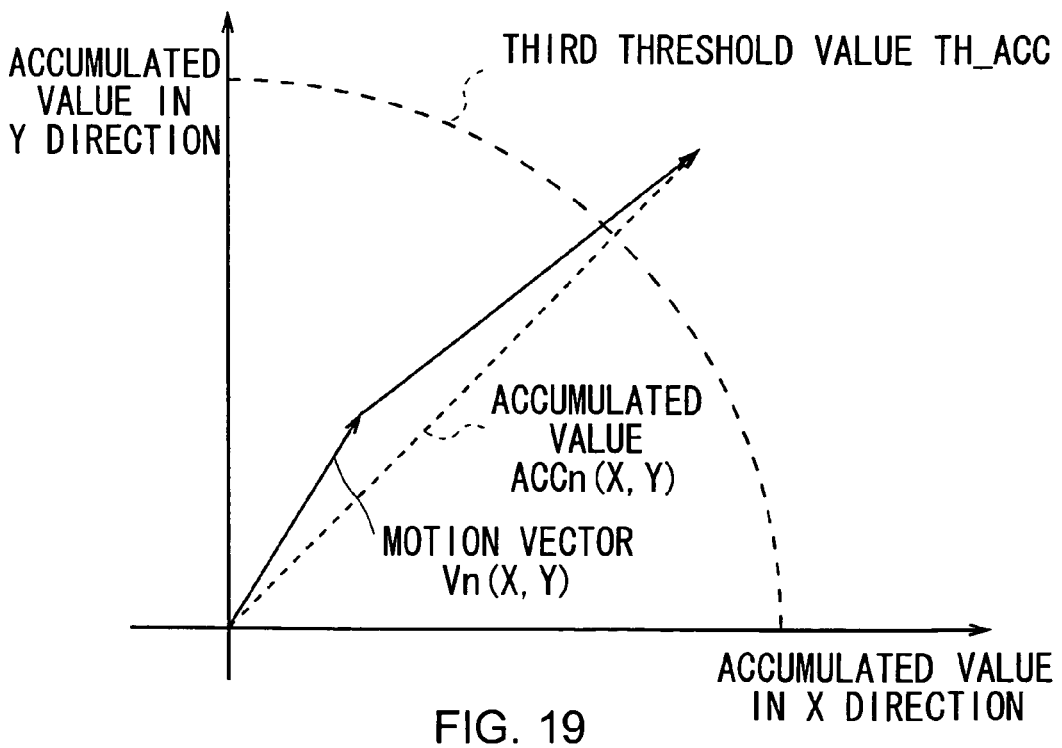
FIG. 19 is a schematic diagram explaining accumulation of motion vectors caused by instantaneous illumination changes.

FIG. 19 shows the accumulation result of the motion vectors arising from sudden change of illumination, such as turning on/off lights. When the sudden change of illumination occurs, the norm of the accumulated value may exceed the third threshold value TH_ACC. If that occurs, this motion vector would rapidly disappear (within some couple of frames, for example), and the accumulated number of the motion vector would not exceed the fourth threshold value TH_CNT. Accordingly, the moving object detection section 47 does not recognize these results as moving objects.

Thus, it is seen that the moving object detection device 40 can accurately detect moving objects in images, because it first removes the motion vectors having high randomness (this excludes the influence of random noise arising from flags flying in the strong wind, the installation of surveillance cameras in the environment where illuminations are not sufficiently bright, or the like) and then distinguishes differences between moving objects and other movements (such as diffused reflections of headlights in the night, trees trembling in the wind, turning on/off lights, or the like) by using the accumulated value and accumulated number of each motion vector.

Figure 20:
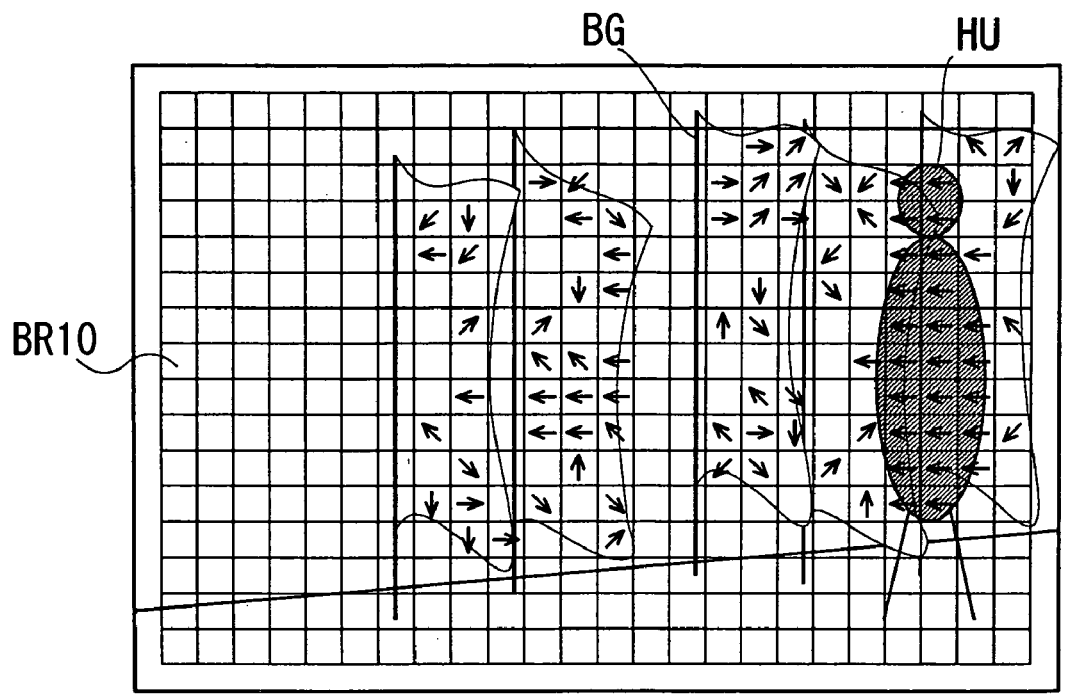
FIG. 20 is a schematic diagram explaining moving objects overlapping with moving backgrounds in the present embodiments.

FIG. 20 shows a person HU passing through the background BG where flags on the side of roads are flying in the strong wind and such a situation will be described below.

FIG. 20 shows the situation in which the person HU is passing through the background BG where flags on the side of roads are flying in the strong wind. The correlation calculation blocks BR10 are disposed all over the screen, including both the motion vectors arising from the person HU and the motion vectors arising from the movements of the background BG. FIG. 20 shows all the motion vectors calculated by the correlation calculation execution section 44 excepting zero vectors.

Figure 21:
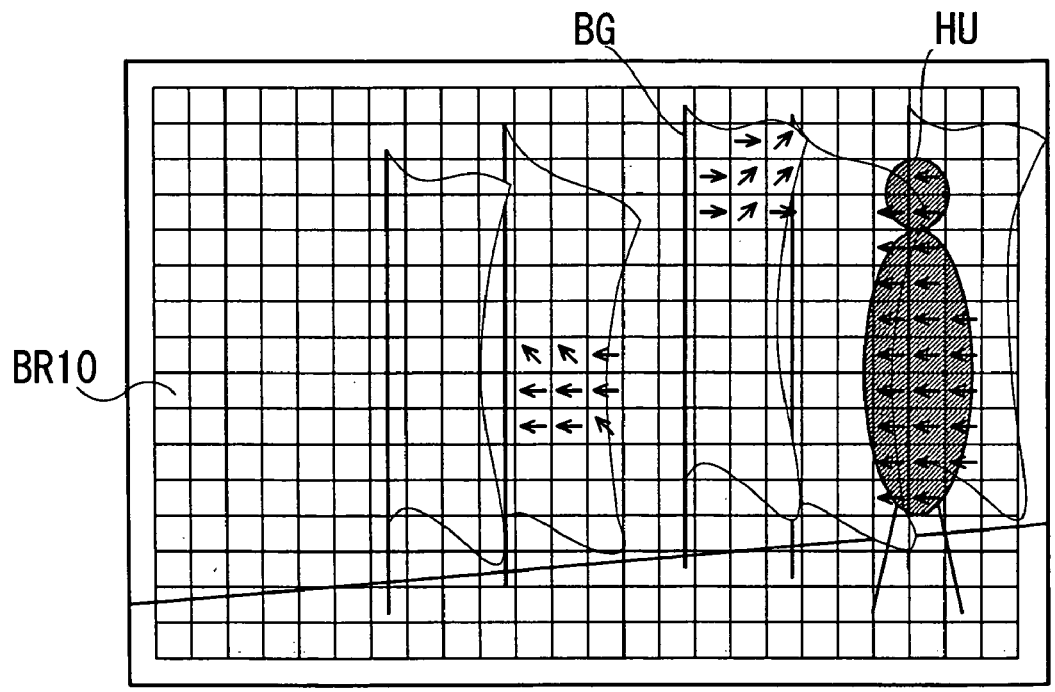
FIG. 21 is a schematic diagram explaining a removal of high-randomness motion vectors by a motion vector removal section.

After the motion vector removal section 45 has removed the motion vectors having high randomness from the screen shown in FIG. 20, most of the motion vectors arising from the movements of background BG disappear as shown in FIG. 21, because the instantaneous randomness and stationary randomness of those motion vectors are high.

In the area where the background BG is not covered with the person HU, the stationary randomness is greater than the second threshold value TH_E2, because the motion vectors are arising from the movements of background BG. When the person HU comes into the area and covers the background BG, the instantaneous randomness becomes smaller than the first threshold value TH_E1, because this instantaneous randomness is affected by the motion vectors arising from the movements of the person HU. Accordingly, the motion vector removal section 45 does not remove the motion vectors arising from the person HU, and supplies them to the vector accumulation section 46.

In this manner, the moving object detection device 40 according to the present embodiment evaluates both instantaneous randomness and stationary randomness for each correlation calculation block BR10. That allows the moving object detection device 40 to detect moving objects, even if the moving objects and the moving backgrounds are overlapped with each other.

Figure 22B:
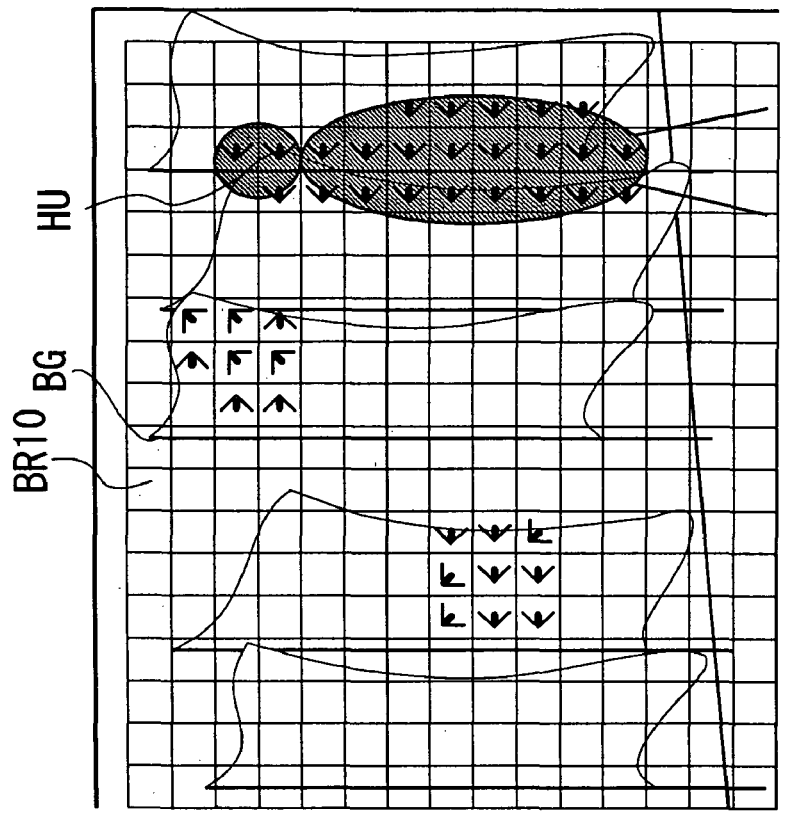
FIGS. 22A and 22B are schematic diagrams illustrating a variation with time of motion vectors in a first embodiment.
Figure 22A:
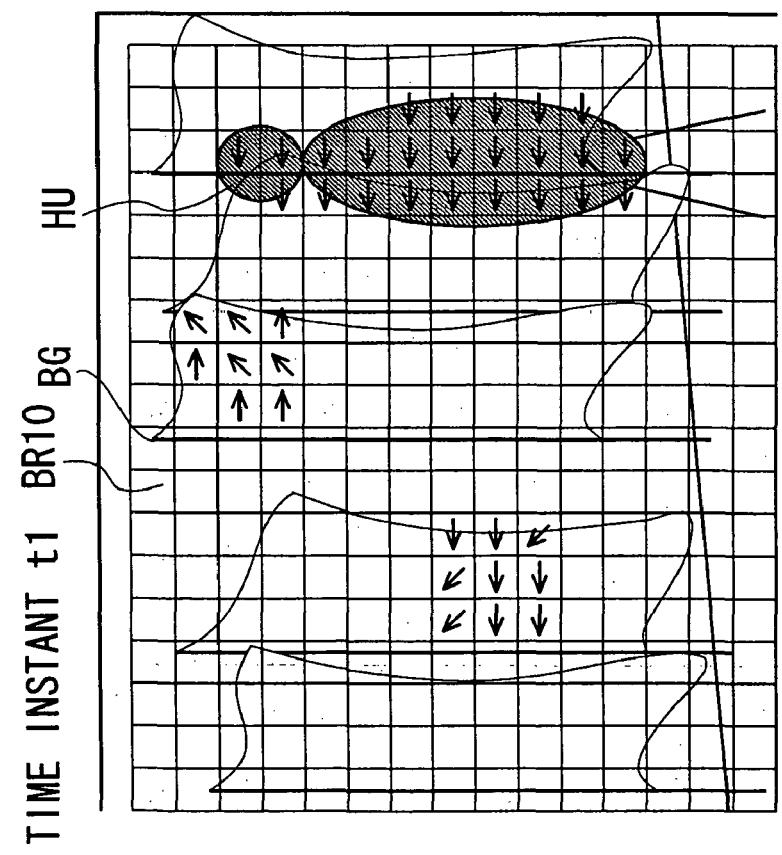
Figure 23B:
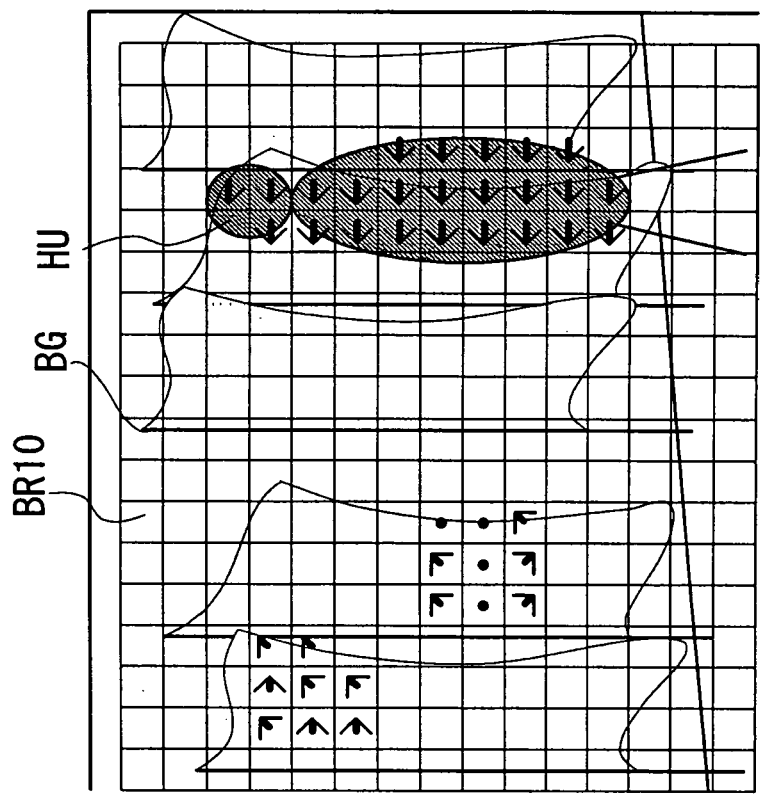
FIGS. 23A and 23B are schematic diagrams illustrating a variation with time of motion vectors in a first embodiment.
Figure 23A:
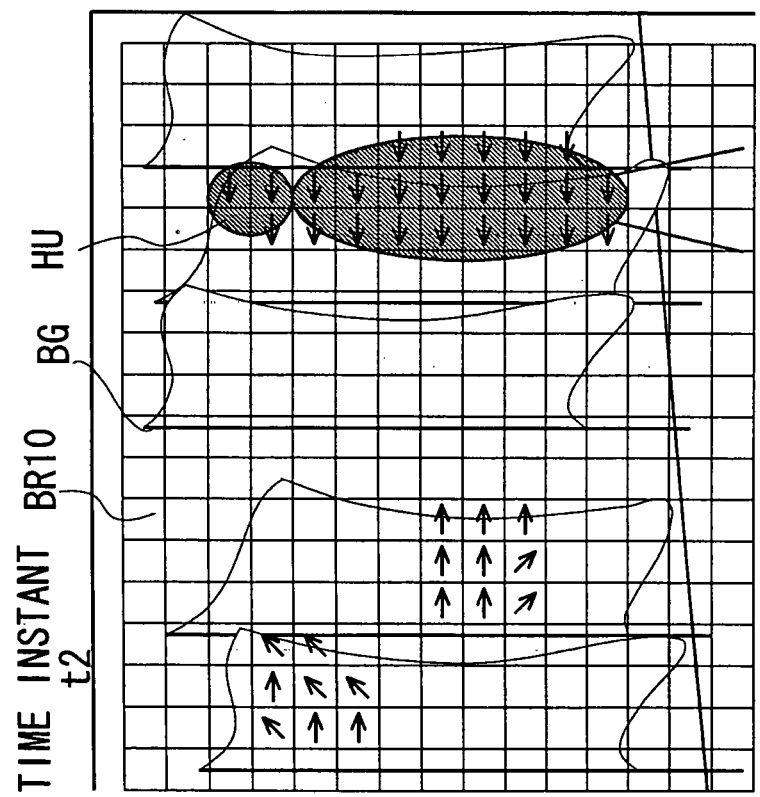
Figure 24B:
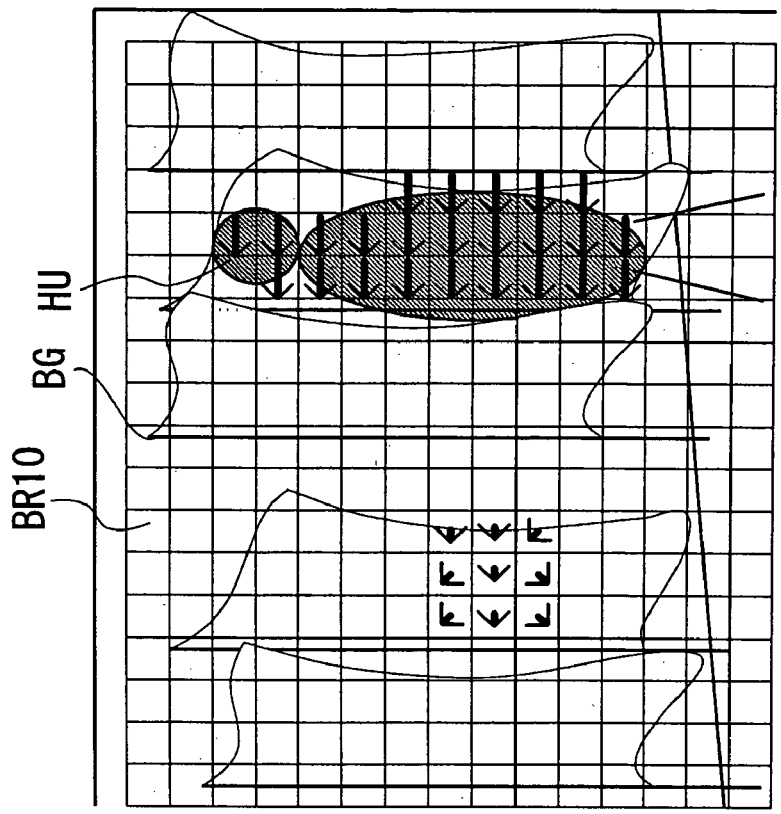
FIGS. 24A and 24B are schematic diagrams illustrating a variation with time of motion vectors in a first embodiment.
Figure 24A:
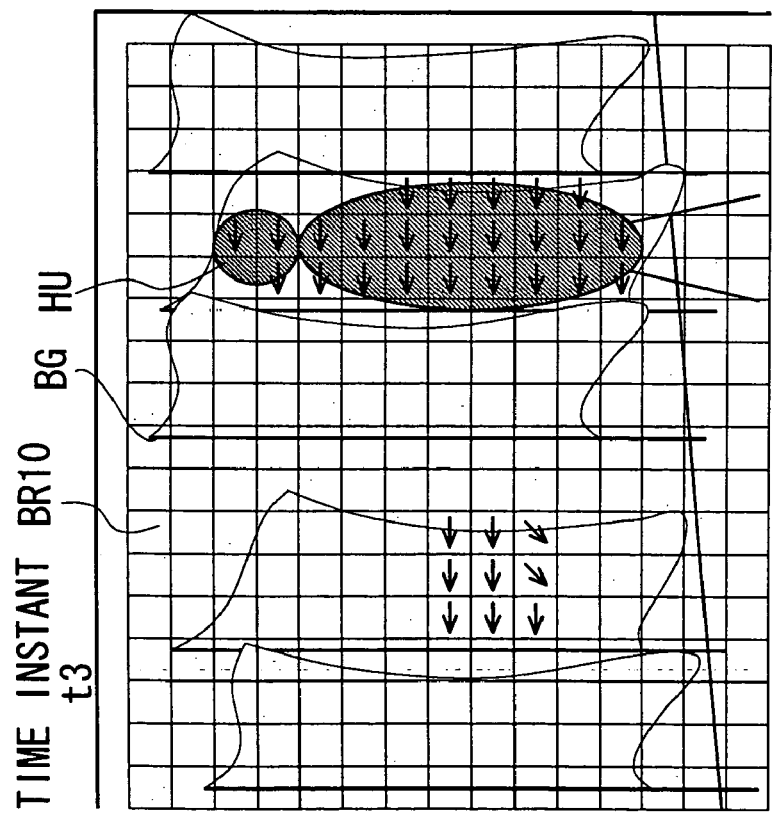

FIG. 22 through FIG. 24 show process of calculating the accumulated values of motion vectors on each correlation calculation block BR10. FIG. 22A, FIG. 23A and FIG. 24A show motion vectors at time instant t1, t2 and t3, and FIG. 22B, FIG. 23B and FIG. 24B show the accumulated values of motion vectors at time instant t1, t2 and t3 (t1<t2<t3).

In this case, the person. HU is moving in the same direction for the period of time t1 through t3. Therefore, the accumulated values of motion vectors of person HU increase as time goes on. By contrast, the motion vectors arising from the movements of background are leftovers, and their instantaneous randomness has become low. And the directions of these motion vectors change periodically or randomly.

Thus, in the correlation calculation blocks BR10 that are covering the person HU, the motion vectors continue to be accumulated, and then the norm of the accumulated value and the accumulated number finally exceed the thresholds. Therefore, these blocks BR10 are detected as moving objects. By contrast, in the correlation calculation blocks BR10 that are covering the backgrounds, the norm of the accumulated value does not exceed the third threshold TH_ACC, even if the accumulated number exceeds its threshold. Therefore, these blocks BR10 are not recognized as moving objects.

In this manner, the moving object detection device 40 according to the present embodiment evaluate both the norm of accumulated value and the accumulated number of times for each correlation calculation block BR10. Therefore, the moving object detection device 40 can detect moving objects, even if the moving objects and the moving backgrounds are overlapped with each other.

Figure 25A:
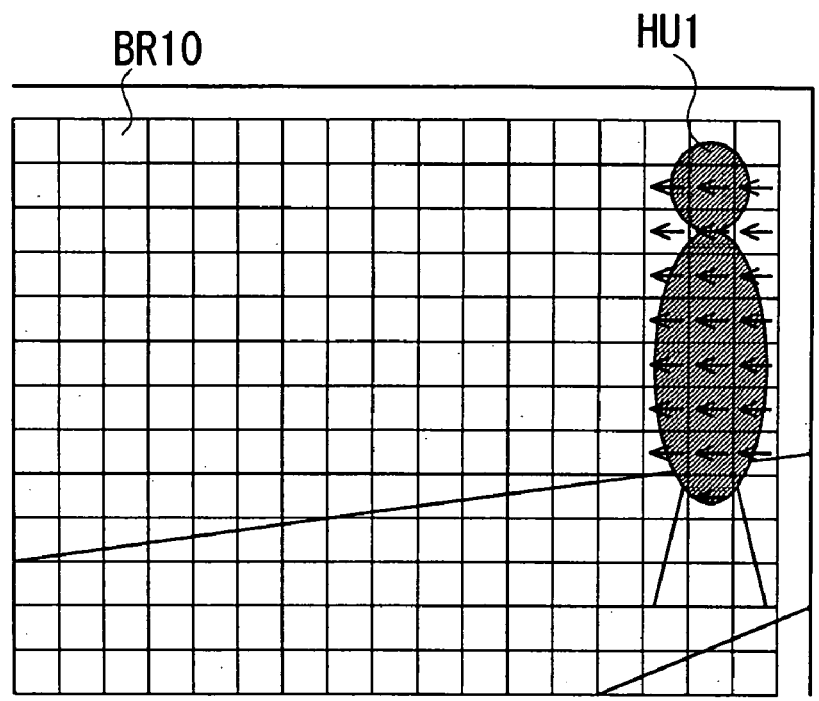
FIGS. 25A and 25B are schematic diagrams explaining a tracking process performed when two persons appear on a screen one after another in the present embodiments.
Figure 25B:
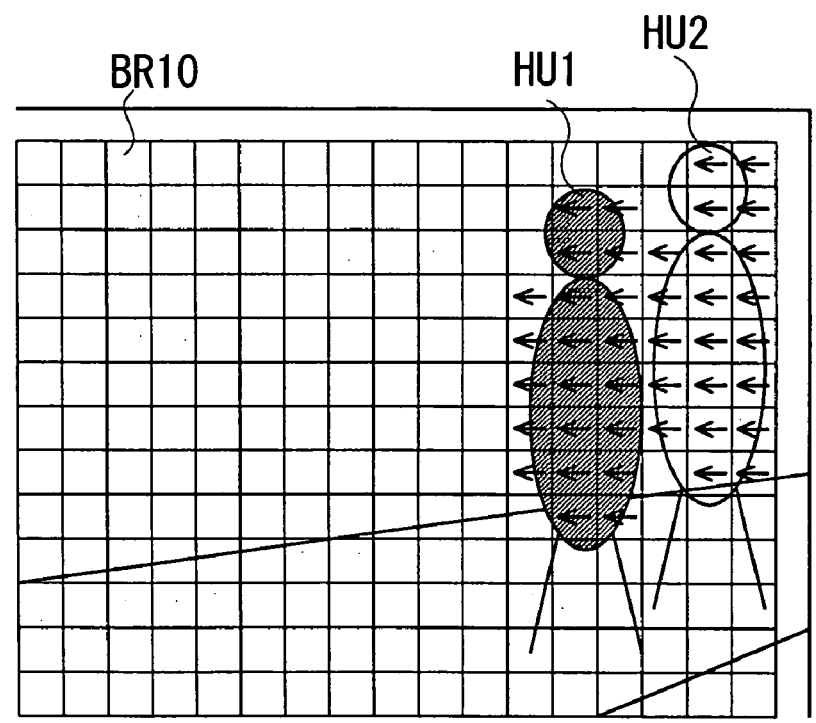

In addition, the moving object detection device 40 disposes the correlation calculation blocks BR10 all over the screen (or a certain area in which the device 40 will detect moving objects). While tracking moving objects, the moving object detection device 40 locks them in their initial positions. Therefore, even if the second person HU2 following the first person HU1 appears on the screen while the first person is still moving on it as shown in FIGS. 25A and 25B, the moving object detection device 40 can detect this second person HU2 as moving objects.

(1-2) Operation and Effects

In the above-noted configuration, the moving object detection device 40 removes the motion vectors whose instantaneous randomness En (X, Y) and stationary randomness E'n (X, Y) are greater or equal to the first threshold value TH_E1 and the second threshold value TH_E2 respectively from the group of motion vectors calculated from the inputted image data D1. And then the moving object detection device 40 separately and temporally accumulates remaining motion vectors to obtain their accumulated values and accumulated numbers. Based on the accumulated values and accumulated numbers, the moving object detection device 40 detect moving objects.

In this manner, the moving object detection device 40 removes the motion vectors arising from background changes, without removing the motion vectors arising from moving objects. That can previously and effectively prevents the device 40 from confusing the motion vectors arising from background changes with the motion vectors arising from moving objects, even if there are the motion vectors arising from moving objects and the motion vectors arising from background change.

In addition, this moving object detection device 40 does not lock a detecting area in a certain position at first stage. And this moving object detection device 40 separately analyzes each correlation block BR10 at any time. That allows the device 40 to accurately detect moving objects, even if the moving objects and the moving backgrounds overlapped with each other or surveillance cameras are installed in the environment where illuminations are not sufficiently bright.

In addition, the moving object detection device 40 disposes the correlation calculation blocks BR10 all over the screen (or a certain area in which the device 40 will detect moving objects), and locks them in their initial positions. This allows the device 40 to accurately detect moving objects, even if moving objects appear on the screen one after another. And locking the correlation calculation blocks BR10 simplifies the detection process. As a result, the configuration of the device is also simplified.

According to the above-noted configuration, the moving object detection device removes the motion vectors whose instantaneous randomness En (X, Y) and stationary randomness E'n (X, Y) are greater or equal to the first threshold value TH_E1 and the second threshold value TH_E2 respectively from the group of motion vectors calculated from the inputted image data D1. That can previously and effectively prevents the device 40 from confusing the motion vectors arising from background changes with the motion vectors arising from moving objects, even if there are the motion vectors arising from moving objects and the motion vectors arising from background change. Thus, the moving object detection device can accurately detect moving objects.

Figure 26:
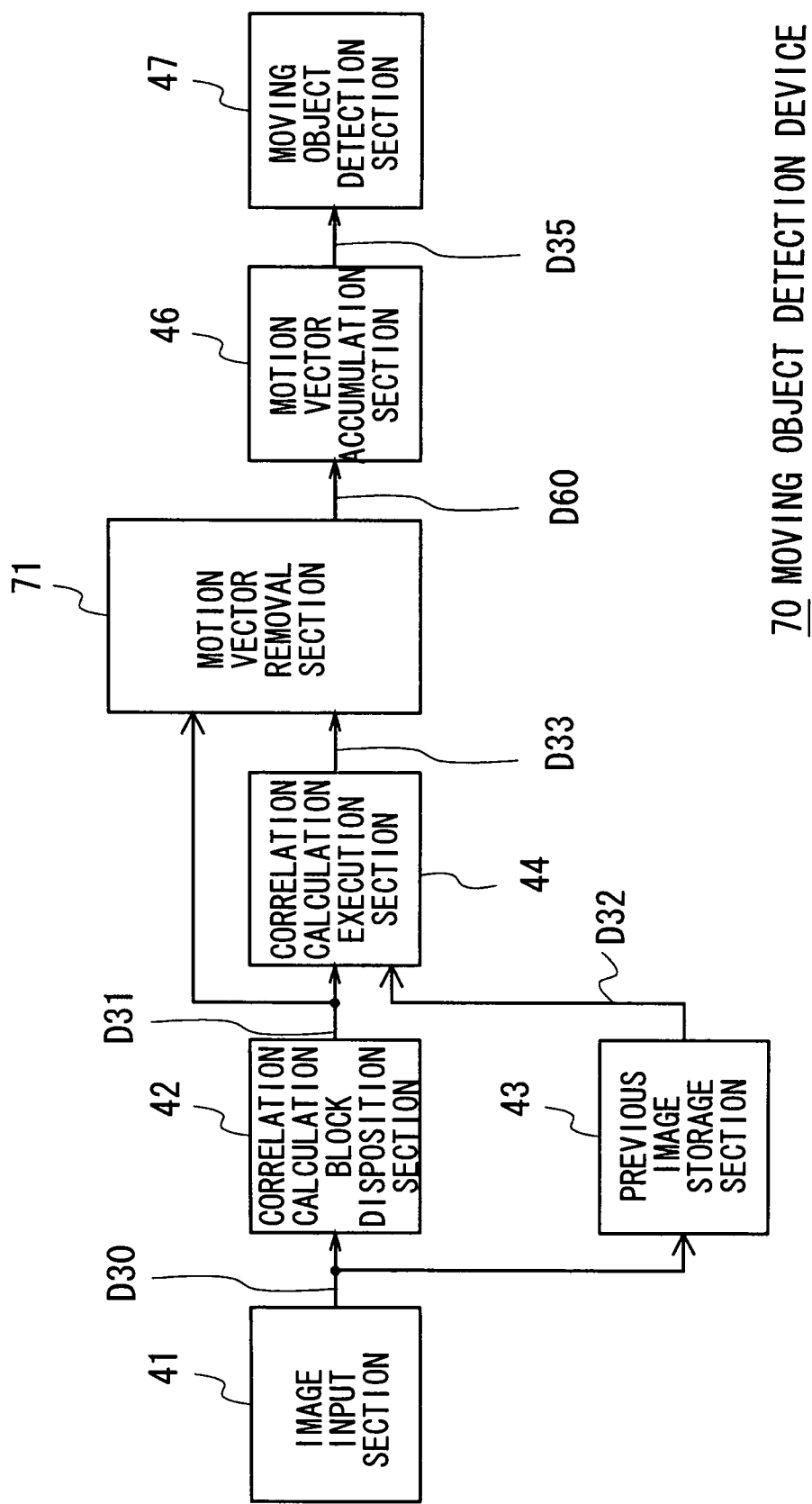
FIG. 26 is a block diagram showing the configuration of a moving object detection device in accordance with a second embodiment.

(2) Second Embodiment (2-1) Configuration of Moving Object Detection Device According to Second Embodiment FIG. 26 (the parts of FIG. 26 are designated by the same symbols and marks as the corresponding parts of FIG. 1) shows a moving object detection device 70 according to a second embodiment. The configuration of the moving object detection device 70 is almost similar to that of the moving object detection device 40 (FIG. 1) according to the first embodiment, except that: the correlation calculation block disposition section 42 supplies the correlation calculation block data D31 to the motion vector removal section 71; and the configuration of the motion vector removal section 71 is different.

Figure 27:
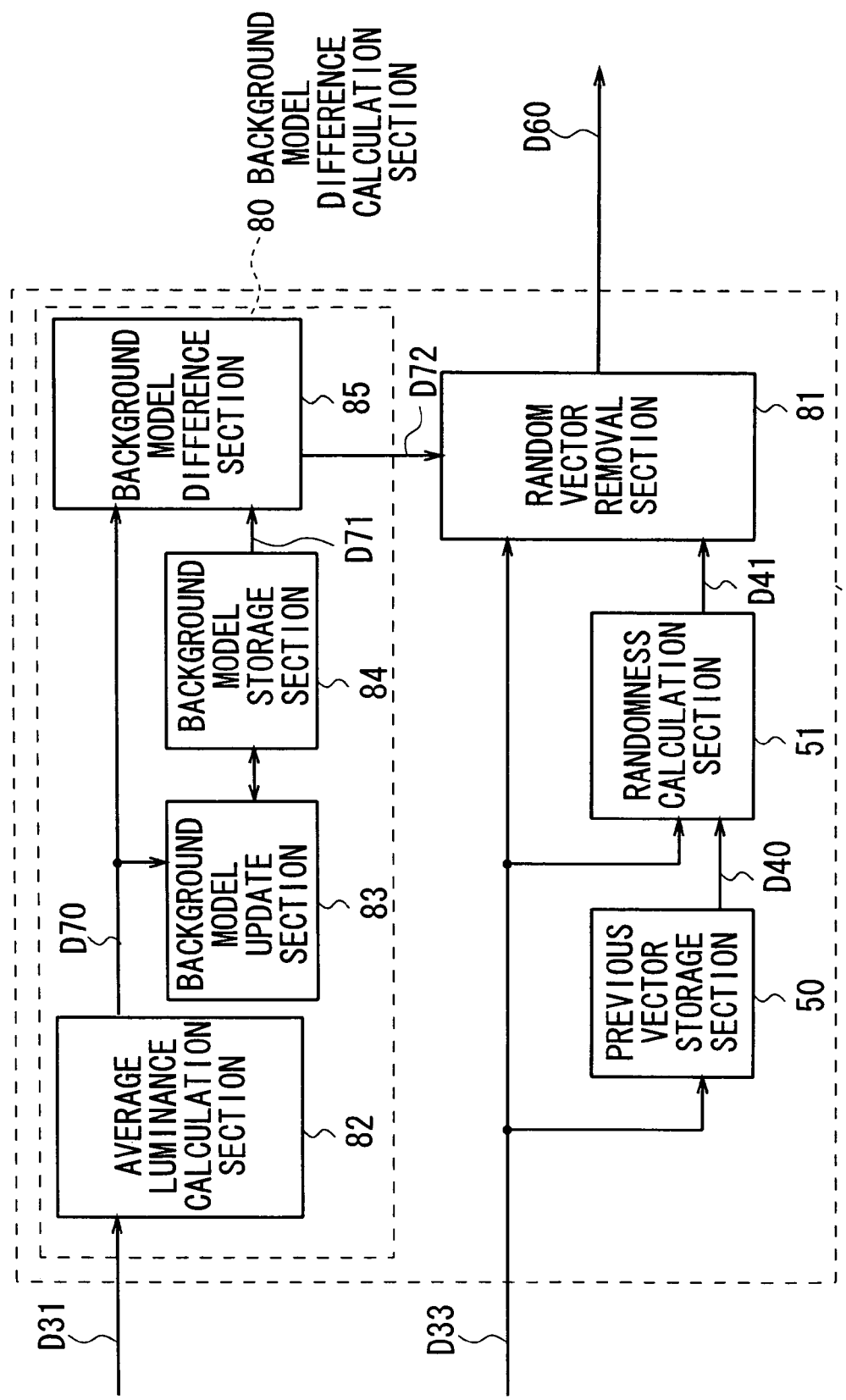
FIG. 27 is a block diagram showing the configuration of a motion vector removal section in accordance with a second embodiment.

As shown in FIG. 27 (the parts of FIG. 27 are designated by the same symbols and marks as the corresponding parts of FIG. 5), the configuration of the motion vector removal section 71 is almost similar to that of the motion vector removal section 45 (FIG. 1) according to the first embodiment, except that: the section 71 includes a background model difference calculation section 80; and the removal method for motion vectors in the random vector removal section 81 is different.

In the second embodiment, the background model difference calculation section 80 includes an average luminance calculation section 82, a background model storage section 84, a background model update section 83, and a background model difference section 85.

In this case, the average luminance calculation section 82 in the background model difference calculation section 80 performs average luminance level calculation process for the correlation calculation block data D31 supplied from the correlation calculation block disposition section 42. In this average luminance level calculation process, the average luminance calculation section 82 computes the average luminance level of each correlation calculation block BR10. The average luminance calculation section 82 subsequently supplies to the background model update section 83 and the background model difference section 85 the average luminance information D70 showing the average luminance level of each correlation calculation block BR10.

The background model storage section 84 has stored background models of each correlation calculation block BR10. In this case, the background models are parameters that are showing the distribution of average luminance level. Let Mn (X, Y) represent the average luminance of each correlation calculation block BR10 (the average luminance is calculated by the average luminance calculation section 82). In this case, the background model storage section 84 has stored M'n (X, Y) that shows the temporal average value of the average luminance Mn (X, Y), and Bn (X, Y) that shows the magnitude of temporal variation of the average luminance Mn (X, Y).

Based on the average luminance level shown in the average luminance information D70 supplied from the average luminance calculation section 82, the background model update section 83 performs update process of updating the background models stored in the background model storage section 84 for each frame. In this update process, the background model update section 83 updates the background model of each correlation calculation block BR10 as follows:

$$M'_n(X,Y) = (1-a) \cdot M'_{n-1}(X,Y) + a \cdot M_n(X,Y)$$

$$B_n(X,Y) = (1-a) \cdot B_{n-1}(X,Y) + a \cdot |M_n(X,Y) - M'_n(X,Y)| \quad (16)$$

where a is set to be about 0.001 through 0.01, and (X, Y) is the position of the correlation calculation block BR10.

In this manner, to update M'n (X, Y) (that shows the temporal average value of the average luminance Mn (X, Y)), the background model update section 83 adds the temporal average value M'n−1 (X, Y) corresponding to the frame n−1th's average luminance Mn−1 (X, Y) to the average luminance Mn (X, Y) of the current frame nth after they are weighted. In addition, to update Bn (X, Y) (that shows the magnitude of temporal variation of the average luminance Mn−1 (X, Y)), the background model update section 83 adds Bn−1 (X, Y) (that shows the magnitude of temporal variation of the preceding frame n−1th's average luminance Mn−1 (X, Y)) to the difference between the current frame nth's average luminance Mn (X, Y) and the temporal average value M'n (X, Y) of the average luminance after they are weighted.

The background model difference section 85 calculates a deviation DEVn (X, Y) between the current frame's average luminance level (shown in the average luminance information D70 supplied from the average luminance calculation section 82) and the background model (shown in the background model information D71 read from the background model storage section 84) as follows:

$$DEV_n(X, Y) = \frac{|M_n(X, Y) - M'_n(X, Y)|}{B_n(X, Y)} \quad (17)$$

where Bn (X, Y) is greater than a certain constant number. And then the background model difference section 85 supplies background difference information D72 to the random vector removal section 81. This background difference information D72 shows the deviation between the average luminance level of each correlation calculation block BR10 in the frame n and the background model.

The random vector removal section 81 receives from the background difference section 85 the background difference information D72 showing the deviation DEVn (X, Y) between the average luminance level and the background model. The random vector removal section 81 also receives from the randomness calculation section 51 the randomness information D41 showing the motion vector's instantaneous randomness En (X, Y) and stationary randomness E'n (X, Y). Based on these the deviation DEVn (X, Y), the instantaneous randomness En (X, Y) and the stationary randomness E'n (X, Y), the random vector removal section 81 determines whether or not removing the motion vector of each correlation calculation block BR10.

Figure 28:
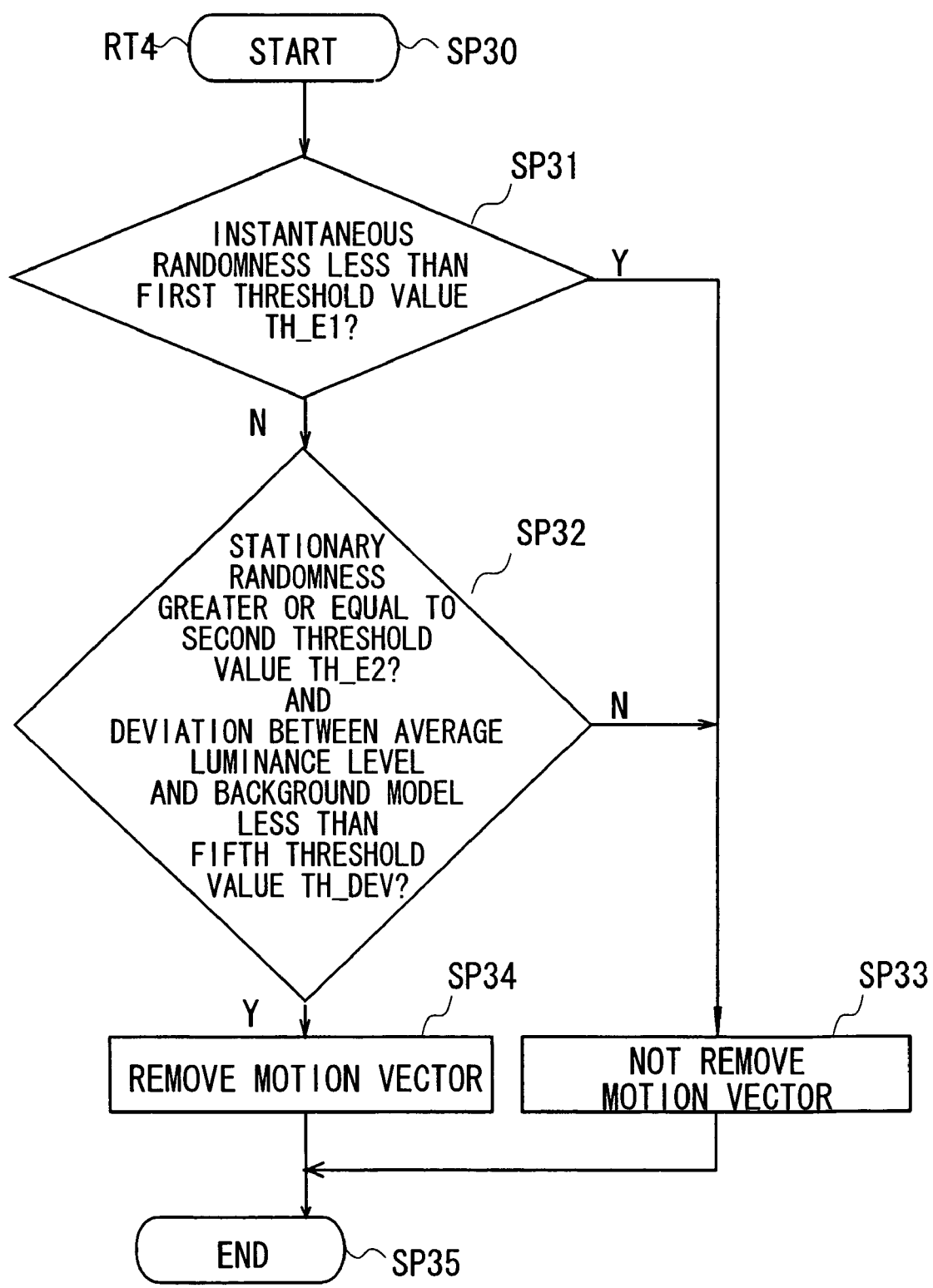
FIG. 28 is a flowchart showing a second motion vector removal determination process.

That is to say, each time the data that correspond to one of the correlation calculation block BR10 are supplied from the correlation calculation execution section 44, randomness calculation section 51 and background model difference section 85 at the same time, the random vector removal section 81 starts a second motion vector removal determination process RT4 (FIG. 28) from step SP30. And then the random vector removal section 81 at step SP31 checks whether or not the following condition is met for the motion vector Vn (X, Y):

$$E_n(X,Y) < TH\_E1 \quad (18)$$

where TH_E1 is a first threshold value set for the instantaneous randomness En (X, Y) of the motion vector Vn (X, Y). Affirmative result at step SP31 means that the instantaneous randomness En (X, Y) is less or equal to the first threshold value TH_E1. In this case, the random vector removal section 81 proceeds to step SP33, and determines that it will not remove all the motion vectors that are spatially adjacent to the motion vector (X, Y). After that the random vector removal section 81 proceeds to step SP35 to end the second motion vector removal determination process RT4.

Negative result at step SP31 means that the instantaneous randomness En (X, Y) is greater than the first threshold value TH_E1. In this case, the random vector removal section 81 proceeds to step SP32 to check whether or not the following conditions are met for the motion vector Vn (X, Y):

$$E'_n(X,Y) \geq TH\_E2 \quad (19)$$

and, $$DEV_n(X,Y) < TH\_DEV \quad (20)$$

where TH_E2 is a second threshold value set for the stationary randomness E'n (X, Y) of the motion vector Vn (X, Y), and TH_DEV is a fifth threshold value set for the deviation DEVn (X, Y) between the average luminance level and the background model. Negative result at step SP32 means that the stationary randomness E'n (X, Y) is less than the second threshold-value TH_E2, or that the deviation between the average luminance level and the background model is greater or equal to the fifth threshold value TH_DEV. In this case, the random vector removal section 81 proceeds to step SP33, and determines that it should not remove the motion vector Vn (X, Y). After that the random vector removal section 81 proceeds to step SP35 to end the second motion vector removal determination process RT4.

Affirmative result at step SP32 means that the stationary randomness E'n (X, Y) is greater or equal to the second threshold value TH_E2, and that the deviation between the average luminance level and the background model is less than the fifth threshold value TH_DEV. In this case, the random vector removal section 81 proceeds to step SP34, and determines that it should remove the motion vector Vn (X, Y). In response to that, the random vector removal section 81 replaces the removal-target motion vector Vn (X, Y) with a zero vector using the above-noted formula (3). After that the random vector removal section 81 proceeds to step SP35 to end the second motion vector removal determination process RT4.

The moving object detection device 70 according to the present embodiment can detect moving objects, even if the size of them are small and they are passing through the background whose stationary randomness of motion vectors is high.

Figure 29B:
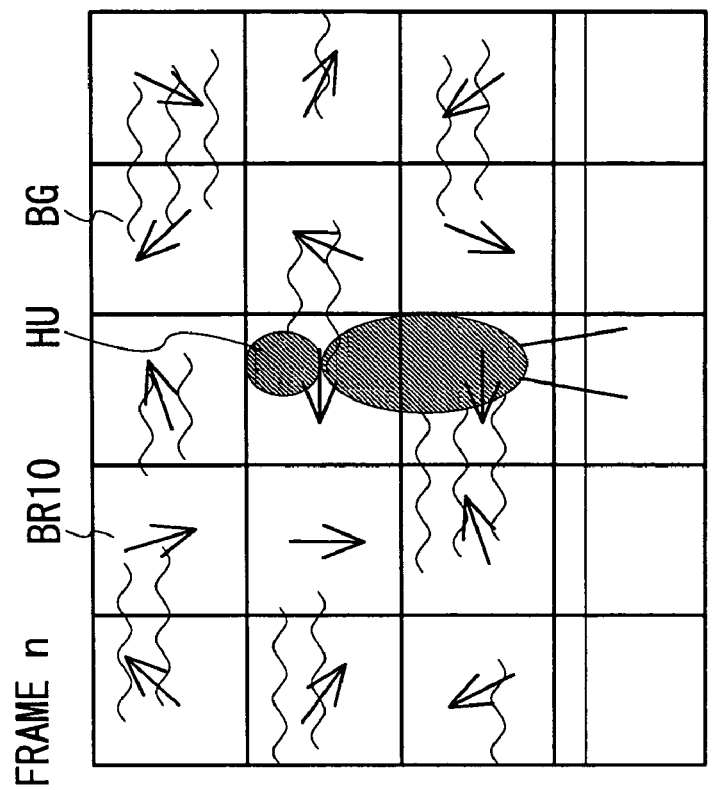
FIGS. 29A and 29B are schematic diagrams explaining a small moving object overlapping with a moving background.
Figure 29A:
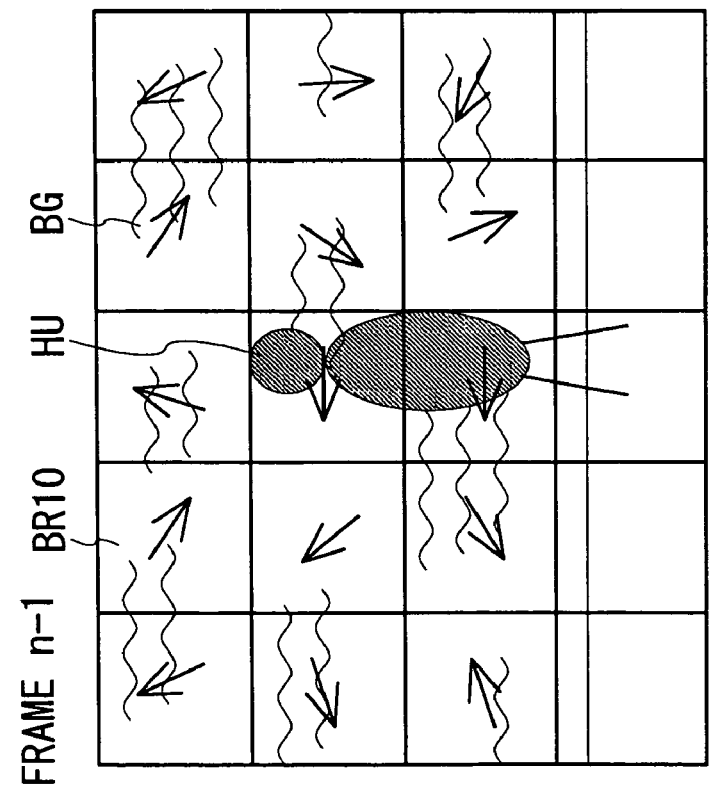

FIGS. 29A and 29B show the person HU passing through in front of the background BG that is moving randomly like water waves. Compared to the size of the screen, the person HU is small. And in this case, only two of the correlation calculation blocks BR10 are set on the person HU. In this case (FIGS. 29A and 29B), the group of motion vectors Wn (X, Y) that are temporally and spatially adjacent to the motion vector Vn (X, Y) of the person HU includes a lot of high-randomness motion vectors arising from the background BG (waves, for example). Therefore, the instantaneous randomness En (X, Y) of motion vector Vn (X, Y), which is calculated by the randomness calculation section 51, becomes high. In addition, the stationary randomness E'n (X, Y) is also high, because the motion vectors arising from the background changes continue to be there until the person HU comes in.

Figure 30B:
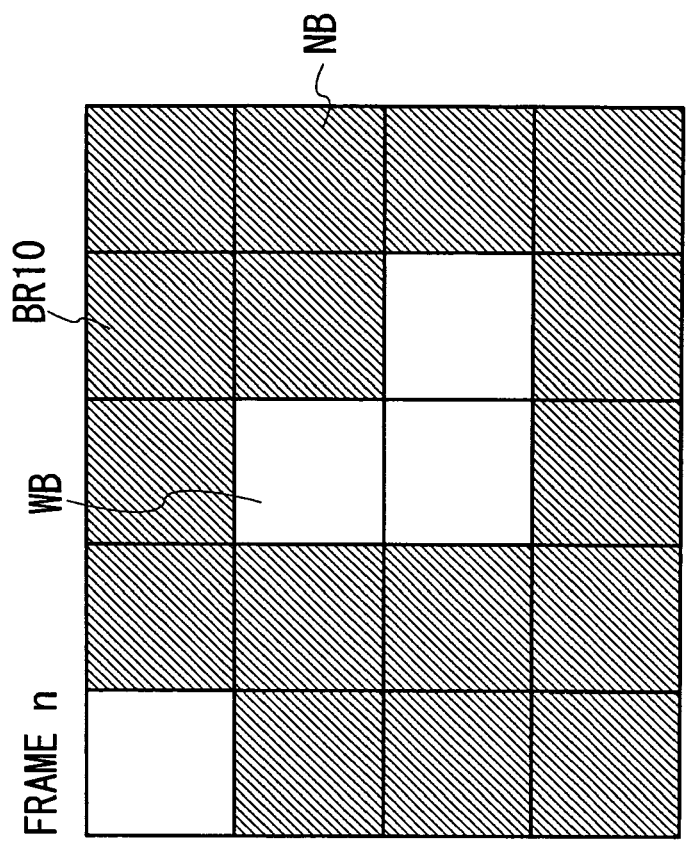
FIGS. 30A and 30B are schematic diagrams explaining binarization for background difference information.
Figure 30A:
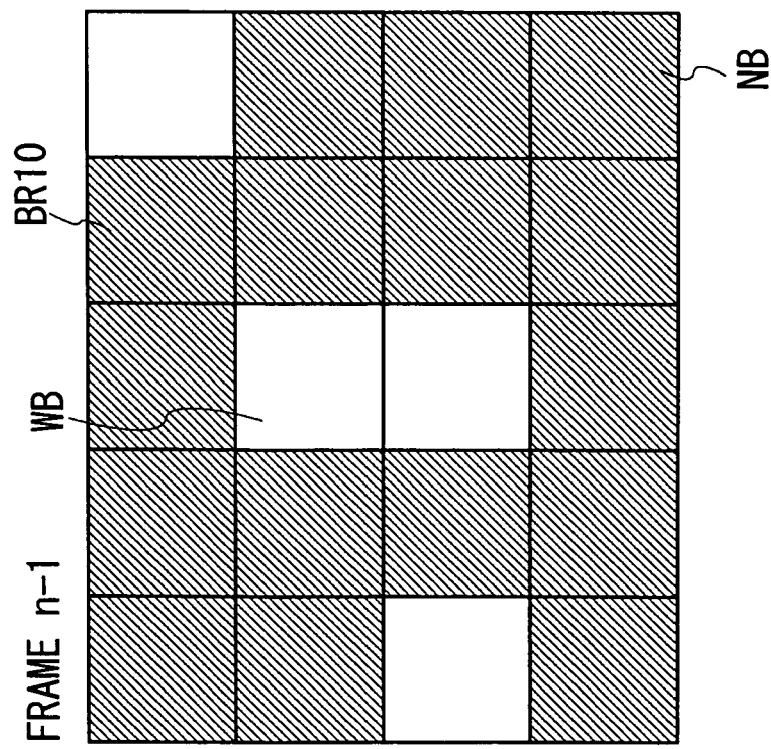

In FIGS. 30A and 30B, the background difference information D72 supplied from the background model difference section 85 is binarized by using the fifth threshold value TH_DEV. In FIGS. 30A and 30B, white blocks WB represent the correlation calculation blocks BR10 whose deviation between the average luminance level and the background model is greater or equal to the fifth threshold value TH_DEV. By contrast, hatching blocks NB represent the correlation calculation blocks BR10 whose deviation between the average luminance level and the background model is less than the fifth threshold value TH_DEV.

In this case, with a certain correlation calculation block BR10, the period of time that the background BG can be seen is assumed to be longer than the period of time that the moving object exists. Based on this assumption, the background model storage section 84 stores the temporal average value M'n (X, Y) of the average luminance Mn (X, Y) and Bn (X, Y) that shows the magnitude of temporal variation of the average luminance Mn (X, Y) (the average luminance Mn (X, Y) shows the luminance distribution of background changes).

In general, the moving object's average luminance is different from the luminance distribution of the background changes. Therefore, in the correlation calculation block BR10 where the moving object exists, the deviation between the average luminance level and the background model becomes high. That is to say, the deviation (between the average luminance level and the background model) calculated by the background model difference section 85 becomes greater or equal to the fifth threshold value TH_DEV. Therefore, the device does not recognize it as removal-target motion vectors.

By contrast, in the correlation calculation block BR10 where the moving object does not exist, the deviation between the average luminance level and the background model becomes low. That is to say, the deviation (between the average luminance level and the background model) calculated by the background model difference section 85 becomes less than the fifth threshold value TH_DEV. Therefore, the device recognizes it as removal-target motion vectors.

Figure 31B:
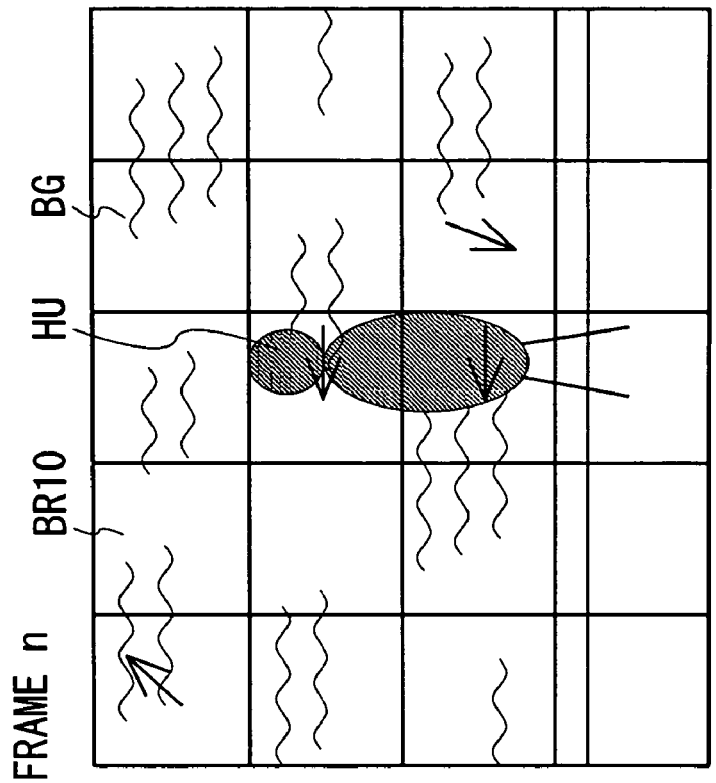
FIGS. 31A and 31B are schematic diagrams explaining removal of high-randomness motion vectors by a motion vector removal section.
Figure 31A:
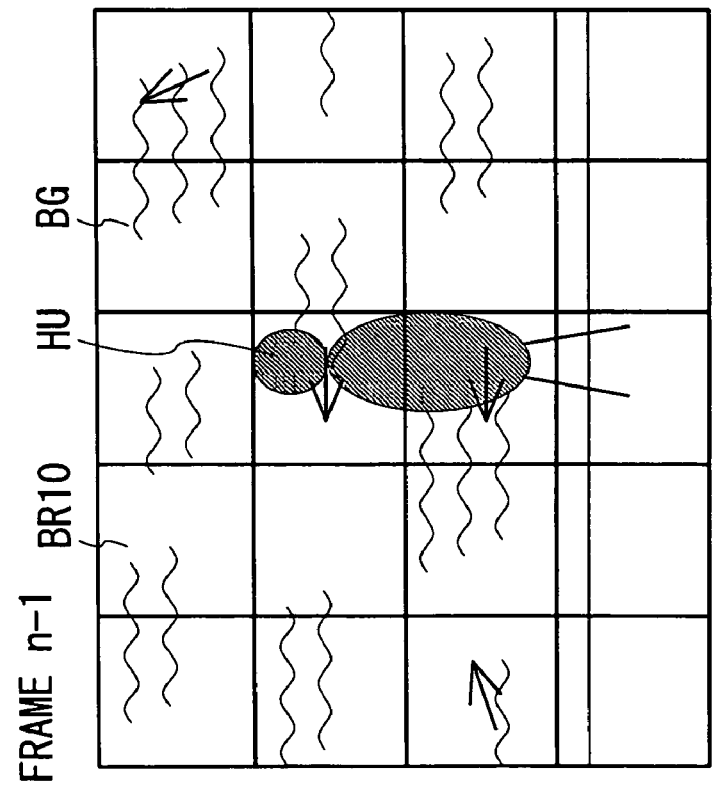

FIGS. 31A and 31B show the screen where the motion vectors that meet all of the following conditions have been removed from that of FIGS. 30A and 30B by the motion vector removal section 71: their instantaneous randomness En (X, Y) is greater or equal to the first threshold value TH_E1; their stationary randomness E'n (X, Y) is greater or equal to the second threshold value TH_E2; and the deviation DEVn (X, Y) between the average luminance level and the background model is less than the fifth threshold value TH_DEV. In this way, most of the motion vectors arising from the background changes have been removed by the motion vector removal section 71.

(2-2) Operation and Effects

In the above-noted configuration, the moving object detection device 70 removes the motion vectors that meet all of the following conditions from the group of motion vectors calculated from the inputted image data D1: their instantaneous randomness En (X, Y) is greater or equal to the first threshold value TH_E1; their stationary randomness E'n (X, Y) is greater or equal to the second threshold value TH_E2; and the deviation DEVn (X, Y) between the average luminance level and the background model is less than the fifth threshold value TH_DEV.

In the case in which the small moving object is passing through in front of the moving background, the instantaneous randomness En (X, Y) is greater or equal to the first threshold value TH_E1, the stationary randomness E'n (X, Y) is greater or equal to the second threshold TH_E2, and the deviation DEVn (X, Y) between the average luminance and the background model is greater or equal to the fifth threshold value TH_DEV. Therefore, the moving object detection device 70 can reliably detect moving objects, because it does not remove the motion vectors arising from small moving objects.

According to the above-noted configuration, the device removes the motion vectors that meet all of the following conditions from the group of motion vectors calculated from the inputted image data D1: their instantaneous randomness En (X, Y) is greater or equal to the first threshold value TH_E1; their stationary randomness E'n (X, Y) is greater or equal to the second threshold value TH_E2; and the deviation DEVn (X, Y) between the average luminance level and the background model is less than the fifth threshold value TH_DEV. In the case in which the small moving object is passing through in front of the moving background, the instantaneous randomness En (X, Y) is greater or equal to the first threshold value TH_E1, the stationary randomness E'n (X, Y) is greater or equal to the second threshold TH_E2, and the deviation DEVn (X, Y) between the average luminance and the background model is greater or equal to the fifth threshold value TH_DEV. Therefore, the device can reliably detect moving objects, because it does not remove the motion vectors arising from small moving objects. Accordingly, the device can accurately detect moving objects.

Figure 32:
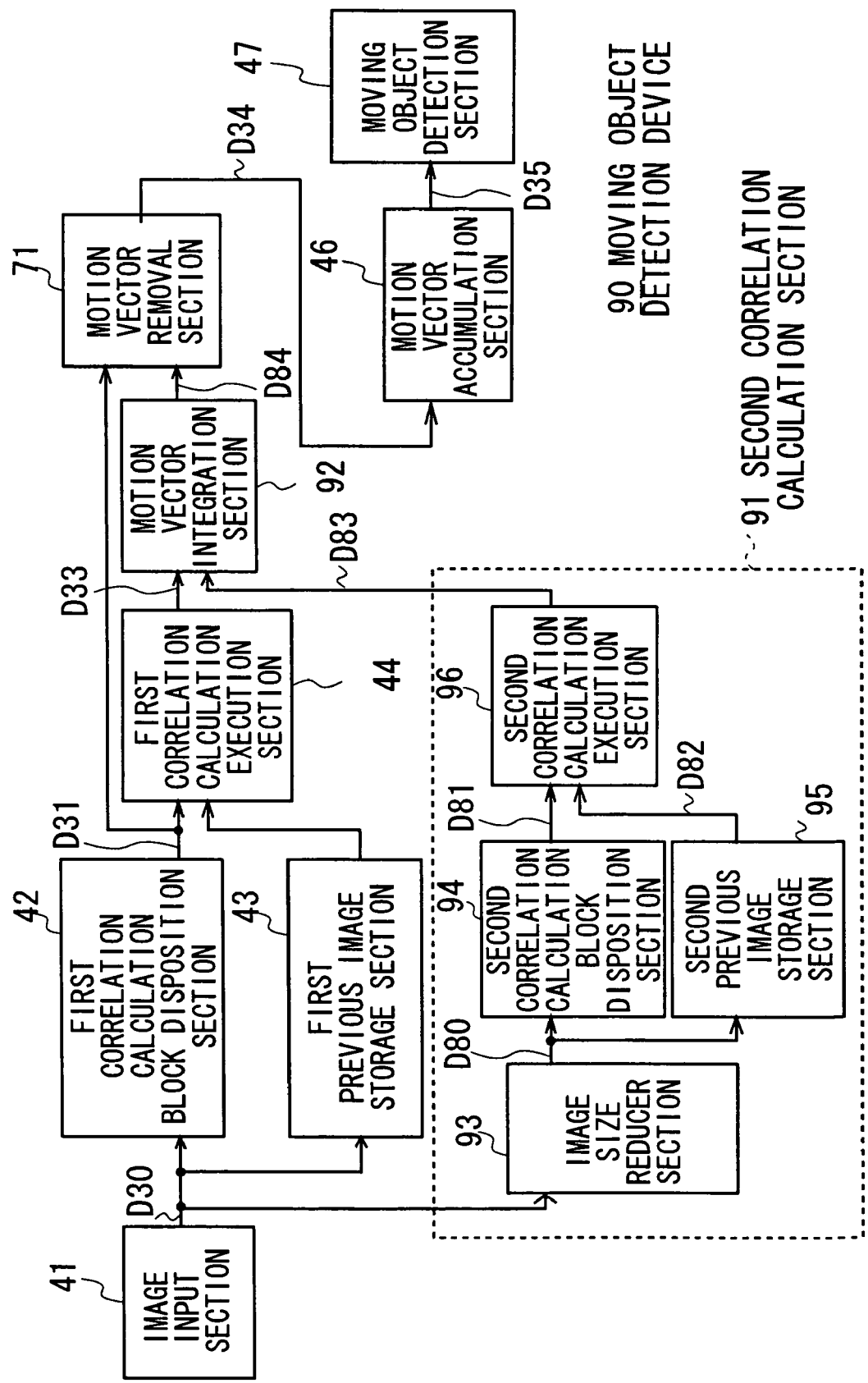
FIG. 32 is a block diagram showing the configuration of a moving object detection device in accordance with a third embodiment.

(3) Third Embodiment (3-1) Configuration of Moving Object Detection Device According to Third Embodiment FIG. 32 (the parts of FIG. 32 are designated by the same symbols and marks as the corresponding parts of FIG. 26) shows a moving object detection device 90 according to a third embodiment. The configuration of the moving object detection device 90 is almost similar to that of the moving object detection device 70 (FIG. 26) according to the second embodiment, except that the device 90 includes a second correlation calculation section 91 and a motion vector integration section 92.

In the moving object detection device 90 according to the third embodiment, the image data D30 supplied from the image input section 41 is referred to as a first layer image data D30. The above-noted correlation calculation block disposition section 42, which processes the first layer image data D30, is referred to as a first correlation calculation block disposition section 42. In addition, the above-noted previous image storage section 43 and correlation calculation execution section 44 are referred to as a first previous image storage section 43 and a first correlation calculation execution section 44 respectively.

The second correlation calculation section 91 includes an image size reducer section 93, a second correlation calculation block disposition section 94, a second previous image storage section 95, and a second correlation calculation execution section 96. As shown in FIG. 33A, the image size reducer section 93 reduces the resolution of the first layer image corresponding to the first layer image data D30 by ½ to generate a reduced-size image (the first layer image data D30 is supplied from the image input section 41). Then, the image size reducer section 93 supplies a second layer image data D80 showing the reduced-size image to the second correlation calculation block disposition section 94 and the second previous image storage section 95.

The second correlation calculation block disposition section 94 disposes correlation calculation blocks BR20 on a second layer image corresponding to the second layer image data D80 in the same way as the first correlation calculation block disposition section 42, such that the correlation calculation blocks BR20 are placed with a distance of T pixels between them (the second layer image data D80 is supplied from the image size reducer section 93 as shown FIG. 32). In this case, the size of the correlation calculation block BR20 is m×m pixels. The second correlation calculation block disposition section 94 then supplies the data of each correlation calculation block BR20 to the second correlation calculation execution section 96 as second layer correlation calculation block data D81. Second delayed image data D82 are read by the second correlation calculation execution section 96 from the second previous image storage section 95, in the same way as the first previous image storage section 43.

The second correlation calculation execution section 96 performs the same process as that of the first correlation calculation execution section 44 for the second correlation calculation block data D81 supplied from the second correlation calculation block disposition section 94 and the second layer delayed image data D82 read from the second previous image storage section 95. The second correlation calculation execution section 96 then supplies the resulting data (which is a motion vector V2n of each correlation calculation block BR20 of frame nth) to the motion vector integration section 92 as second layer motion vector information D83.

Figure 34:
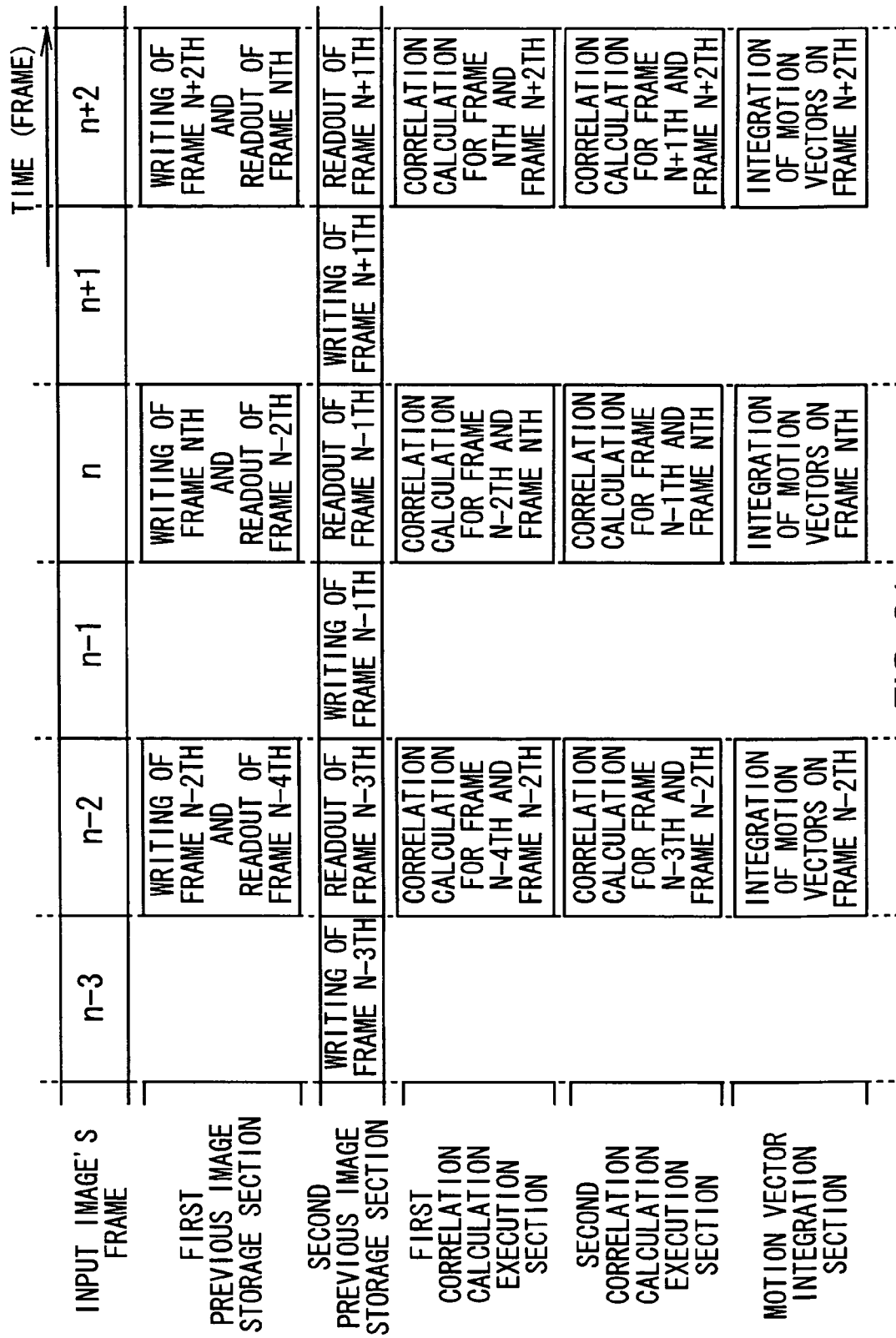
FIG. 34 is a schematic diagram explaining operation timing in a moving object detection device of a third embodiment.

FIG. 34 shows operation timing of the first previous image storage section 43, second previous image storage section 95, first correlation calculation execution section 44, second correlation calculation execution section 96 and motion vector integration section 92 of the moving object detection device 90. The moving object detection device 90 runs at an interval of 2 frames. Accordingly, the period between a frame n−1th and a frame nth will be described below.

While the first layer image data D30 of the frame n−1th is being supplied from the image input section 41, the second layer image data D80 of the frame n−1th is being supplied from the image size reducer section 93 and stored in the second previous image storage section 95.

While the first layer image data D30 of the frame nth is being supplied from the image input section 41, the first previous image storage section 43 is storing the first layer image data D30 of the frame nth, and the first layer delayed image data D32 of a frame n−2th is being read from the first previous image storage section 43.

And the first correlation calculation execution section 44 performs correlation calculation (FIG. 33B) for the frame nth's first layer image data D30 and the frame n−2th's first layer delayed image data D32 to calculate first layer motion vector information D33.

By the way, the second layer image data D80 of the frame n−1th is read from the second previous image storage section 95. And the second correlation calculation execution section 96 performs correlation calculation for the frame nth's second layer image data D80 supplied from the image size reducer section 93 and the frame n−1th's second layer image data D80, which is to say it performs correlation calculation at a ½ interval of the first layer image (FIG. 33C). As a result, the second correlation calculation execution section 96 obtains second layer motion vector information D83.

And then the motion vector integration section 92 integrates a first layer motion vector V1n (X, Y) with a second layer motion vector V2n (X, Y), based on the first layer motion vector information D33 supplied from the first layer correlation calculation execution section 44 and the second layer motion vector information D83 supplied from the second correlation calculation execution section 96. The motion vector integration section 92 then supplies the integrated vector Vn (X, Y) to the motion vector removal section 71 as integration vector information D84.

FIGS. 35A and 35B show the spatial relative positions of the first layer's motion vectors V1n (X, Y) and second layer's motion vectors V2n (X, Y). In this case, the second layer image (corresponding to the second layer image data D80) is generated from the first layer image (corresponding to the first layer image data D30) by reducing the first layer image's size by ½. In addition, the size of the first layer correlation calculation block BR10 is the same as that of the second layer correlation calculation block BR20, and the distance between the correlation calculation blocks BR10 on the first layer is the same as the distance between the correlation calculation blocks BR20 on the second layer. Therefore, four correlation calculation blocks BR10 are placed in the area whose size is the same as one of the second layer correlation calculation blocks BR20. That is to say, the motion vector V2n (X+T/2, Y+T/2) on the second layer represents the same movements as the motion vectors V1n (X, Y), V1n (X+T, Y), V1n (X, Y+T) and V1n (X+T, Y+T) on the first layer do.

Based on this fact, the motion vector integration section 92 performs selection process for each correlation calculation block BR10 on the first layer. In this selection process, the motion vector integration section 92 selects the first layer motion vector (supplied from the first correlation calculation execution section 44) or the corresponding second layer motion vector (supplied from the second correlation calculation execution section 96) by using the following formulas:

$$V_n(X,Y)=\text{MAX}(V1_n(X,Y),V2'_n(X+T/2,Y+T/2))$$

$$V_n(X+T,Y)=\text{MAX}(V1_n(X+T,Y),V2'_n(X+T/2,Y+T/2))$$

$$V_n(X,Y+T)=\text{MAX}(V1_n(X,Y+T),V2'_n(X+T/2,Y+T/2))$$

$$V_n(X+T,Y+T)=\text{MAX}(V1_n(X+T,Y+T),V2'_n(X+T/2,Y+T/2)) \quad (21)$$

where Vn (X, Y) is an integrated motion vector, MAX (X, Y) is a function for selecting a motion vector having a larger norm from the first layer motion vector V1n and second layer motion vector V2n, V2'n (X+T/2, Y+T/2) is obtained by transforming V2n (X+T/2, Y+T/2) into a first layer motion vector.

Figure 33:
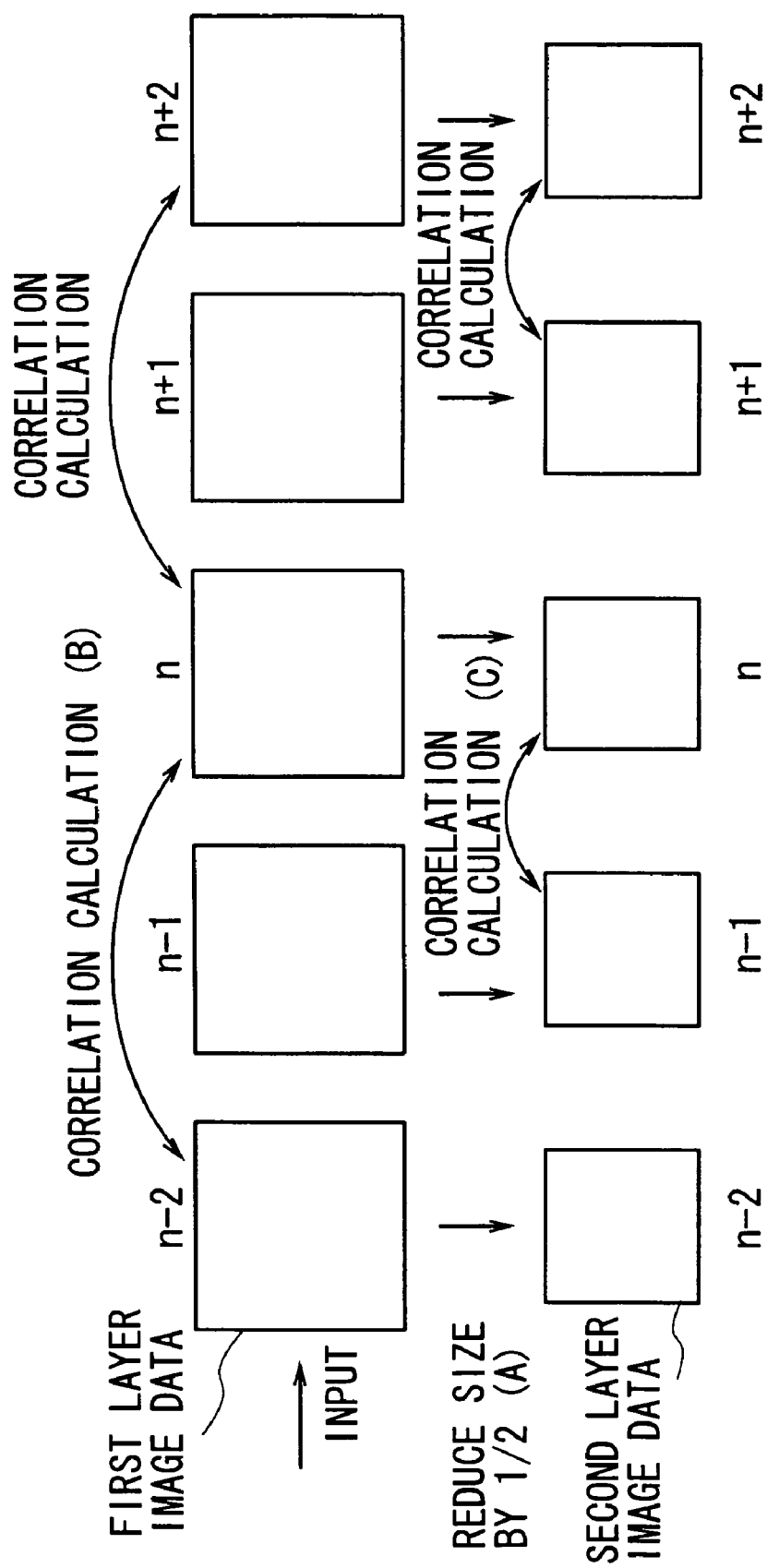
FIG. 33 is a schematic diagram explaining process for first layer image data and second layer image data.

In this case, the second layer motion vector originated from the image whose resolution is ½ of the first layer image, and the correlation calculation is performed for the second layer motion vector at a ½ interval of the first layer image (FIG. 33). Therefore, the second layer motion vector can be transformed to a first layer motion vector by quadrupling the second layer motion vector. That is to say, the second layer motion vector is transformed to a first layer motion vector as follows:

$$V2'_n(X+Y/2, Y+T/2)=4 \cdot V2_n(X+Y/2, Y+T/2) \qquad (22)$$

In this manner, the motion vector integration section 92 integrates the first layer motion vector V1$n$ (X, Y) with the second layer motion vector V2$n$ (X, Y). And then the motion vector integration section 92 supplies the integrated motion vector Vn (X, Y) (FIG. 35C) to the motion vector removal section 71 as integrated vector information D84. This integrated vector information D84 has the same spatial resolution as the first layer.

In this way, to accumulate the second layer motion vectors, the moving object detection device 90 according to the present embodiment utilizes the image whose resolution is ½ of the first layer image, and performs correlation calculation at a ½ interval of the first layer image. That reduces the load for correlation calculation. In addition, that allows the moving object detection device 90 to calculate motion vectors in wider area.

That is to say, the moving object detection device 90 according to the present embodiment can detect a fast-moving object. In general, the range that a device can calculate motion vectors is determined by the size of the searching area of correlation calculation. The calculation load increases as the searching area becomes larger. However, according to the moving object detection device 90 of the present embodiment, for example in the case in which: the correlation calculation for the first layer correlation calculation blocks BR10 is performed for the searching area with ±7 pixels; and the correlation calculation for the second layer correlation calculation blocks BR20 is performed for the searching area with ±8 pixels, the size of the area where the integrated motion vectors can be calculated is 4 times larger while the calculation load is almost the same, in comparison with the case in which: the correlation calculation is only performed for the first layer correlation calculation blocks BR10; and this correlation calculation is performed for the searching area with ±8 pixels in both vertical and lateral directions.

The moving object detection device 90 according to the present embodiment can detect moving objects even when it has difficulty in calculating the first layer motion vectors, because it can use the second layer motion vectors instead of them.

Figure 36:
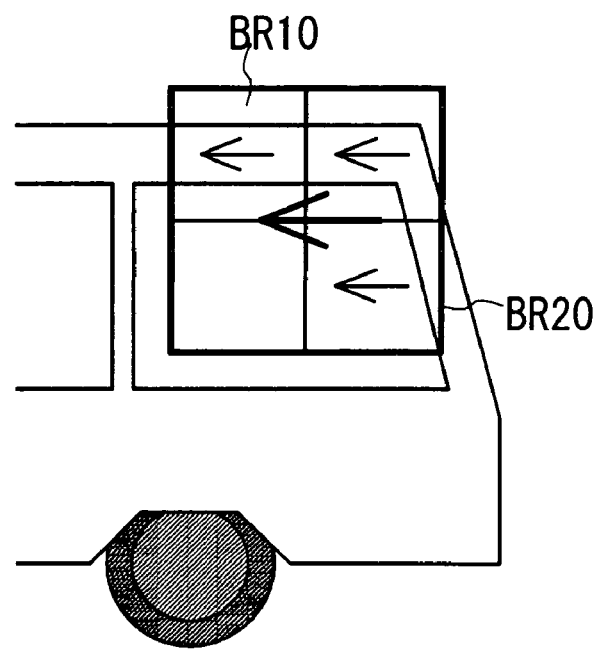
FIG. 36 is a schematic diagram explaining calculation of motion vectors for moving cars.

FIG. 36 shows four first layer correlation calculation blocks BR10 and one second layer correlation calculation block BR20 on a moving car. In this case (FIG. 36), motion vectors have been calculated for the second layer correlation calculation block BR20 and three of the first layer correlation calculation blocks BR10, and not have been calculated for one remaining first layer correlation calculation block BR10.

That is because this remaining first layer correlation calculation block BR10 is placed in the window of the car, and the image inside this correlation calculation block BR10 has very low contrasts. Therefore, it is very difficult to calculate reliable motion vectors for this correlation calculation block BR10. As a result, motion vectors for this correlation calculation block BR10 becomes zero vectors in the first correlation calculation execution section 44.

In this case, the motion vector integration section 92 selects a motion vector having a larger norm from among the first layer motion vectors and the second layer motion vectors. Accordingly, the motion vector integration section 92 selects the second layer motion vector for the remaining correlation calculation block BR10.

In addition, the moving object detection device 90 of the present embodiment can reliably detect moving objects even if a person having low contrasts is walking near a background having high contrasts.

Figure 37:
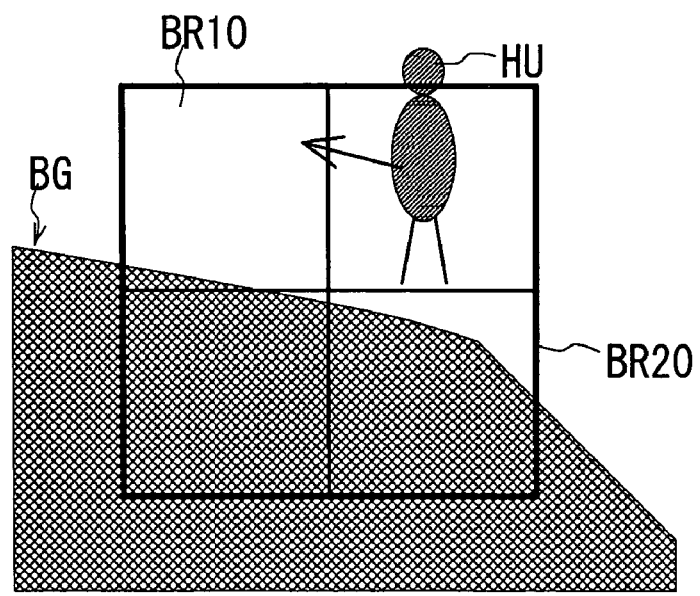
FIG. 37 is a schematic diagram explaining calculation of motion vectors when a small person is moving near a large background.

FIG. 37 shows a person HU having low contrasts is walking near a background BG having high contrasts. A second layer correlation calculation block BR20 is disposed such that this block BR20 covers both the background BG and the person HU. In this case, the second layer correlation calculation block BR20 is mostly influenced by the high-contrast background BG, and the motion vectors in this second layer become zero vectors even when the person HU is moving.

However, the motion vectors corresponding to the movements of the person HU is calculated in the first layer correlation calculation block BR10 covering the person HU. As noted above, the motion vector integration section 92 selects a motion vector having a larger norm from among the first layer motion vectors and the second layer motion vectors. Accordingly, in this case, the motion vector integration section 92 selects the first layer motion vector that reflects the movements of the person HU for the first layer correlation calculation block BR10.

(3-2) Operation and Effects

In the above-noted configuration, the moving object detection device 90 detects the first layer motion vectors based on the inputted image data D1. The moving object detection device 90 performs correlation calculation for the image whose resolution is ½ of the first layer image at a ½ interval of the first layer image to obtain the second layer motion vectors. And then the moving object detection device 90 chooses a motion vector having a larger norm from among these first layer motion vectors and second layer motion vectors.

That reduces the load for correlation calculation. In addition, that allows the moving object-detection device 90 to detect a fast-moving object, a small or slow-moving object, and a low-contrast object moving near a high-contrast background.

According to the above-noted configuration, the device detects the first layer motion vectors based on the inputted image data D1. The device performs correlation calculation for the image whose resolution is ½ of the first layer image at a ½ interval of the first layer image to obtain the second layer motion vectors. And then the device chooses a motion vector having a larger norm from among these first layer motion vectors and second layer motion vectors. That reduces the load for correlation calculation. In addition, that allows the device to detect a fast-moving object, a small or slow-moving object, and a low-contrast object moving near a high-contrast background. Thus, the moving object detection device can accurately detect moving objects.

(4) Fourth Embodiment (4-1) Configuration of Moving Object Detection Device According to Fourth Embodiment FIG. 1 also shows the moving object detection device 100 according to a fourth embodiment. The configuration of the moving object detection device 100 is almost similar to that of the moving object detection device 40 (FIG. 1) according to the first embodiment, except the motion vector accumulation section 101.

As shown in FIG. 14, this motion vector accumulation section 101 is almost similar to that of the motion vector accumulation section 46 (FIG. 1), except that the previous accumulated value readout section 110 reads out previous accumulated value in different manner.

In this case, the previous accumulated value readout section 110 reads out the previous vector accumulation information D51 stored in the previous accumulated value storage section 64. That is to say, the previous accumulated value readout section 110 reads out the accumulated value ACCn−1 ($\alpha$, $\beta$) and accumulated number CNTn−1 ($\alpha$, $\beta$) of motion vectors, which have been calculated so far for the presently-targeted correlation calculation block BR10. And then the previous accumulated value readout section 110 supplies them to the accumulated value update section 62. By the way, ($\alpha$, $\beta$) is the position of the correlation calculation block BR10 that is the source of update for the accumulated value and the accumulated number of times.

Here, let Vn (X, Y) represent the current motion vector of the update-target correlation calculation block BR10. In this case, x element of Vn (X, Y) becomes −h and its y element becomes −v as follows:

$$V_n = (-h, -v) \qquad (23)$$

And then, from among a plurality of correlation calculation blocks BR10 adjacent to a position (X−h, Y−v) and the correlation calculation blocks BR10 located at the position (X−h, Y−v), the previous accumulated value readout section 110 selects a correlation calculation block BR10 that is highly correlated with the current vector (i.e., Vn (X, Y) of the frame nth) in terms of the values accumulated until reaching the frame n−1th. And then the previous accumulated value readout section 110 recognizes the selected block BR10 as an update-source correlation calculation block BR10.

That is to say, the previous accumulated value readout section 110 assumes that the moving object would not change its direction suddenly. And then the previous accumulated value readout section 110 spatially moves its focus from the position (X, Y) of the correlation calculation block BR10 in accordance with the motion vector, and then the focus is placed on the correlation calculation blocks BR10 located at the position (X−h, Y−v) and around it. The previous accumulated value readout section 110 subsequently calculates the dot product of the motion vector located at (x, y) on the frame nth and the accumulated values of motion vectors of the preceding frame n−1th of the focused correlation calculation blocks BR10 (these accumulated values have been stored in the previous accumulated value storage section 64). And then the previous accumulated value readout section 110 chooses a correlation calculation block BR10 having the largest dot product as an update-source correlation calculation block BR10.

In this manner, the previous accumulated value readout section 110 calculates the dot product of the motion vector located at (x, y) on the frame nth and the accumulated values of motion vectors of the preceding frame n−1th, and utilizes it as an indicator indicating the temporal uniformity of movements. That allows the device to stably update the accumulated value of motion vectors, while the moving object is moving in the same direction.

In the case in which the moving object changes its direction, there is a possibility that the update-source correlation calculation block is not correctly selected. However, the device does not have to take into consideration the direction change of the moving object, when it puts importance on a reliable succession of the accumulated value and number of motion vectors during the short time from when the moving object starts to appear until it is detected (or, from when the moving object starts to move until it is detected). Thus, calculating the dot product of the motion vector located at (x, y) on the frame nth and the accumulated values of motion vectors of the preceding frame n−1th is highly effective.

(4-2) Operation and Effects

In the above-noted configuration, the motion vector accumulation section 101 of the moving object detection device 100 calculates the dot product of the motion vector located at (x, y) on the frame nth and the accumulated values of motion vectors of the preceding frame n−1th of the focused correlation calculation blocks BR10 (these accumulated values have been stored in the previous accumulated value storage section 64). And then motion vector accumulation section 101 chooses a correlation calculation block BR10 having the highest dot product as an update-source correlation calculation block BR10.

That allows the device to update the accumulated value of motion vectors with more stability, in comparison with the case in which the device calculates difference between the motion vectors on frame n−1th and the motion vector at the position (X, Y) on the frame nth. In addition, this device can more accurately update the accumulated value of motion vectors, since it utilizes the accumulated value of motion vectors of the frame n−1th.

According to the above-noted configuration, the motion vector accumulation section 101 calculates the dot product of the motion vector located at (x, y) on the frame nth and the accumulated values of motion vectors of the preceding frame n−1th of the focused correlation calculation blocks BR10 (these accumulated values have been stored in the previous accumulated value storage section 64). And then motion vector accumulation section 101 chooses a correlation calculation block BR10 having the largest dot product as an update-source correlation calculation block BR10. Therefore, this device can accurately update the accumulated value of motion vectors. In addition, that allows the device to update the accumulated value of motion vectors with more stability, in comparison with the case in which the device calculates difference between the motion vectors on frame n−1th and the motion vector at the position (X, Y) on the frame nth. Thus, this moving object detection device can accurately detect moving objects.

(5) Other Embodiments

In the above-noted embodiments, the moving object detection devices 40, 70, 90 and 100 are installed in a surveillance system such as video surveillance system. However, the present invention is not limited to this. These devices can be installed in various kinds of systems to detect moving objects.

Figure 38:
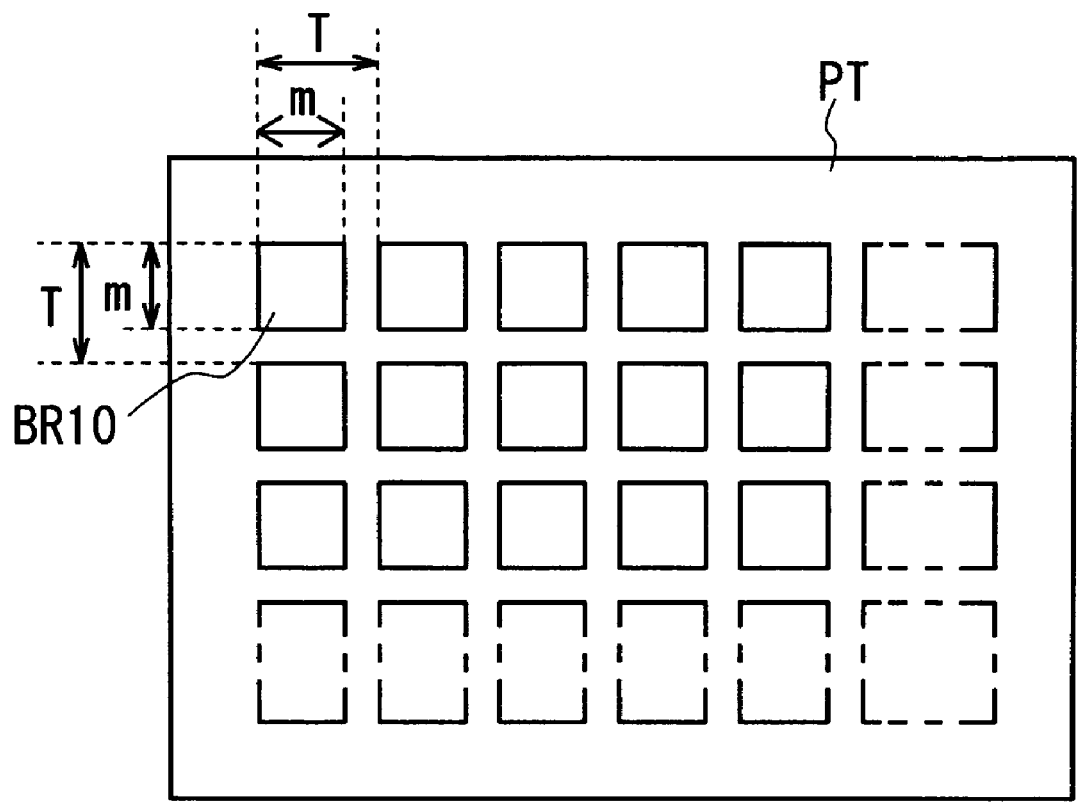
FIG. 38 is a schematic diagram explaining the configuration of correlation calculation block in other embodiments.
Figure 39:
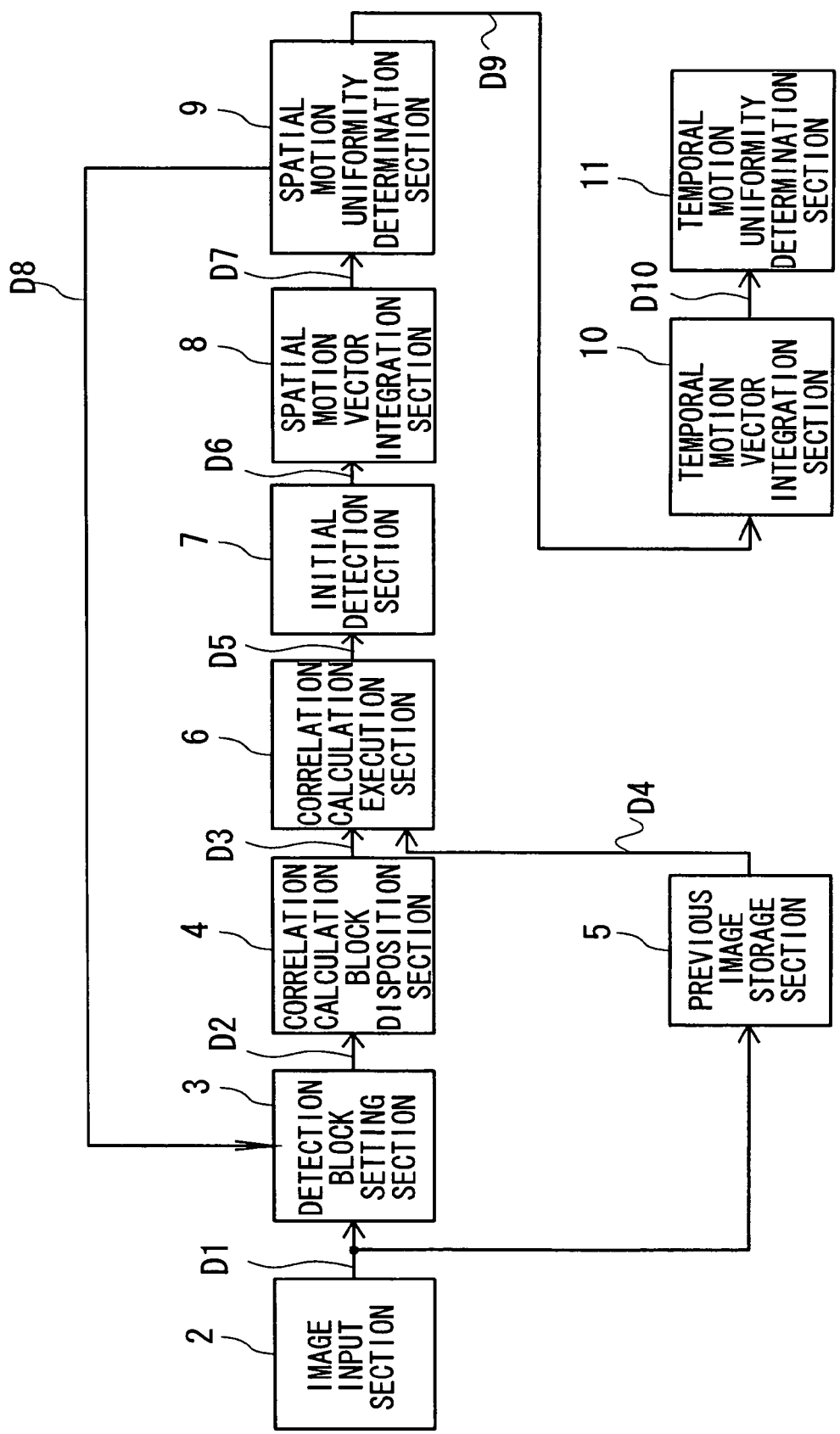
FIG. 39 is a block diagram showing the configuration of a moving object detection device.
Figure 40A:
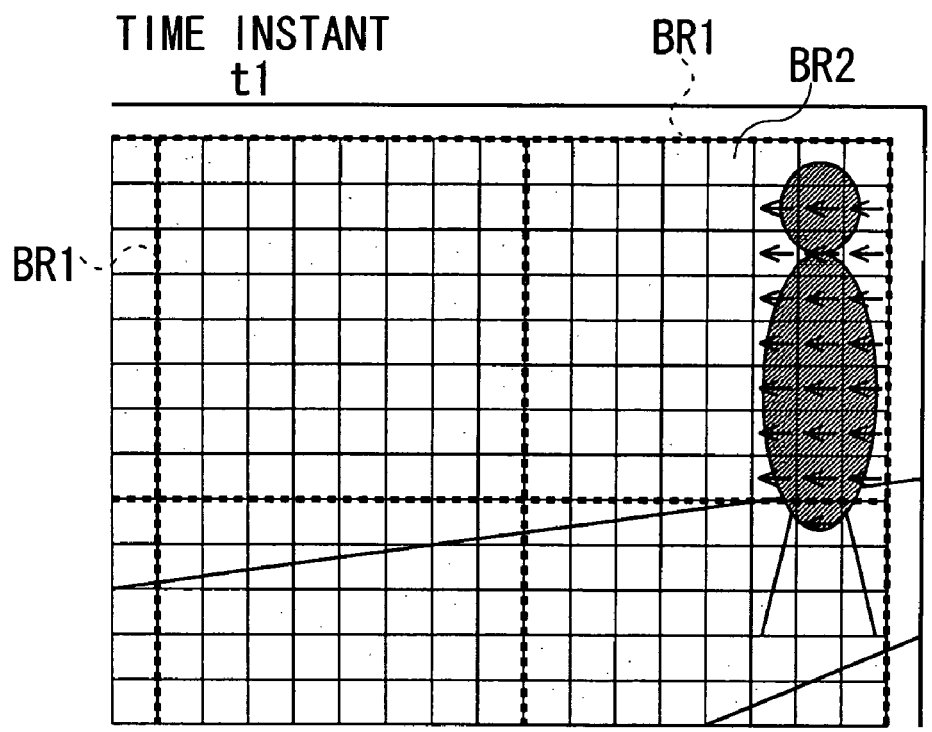
FIGS. 40A and 40B are schematic diagrams explaining a moving object detection method in a moving object detection device.
Figure 40B:
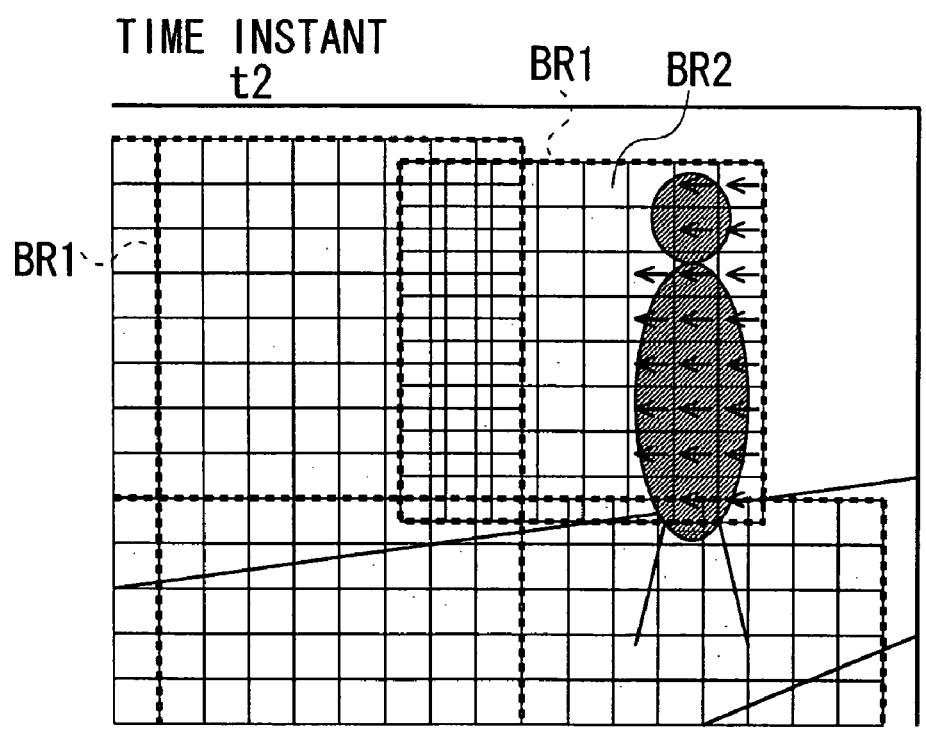
Figure 41:
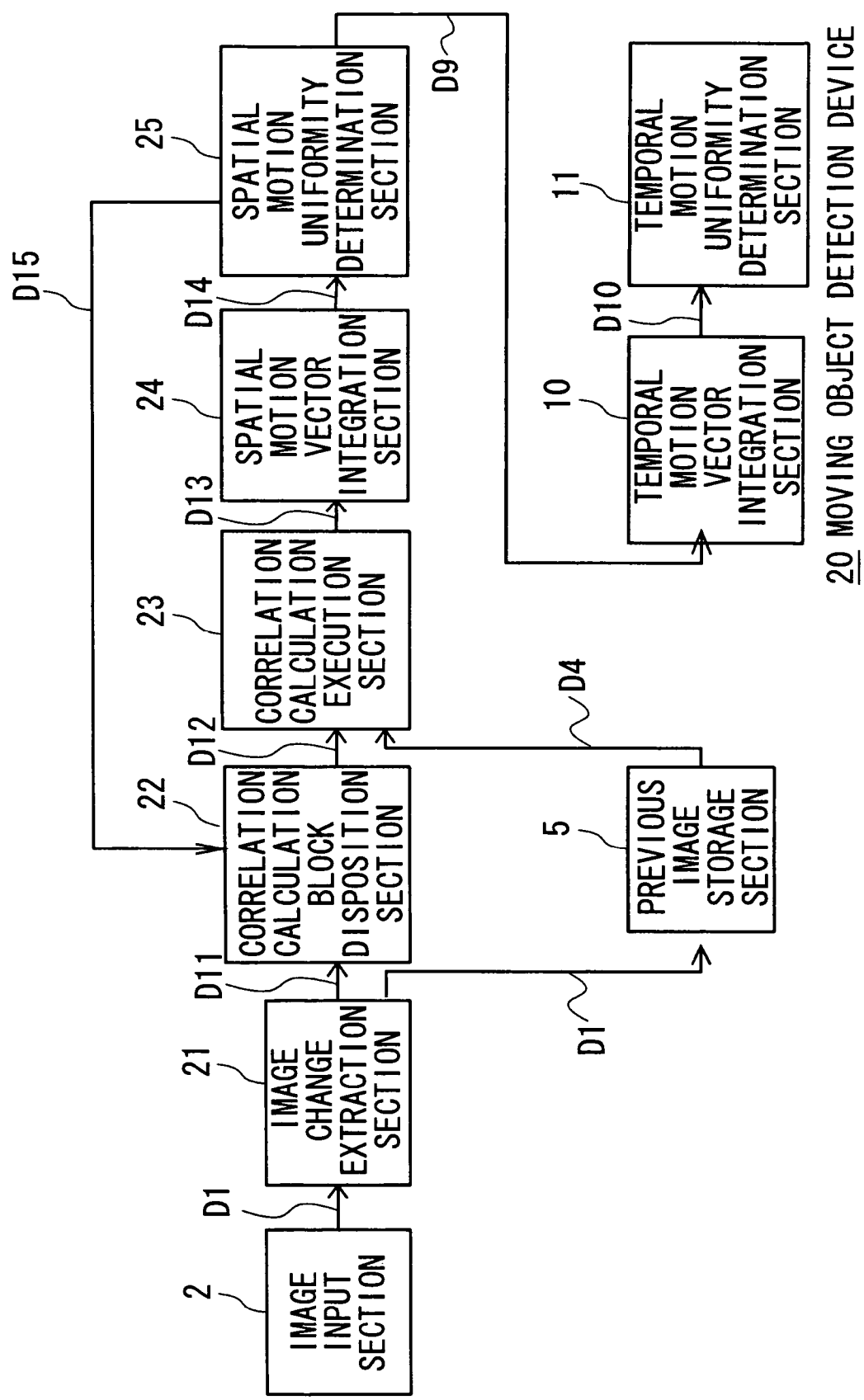
FIG. 41 is a block diagram showing the configuration of a moving object detection device.
Figure 42:
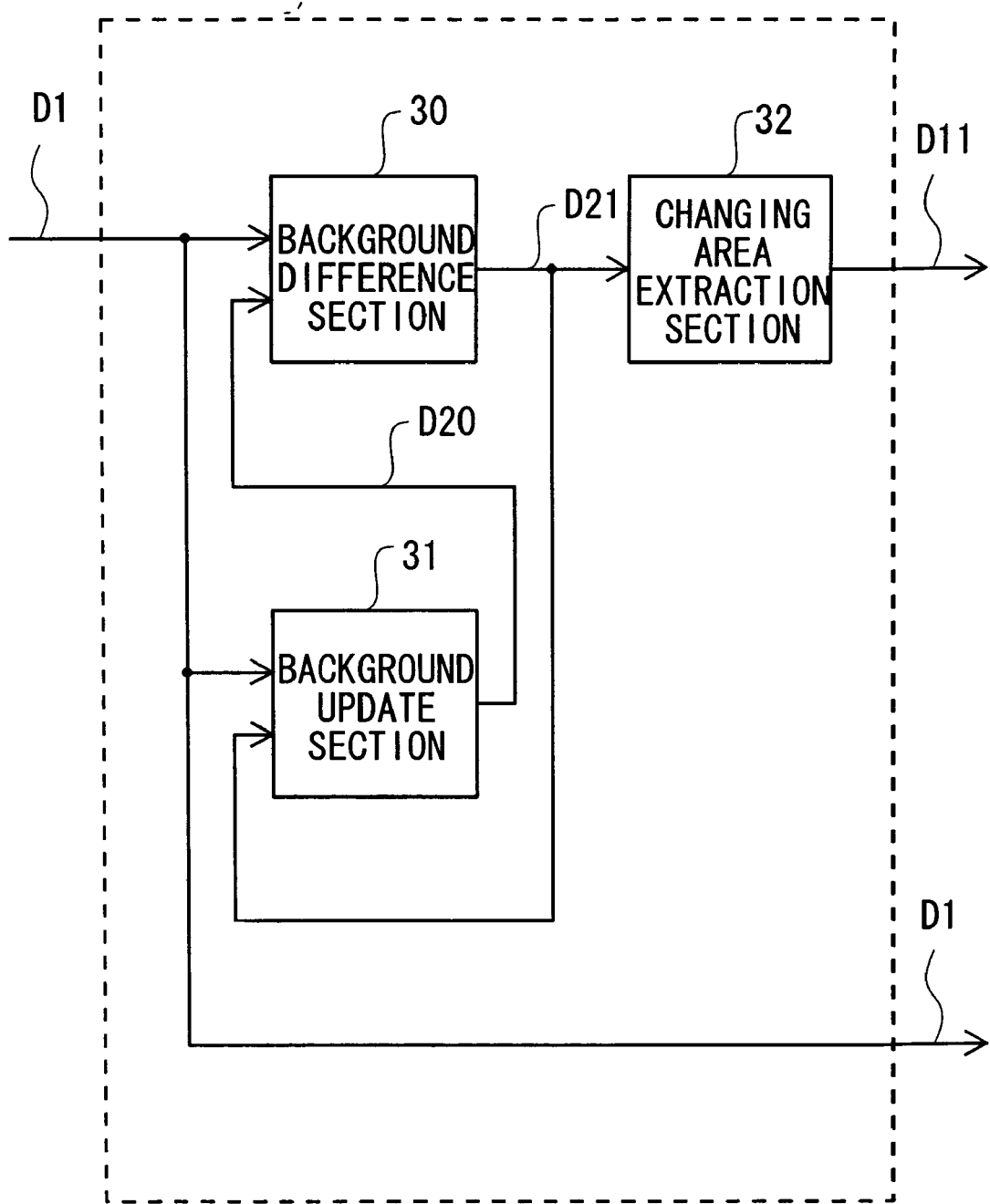
FIG. 42 is a block diagram showing the configuration of an image change extraction section.
Figure 43A:
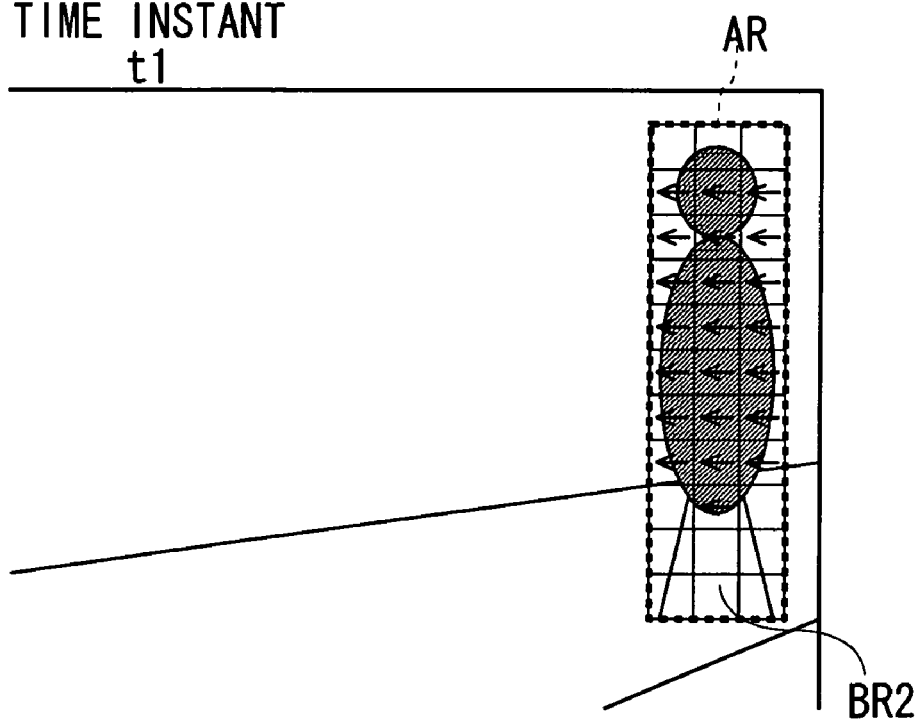
FIGS. 43A and 43B are schematic diagrams explaining a moving object detection method in a moving object detection device.
Figure 43B:
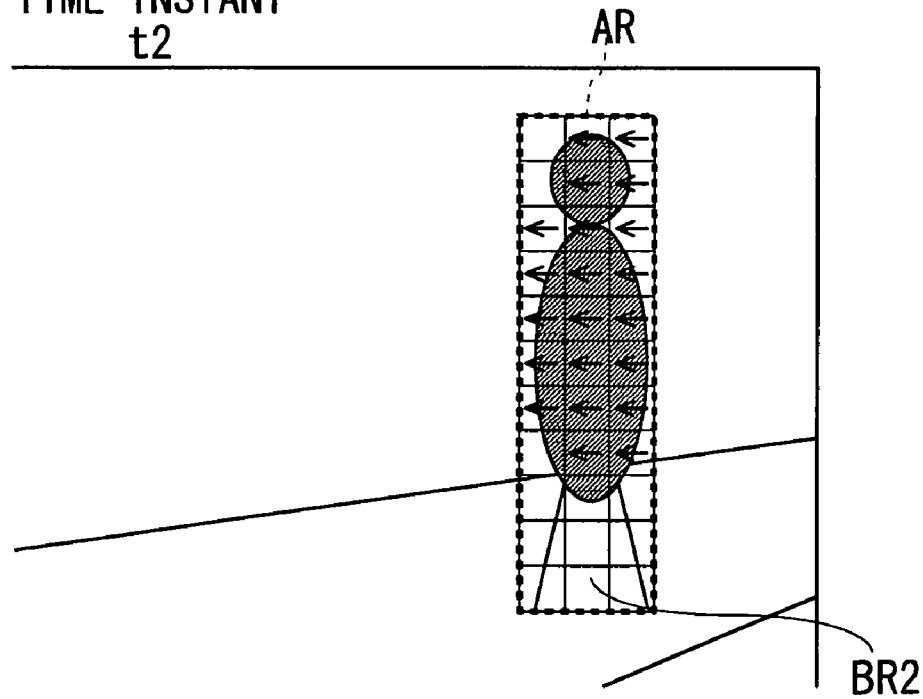
Figure 44:
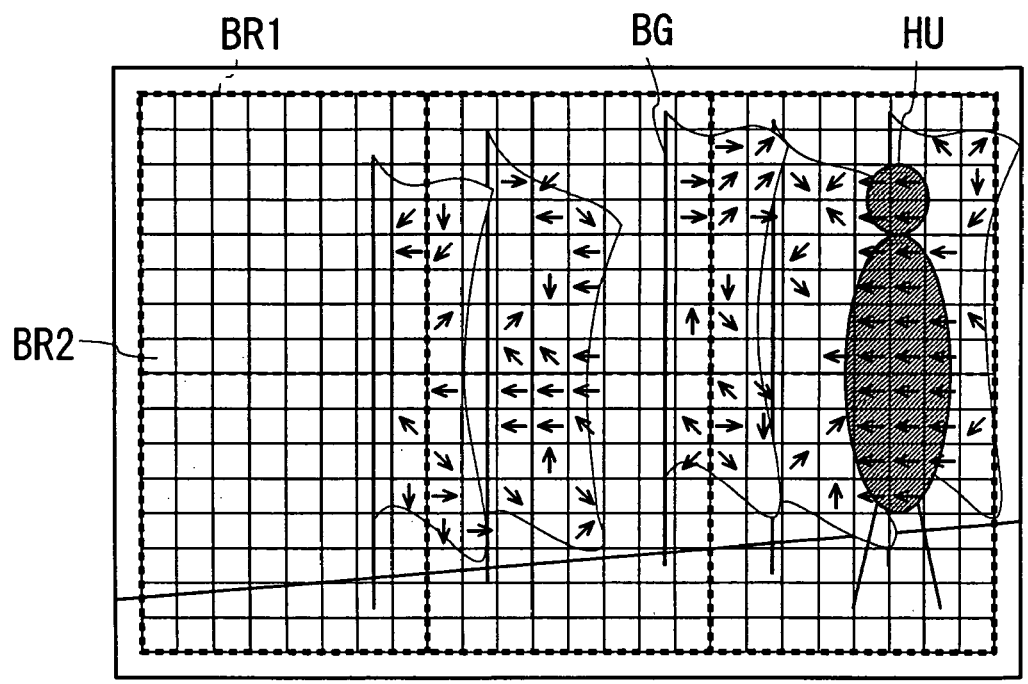
FIG. 44 is a schematic diagram explaining a moving object overlapping with a moving background.
Figure 45:
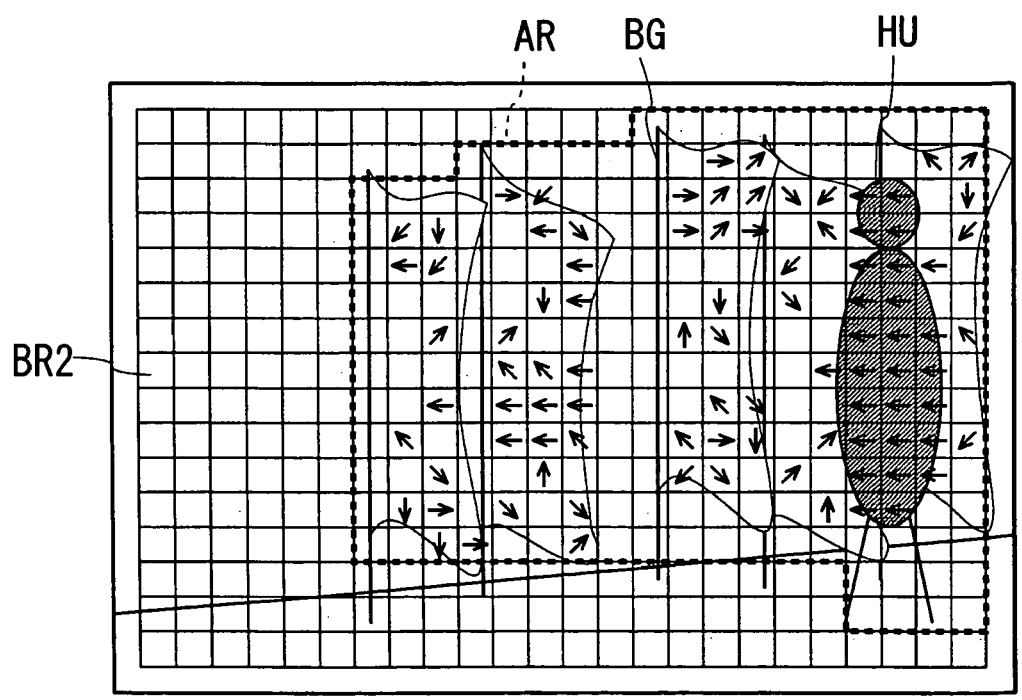
FIG. 45 is a schematic diagram explaining a moving object overlapping with a moving background.
Figure 46A:
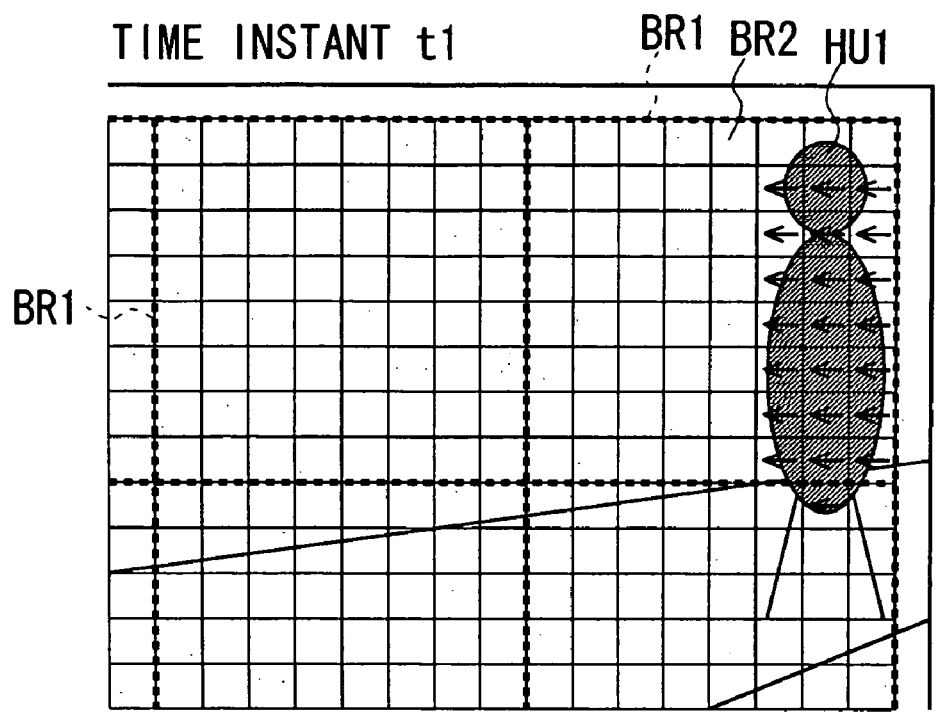
FIGS. 46A and 46B are schematic diagrams explaining a tracking process performed when two persons appear on a screen one after another.
Figure 46B:
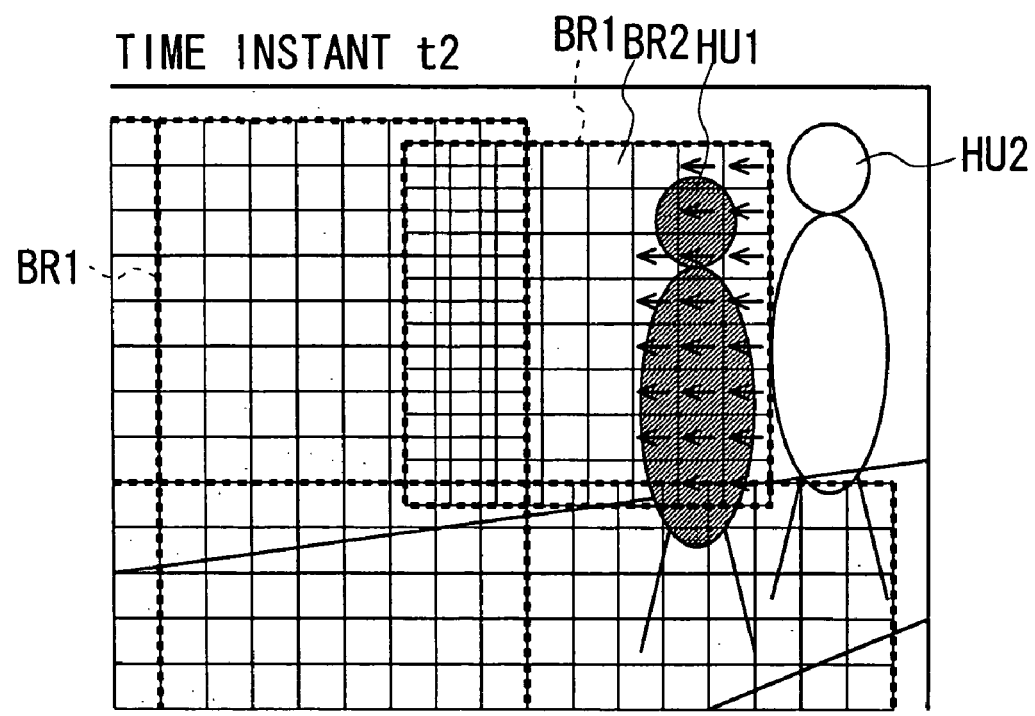
Figure 47A:
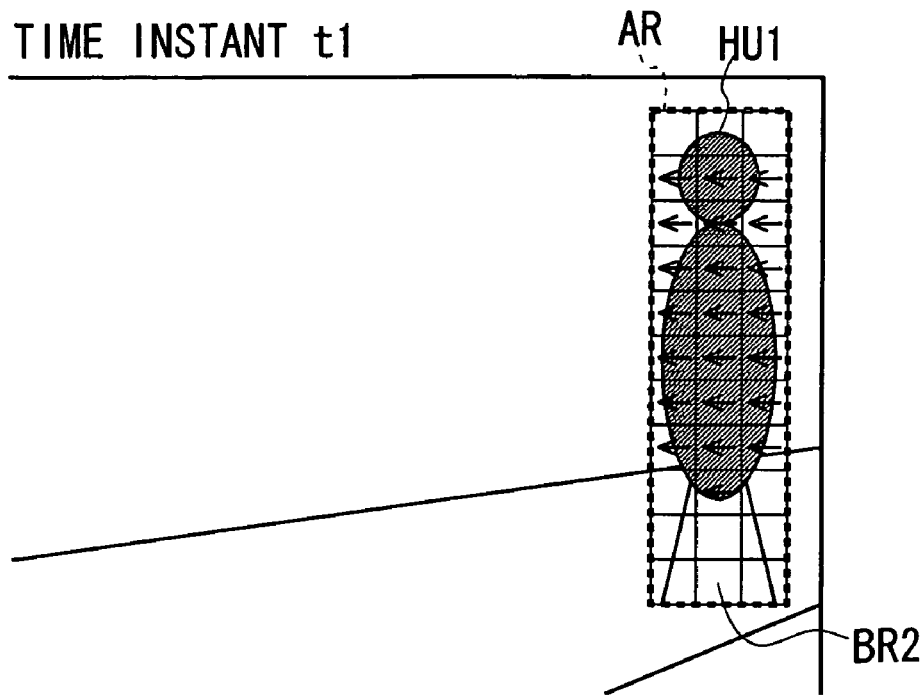
FIGS. 47A and 47B are schematic diagrams explaining a tracking process performed when two persons appear on a screen one after another.
Figure 47B:
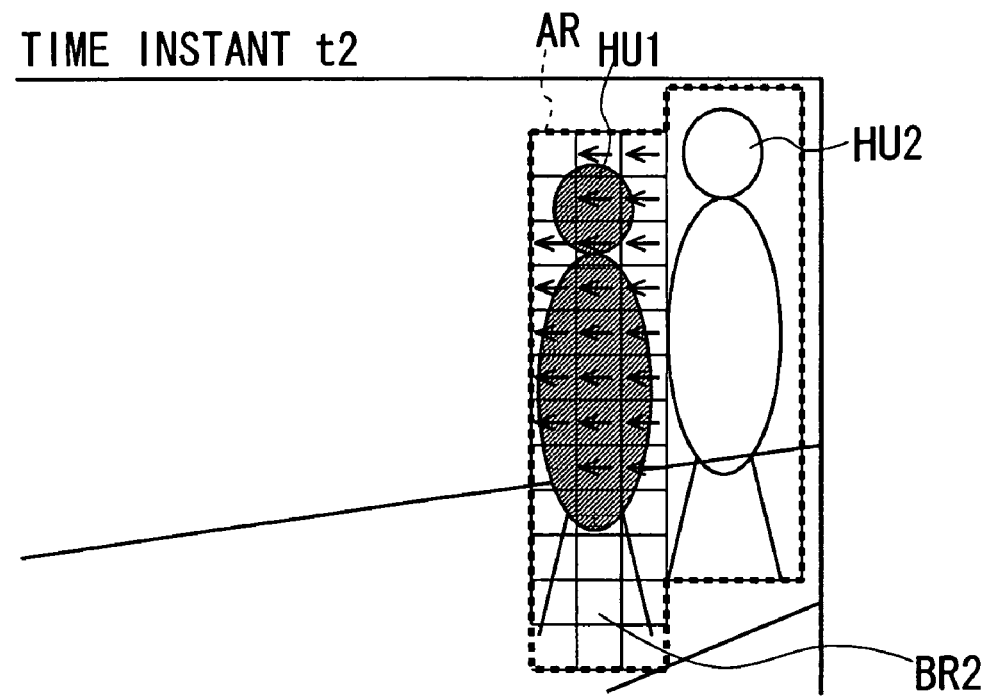

In the above-noted embodiments, the distance between the correlation calculation blocks BR10 (the size of block BR10 is m×m pixels) is set to be T, and the distance T is equal to m. Therefore, the correlation calculation blocks BR10 are neatly placed without any spaces as shown in FIG. 2. However, the present invention is not limited to this. The distance T can be greater than the size of the correlation calculation block (m<T) as shown in FIG. 38, allowing spaces between them. The distance T can also be less than the size of the correlation calculation block (m>T). In this case, some parts of correlation calculation blocks BR10 are overlapped with each other. Note that each correlation calculation block BR10 should be always at the same position (the size of each correlation calculation block BR10 disposed can vary).

In the above-noted embodiments, as shown in FIG. 2, the correlation calculation block BR10 (m×m pixels) is a regular square. However, the present invention is not limited to this. The correlation calculation block BR10 can have various kinds of other shapes.

In the above-noted embodiments, a difference means calculates difference between a certain parameter corresponding to the current input image and a distribution parameter showing the distribution of the parameter corresponding to the input image (i.e., it calculates a deviation (as difference) between the luminance level of the current input image and the temporal average value of the luminance level). However, the present invention is not limited to this. Other kinds of distribution parameter can be applied to this.

In the above-noted embodiments, the device calculates the average luminance level of each correlation calculation block BR10 by using the correlation calculation block data D31 supplied from the correlation calculation block disposition section 42. Then the device supplies the calculated average luminance level of each correlation calculation block BR10 to the background model update section 83 and the background model difference section 85 as the average luminance information D70. However, the present invention is not limited to this. The device also can calculate a luminance level from a certain part of the correlation calculation block BR10 to obtain the luminance level of the correlation calculation block BR10. And other methods can be applied to this.

In the above-noted embodiments, the previous motion vectors and the current motion vectors are equivalent to the motion vectors on the frame n−1th and the motion vectors on the frame nth respectively. However, the present invention is not limited to this. The previous motion vectors can be earlier motion vectors, such as motion vectors on a frame n−3 or frame n−5. In accordance with that, the previous accumulated value and number also can be changed. That is to say, the system can arbitrarily choose its operating interval (a frame interval of the images being input into the correlation calculation execution section, and a frame interval of the layer having a maximum resolution if there is a plurality of layers). By the way, the operating intervals in the first, second and fourth embodiments are a one-frame interval, while the operating interval in the third embodiment is a two-frame interval.

In the above-noted embodiment, Sn (X, Y) is the value obtained by accumulating the average deviations of every X and Y elements of motion vectors included in the motion vector group Wn (X, Y) when calculating the instantaneous randomness En (X, Y). However, the present invention is not limited to this. Various kinds of indicators which show the magnitude of variation, such as variance-covariance matrix of each motion vector in the motion vector group Wn (X, Y), can be applied.

In the above-noted embodiments, the previous accumulated value readout section 110 of the motion vector accumulation section 101 (the fourth embodiment) is applied to the moving object detection device 40 (the first embodiment). However, the present invention is not limited to this. For example, the previous accumulated value readout section 110 also can be applied to the moving object detection device 70 (the second embodiment), and the previous accumulated value readout section 110 also can be applied to the moving object detection device 90 (the third embodiment). In this manner, the previous accumulated value readout section 110 can be applied to various kinds of moving object detection device.

In the above-noted embodiments, all the processes are performed by hardware components. However, the present invention is not limited to this. Those processes can be performed by software components. A computer can perform the same functions after the software (programs) are installed in it. For example, the programs are installed in a general-purpose computer such as personal computer from a storage medium such as optical disc, magneto optical disc, semiconductor memory and magnetic disk. Also, the programs can be installed in a general-purpose computer via a network such as the Internet.

The device according to an embodiment of the present invention can be applied to a surveillance system such as video surveillance system, and other systems to perform various kinds of processes after detecting moving objects in images.

It should be understood by those skilled in the art that various modifications, combinations, sub-combinations and alterations may occur depending on design requirements and other factors insofar as they are within the scope of the appended claims or the equivalents thereof.

The invention claimed is:
1. A moving object detection apparatus, comprising:
motion vector calculation means for calculating motion vectors from an input image;
motion vector removal means for removing a motion vector having high randomness from said calculated motion vectors;
motion vector accumulation means for temporally accumulating each said motion vector not removed by said motion vector removal means, and for calculating an accumulated number of occurrences and an accumulated value of each motion vector; and
moving object detection means for determining, based on said calculated accumulated value and calculated accumulated number of occurrences of each motion vector, whether each said motion vector corresponds to a moving object,
wherein
said motion vector accumulation means includes:
accumulated value storage means for storing said accumulated values and numbers of said previous motion vectors such that said accumulated values and numbers are to be associated with the preceding positions of said motion vectors,
accumulated value readout means for reading out said accumulated values and numbers of said previous motion vectors from said accumulated value storage means, and
accumulated value update means for calculating new said accumulated values and numbers of said motion vectors by performing an update based on said accumulated values and numbers of said previous motion vectors and a magnitude and position of said current motion vector, said accumulated values and numbers of said previous motion vectors being stored in said accumulated value storage means,
said accumulated value readout means selects, from among said accumulated values and numbers of said previous motion vectors that are associated a position which is spatially a distance equivalent to a magnitude of said current motion vector away from a location of said current motion vector in a direction opposite to said current motion vector or that are associated with vicinity of said position, said accumulated value and number of said motion vector.

2. The moving object detection apparatus according to claim 1, wherein said motion vector removal means includes:
  previous vector storage means for storing said previous motion vectors;
  randomness calculation means for calculating, based on said current motion vectors and said previous motion vectors read from said previous vector storage means, instantaneous and stationary randomness of groups of motion vectors that are spatially and temporally adjacent to each said motion vector; and
  random vector removal means for removing said motion vectors that are determined, based on said instantaneous randomness and said stationary randomness, not to correspond to said moving object.

3. The moving object detection apparatus according to claim 2, wherein said random vector removal means removes said motion vectors when said instantaneous and stationary randomness are greater than or equal to predetermined threshold values.

4. A moving object detection apparatus, comprising:
  motion vector calculation means for calculating motion vectors from an input image;
  motion vector removal means for removing a motion vector having high randomness from said calculated motion vectors;
  motion vector accumulation means for temporally accumulating each said motion vector not removed by said motion vector removal means, and for calculating an accumulated number of occurrences and an accumulated value of each motion vector; and
  moving object detection means for determining, based on said calculated accumulated value and calculated accumulated number of occurrences of each motion vector, whether each said motion vector corresponds to a moving object,
  wherein
  said motion vector calculation means includes:
    area disposition means for disposing a plurality of areas on said input image;
    previous image storage means for storing said previous input image; and
    correlation calculation means for calculating a correlation between said areas on said previous input image and corresponding areas on said current input image to obtain said motion vector on each said area disposed by said area disposition means, said previous input image being read from said previous image storage means,
  said area disposition means disposes each said area on the same position at all times, and
  wherein
  said motion vector accumulation means includes:
    accumulated value storage means for storing said accumulated values and numbers of said previous motion vectors such that said accumulated values and numbers are to be associated with the preceding positions of said motion vectors;
    accumulated value readout means for reading out said accumulated values and numbers of said previous motion vectors from said accumulated value storage means; and
    accumulated value update means for calculating new said accumulated values and numbers of said motion vectors by performing an update based on said accumulated values and numbers of said previous motion vectors and a magnitude and position of said current motion vector, said accumulated values and numbers of said previous motion vectors being stored in said accumulated value storage means; and
  said accumulated value readout means selects, from among said accumulated values and numbers of said previous motion vectors that are associated with a position which is spatially a distance equivalent to a magnitude of said current motion vector away from a location of said current motion vector in a direction opposite to said current motion vector or that are associated with a vicinity of said position, said accumulated value and number of said motion vector.

5. The moving object detection apparatus according to claim 4, wherein said accumulated value readout means selects said accumulated value and number of said previous motion vector whose difference with respect to said current motion vector is smallest.

6. The moving object detection apparatus according to claim 4, wherein said accumulated value readout means selects said accumulated value and number of said previous motion vector whose accumulated value produces a maximum dot product with said current motion vector.

7. The moving object detection apparatus according to claim 4, wherein:
  said accumulated value update means includes previous vector storage means for storing said previous motion vectors; and
  said accumulated value update means resets said accumulated value and number of said previous motion vector associated with said position that is determined, based on said previous motion vectors stored in said previous vector storage means and said current motion vector calculated by said motion vector calculation means, not to correspond to said moving object, said accumulated value and number of said previous motion vector being stored in said accumulated value storage means.

8. A moving object detection method, comprising:
  calculating motion vectors from an input image;
  removing a motion vector having high randomness from the calculated motion vectors;
  temporally accumulating each motion vector not removed from the calculated motion vectors, and calculating an accumulated number of occurrences and an accumulated value of each motion vector; and
  determining by use of a moving object detection device, based on the calculated accumulated value and the calculated accumulated number of occurrences of each motion vector, whether each motion vector corresponds to a moving object,
  wherein
  the temporally accumulating and calculating includes:
    storing said accumulated values and numbers of said previous motion vectors such that said accumulated values and numbers are to be associated with the preceding positions of said motion vectors,
    reading out the stored accumulated values and numbers of said previous motion vectors, and
    calculating new said accumulated values and numbers of said motion vectors by performing an update based on the stored accumulated values and numbers of said previous motion vectors and a magnitude and position of said current motion vector,
  said reading out involves selecting, from among said accumulated values and numbers of said previous motion vectors that are associated with a position which is spatially a distance equivalent to a magnitude of said current motion vector away from a location of said current motion vector in a direction opposite to said current motion vector or that are associated with a vicinity of said position, said accumulated value and number of said motion vector.

9. A computer-readable storage medium having stored thereon a program for causing an apparatus to perform a moving object detection method, the method comprising:
  calculating motion vectors from an input image;
  removing a motion vector having high randomness from the calculated motion vectors;
  temporally accumulating each motion vector not removed from the calculated motion vectors, and calculating an accumulated number of occurrences and an accumulated value of each motion vector; and
  determining, based on the calculated accumulated value and the calculated accumulated number of occurrences of each motion vector, whether each motion vector corresponds to a moving object,
  wherein
  the temporally accumulating and calculating includes:
    storing said accumulated values and numbers of said previous motion vectors such that said accumulated values and numbers are to be associated with the preceding positions of said motion vectors,
    reading out the stored accumulated values and numbers of said previous motion vectors, and
    calculating new said accumulated values and numbers of said motion vectors by performing an update based on the stored accumulated values and numbers of said previous motion vectors and a magnitude and position of said current motion vector,
  said reading out involves selecting, from among said accumulated values and numbers of said previous motion vectors that are associated with a position which is spatially a distance equivalent to a magnitude of said current motion vector away from a location of said current motion vector in a direction opposite to said current motion vector or that are associated with a vicinity of said position, said accumulated value and number of said motion vector.

10. A moving object detection apparatus, comprising:
  a motion vector calculation section calculating motion vectors from an input image;
  a motion vector removal section removing a motion vector having high randomness from said calculated motion vectors;
  a motion vector accumulation section temporally accumulating each said motion vector not removed by said motion vector removal section, and calculating an accumulated number of occurrences and an accumulated value of each motion vector; and
  a moving object detection section determining, based on said calculated accumulated value and calculated accumulated number of occurrences of each motion vector, whether each said motion vector corresponds to a moving object,
  wherein
  said motion vector accumulation section includes:
    an accumulated value storage section storing said accumulated values and numbers of said previous motion vectors such that said accumulated values and numbers are to be associated with the preceding positions of said motion vectors,
    an accumulated value readout section reading out said accumulated values and numbers of said previous motion vectors from said accumulated value storage section, and
    an accumulated value update section calculating new said accumulated values and numbers of said motion vectors by performing an update based on said accumulated values and numbers of said previous motion vectors and a magnitude and position of said current motion vector, said accumulated values and numbers of said previous motion vectors being stored in said accumulated value storage section,
  said accumulated value readout section selects, from among said accumulated values and numbers of said previous motion vectors that are associated with a position which is spatially a distance equivalent to a magnitude of said current motion vector away from a location of said current motion vector in a direction opposite to said current motion vector or that are associated with a vicinity of said position, said accumulated value and number of said motion vector.

* * * * *